US008775223B2

(12) United States Patent
Halavais et al.

(10) Patent No.: US 8,775,223 B2
(45) Date of Patent: *Jul. 8, 2014

(54) SYSTEM AND METHOD FOR MANAGING SEAT RESERVATIONS

(75) Inventors: Richard A. Halavais, Anaheim Hills, CA (US); Tony Cheng-Tong Chung, Diamond Bar, CA (US)

(73) Assignee: CEATS, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,461

(22) Filed: Sep. 14, 2012

(65) Prior Publication Data

US 2013/0013354 A1    Jan. 10, 2013

Related U.S. Application Data

(63) Continuation of application No. 13/530,779, filed on Jun. 22, 2012, now Pat. No. 8,355,937, which is a continuation of application No. 12/953,279, filed on Nov. 23, 2010, now Pat. No. 8,219,448, which is a continuation of application No. 12/479,635, filed on Jun. 5, 2009, now Pat. No. 7,885,839, which is a continuation of application No. 12/244,727, filed on Oct. 2, 2008, now Pat. No. 7,685,009, which is a continuation of application No. 09/295,577, filed on Apr. 22, 1999, now Pat. No. 7,454,361.

(51) Int. Cl.
*G06Q 10/00* (2012.01)

(52) U.S. Cl.
USPC .......................................................... 705/5

(58) Field of Classification Search
USPC .......................................................... 705/5
See application file for complete search history.

(56) References Cited

U.S. PATENT DOCUMENTS

| 3,427,438 A | 2/1969 | Ruscher |
| 4,449,186 A | 5/1984 | Kelly et al. |

(Continued)

FOREIGN PATENT DOCUMENTS

| CA | 258420 | 2/1926 |
| CN | 1904921 | 1/2007 |

(Continued)

OTHER PUBLICATIONS

"How to Find the Lowest Fares" 1997-2001 GetThere LP https://wcorp.itn.net/cgi/get?hints:_T_VFfUU2sK.

(Continued)

*Primary Examiner* — Shannon Campbell
(74) *Attorney, Agent, or Firm* — Knobbe Martens Olson & Bear, LLP

(57) ABSTRACT

This invention relates to an electronic means by which people can select the exact seat or seats they want for any type of event or reserve an appointment for any activity. More specifically, a customer or a ticket re-seller or a venue operator can go, for example, to the internet and select the event or activity for which he wants a ticket or tickets or reserve a time and reserve and order the exact seat or seats or the time of his choosing directly online. The seat or seats or reserved time he selects is then removed from the inventory for that activity or event and made not available for any other buyer and such is so indicated by a graphical representation or other such indicator on the online map or picture representing availability of seating or time for that event.

68 Claims, 30 Drawing Sheets

(56) References Cited

U.S. PATENT DOCUMENTS

| | | |
|---|---|---|
| 4,788,643 A | 11/1988 | Trippe |
| 4,794,530 A | 12/1988 | Yukiura et al. |
| 4,931,932 A | 6/1990 | Dalnekoff et al. |
| 4,974,252 A | 11/1990 | Osborne |
| 4,984,156 A | 1/1991 | Mekata |
| 4,992,647 A | 2/1991 | Konishi et al. |
| 5,021,953 A | 6/1991 | Webber et al. |
| 5,027,224 A | 6/1991 | Yamada |
| 5,151,692 A | 9/1992 | Hirahara |
| 5,169,342 A | 12/1992 | Steele et al. |
| 5,237,499 A | 8/1993 | Garback |
| 5,239,480 A | 8/1993 | Huegel |
| 5,251,294 A | 10/1993 | Abelow |
| 5,255,184 A | 10/1993 | Hornick et al. |
| 5,263,134 A | 11/1993 | Paal et al. |
| 5,270,921 A | 12/1993 | Hornick et al. |
| 5,285,055 A | 2/1994 | Oonakahara et al. |
| 5,311,425 A | 5/1994 | Inada |
| 5,333,257 A | 7/1994 | Merrill et al. |
| 5,375,199 A | 12/1994 | Harrow et al. |
| 5,388,197 A | 2/1995 | Rayner |
| 5,408,417 A | 4/1995 | Wilder |
| 5,422,809 A | 6/1995 | Griffin et al. |
| 5,428,733 A | 6/1995 | Carr |
| 5,434,965 A | 7/1995 | Matheny et al. |
| 5,436,637 A | 7/1995 | Gayraud et al. |
| 5,442,809 A | 8/1995 | Diaz et al. |
| 5,479,602 A | 12/1995 | Baecker et al. |
| 5,500,938 A | 3/1996 | Cahill |
| 5,504,321 A | 4/1996 | Sheldon |
| 5,528,529 A | 6/1996 | Seal |
| 5,581,461 A | 12/1996 | Coll et al. |
| 5,598,477 A * | 1/1997 | Berson .............. 380/51 |
| 5,615,342 A | 3/1997 | Johnson |
| 5,621,430 A | 4/1997 | Bricklin |
| 5,668,592 A | 9/1997 | Spaulding, II et al. |
| 5,680,152 A | 10/1997 | Bricklin |
| 5,714,948 A | 2/1998 | Farmakis et al. |
| 5,724,520 A | 3/1998 | Goheen |
| 5,732,398 A | 3/1998 | Tagawa |
| 5,754,654 A | 5/1998 | Hiroya et al. |
| 5,769,269 A | 6/1998 | Peters |
| 5,774,123 A | 6/1998 | Matson |
| 5,781,892 A | 7/1998 | Hunt et al. |
| 5,797,126 A * | 8/1998 | Helbling et al. ............. 705/5 |
| 5,797,127 A | 8/1998 | Walker et al. |
| 5,806,046 A | 9/1998 | Curran et al. |
| 5,808,894 A | 9/1998 | Wiens et al. |
| 5,815,566 A | 9/1998 | Ramot et al. |
| 5,832,451 A | 11/1998 | Flake et al. |
| 5,832,454 A | 11/1998 | Jafri et al. |
| 5,838,973 A | 11/1998 | Carpenter-Smith et al. |
| 5,842,176 A | 11/1998 | Hunt et al. |
| 5,855,006 A | 12/1998 | Huemoeller et al. |
| 5,897,620 A | 4/1999 | Walker et al. |
| 5,926,108 A | 7/1999 | Wicks et al. |
| 5,926,798 A | 7/1999 | Carter |
| 5,930,761 A | 7/1999 | O'Toole |
| 5,930,769 A | 7/1999 | Rose |
| 5,940,073 A | 8/1999 | Klosterman et al. |
| 5,943,651 A | 8/1999 | Oosawa |
| 5,948,040 A | 9/1999 | DeLorme et al. |
| 5,966,126 A | 10/1999 | Szabo |
| 5,974,406 A | 10/1999 | Bisdikian et al. |
| 5,990,927 A | 11/1999 | Hendricks et al. |
| 6,023,685 A | 2/2000 | Brett |
| 6,047,285 A | 4/2000 | Jacobs |
| 6,070,149 A | 5/2000 | Tavor et al. |
| 6,085,169 A | 7/2000 | Walker et al. |
| 6,085,976 A | 7/2000 | Sehr et al. |
| 6,094,640 A | 7/2000 | Goheen |
| 6,101,477 A | 8/2000 | Hohle et al. |
| 6,107,932 A | 8/2000 | Walker et al. |
| 6,112,185 A | 8/2000 | Walker et al. |
| 6,119,096 A | 9/2000 | Mann et al. |
| 6,134,534 A | 10/2000 | Walker et al. |
| 6,167,462 A | 12/2000 | Davis |
| 6,223,166 B1 | 4/2001 | Kay |
| 6,240,396 B1 | 5/2001 | Walker et al. |
| 6,249,767 B1 | 6/2001 | Okayama et al. |
| 6,263,315 B1 | 7/2001 | Talluri |
| 6,301,574 B1 | 10/2001 | Thomas |
| 6,304,850 B1 | 10/2001 | Keller et al. |
| 6,307,572 B1 | 10/2001 | DeMarcken et al. |
| 6,360,205 B1 | 3/2002 | Iyengar |
| 6,380,959 B1 | 4/2002 | Wang et al. |
| 6,418,413 B2 | 7/2002 | DeMarcken et al. |
| 6,606,101 B1 | 8/2003 | Malamud et al. |
| 6,704,713 B1 | 3/2004 | Brett |
| 6,735,575 B1 | 5/2004 | Kara |
| 6,738,750 B2 | 5/2004 | Stone et al. |
| 6,824,057 B2 | 11/2004 | Rathus et al. |
| 6,920,431 B2 | 7/2005 | Showghi et al. |
| 6,948,126 B2 | 9/2005 | Malamud et al. |
| 6,975,856 B2 | 12/2005 | Ogasawara |
| 6,999,936 B2 | 2/2006 | Sehr |
| 7,010,533 B1 | 3/2006 | Kutsumi et al. |
| 7,027,038 B2 | 4/2006 | Carro |
| 7,069,228 B1 | 6/2006 | Rose et al. |
| 7,082,400 B2 | 7/2006 | Jones et al. |
| 7,086,591 B2 | 8/2006 | Anderson |
| 7,114,179 B1 | 9/2006 | Ritter et al. |
| 7,171,369 B1 | 1/2007 | Bertram et al. |
| 7,184,987 B2 | 2/2007 | Welt |
| 7,454,361 B1 | 11/2008 | Halavais |
| 7,458,867 B2 | 12/2008 | Matsuda et al. |
| 7,540,415 B2 | 6/2009 | Frank |
| 7,548,866 B2 | 6/2009 | Halavais et al. |
| 7,548,867 B2 | 6/2009 | Halavais et al. |
| 7,548,868 B2 | 6/2009 | Halavais et al. |
| 7,548,869 B2 | 6/2009 | Halavais et al. |
| 7,548,870 B2 | 6/2009 | Halavais et al. |
| 7,571,457 B1 | 8/2009 | Hendricks et al. |
| 7,640,178 B2 | 12/2009 | Halavais et al. |
| 7,657,449 B2 | 2/2010 | Halavais et al. |
| 7,660,727 B2 | 2/2010 | Halavais et al. |
| 7,660,728 B2 | 2/2010 | Halavais et al. |
| 7,660,729 B2 | 2/2010 | Halavais et al. |
| 7,664,663 B2 | 2/2010 | Halavais et al. |
| 7,685,009 B2 | 3/2010 | Halavais et al. |
| 7,783,530 B2 | 8/2010 | Slemmer |
| 7,881,953 B2 | 2/2011 | Halavais et al. |
| 7,881,954 B2 | 2/2011 | Halavais et al. |
| 7,885,839 B2 | 2/2011 | Halavais et al. |
| 7,899,692 B2 | 3/2011 | Caballero |
| 7,899,717 B2 | 3/2011 | Joao |
| 7,937,312 B1 | 5/2011 | Woolston |
| 7,941,337 B2 | 5/2011 | Vitrano, Jr. et al. |
| 7,966,298 B2 | 6/2011 | Bruso et al. |
| 8,219,448 B2 | 7/2012 | Halavais et al. |
| 8,224,561 B2 | 7/2012 | Kim et al. |
| 8,229,774 B2 | 7/2012 | Halavais et al. |
| 8,239,225 B2 | 8/2012 | Halavais et al. |
| 8,244,561 B2 | 8/2012 | Halavais et al. |
| 8,355,937 B2 | 1/2013 | Halavais et al. |
| 2001/0016825 A1 | 8/2001 | Pugliese et al. |
| 2001/0018660 A1 * | 8/2001 | Sehr ........................ 705/5 |
| 2001/0043210 A1 | 11/2001 | Gilbert |
| 2001/0053989 A1 | 12/2001 | Keller et al. |
| 2002/0052758 A1 | 5/2002 | Arthur et al. |
| 2002/0082879 A1 | 6/2002 | Miller et al. |
| 2002/0156661 A1 | 10/2002 | Jones et al. |
| 2002/0178034 A1 | 11/2002 | Gardner et al. |
| 2003/0171960 A1 | 9/2003 | Skinner |
| 2004/0006497 A1 | 1/2004 | Nestor et al. |
| 2004/0030568 A1 | 2/2004 | Kocznar et al. |
| 2004/0049412 A1 | 3/2004 | Johnson |
| 2004/0107439 A1 | 6/2004 | Hassell et al. |
| 2005/0144115 A1 | 6/2005 | Brett |
| 2005/0199713 A1 | 9/2005 | Rathus et al. |
| 2006/0095344 A1 | 5/2006 | Nakfoor |
| 2006/0206363 A1 | 9/2006 | Gove |
| 2007/0027794 A1 | 2/2007 | Brett |
| 2007/0027798 A1 | 2/2007 | Brett |

(56) References Cited

U.S. PATENT DOCUMENTS

| | | |
|---|---|---|
| 2007/0033131 A1 | 2/2007 | Brett |
| 2007/0038582 A1 | 2/2007 | Brett |
| 2007/0124232 A1 | 5/2007 | Brett |
| 2008/0027767 A1 | 1/2008 | Gunn |
| 2008/0154623 A1 | 6/2008 | Denker et al. |
| 2009/0063206 A1 | 3/2009 | Payne |
| 2009/0254844 A1 | 10/2009 | Davidson |
| 2010/0033572 A1 | 2/2010 | Trela |
| 2010/0036689 A1 | 2/2010 | Halavais et al. |
| 2010/0070312 A1 | 3/2010 | Hunt |
| 2010/0070313 A1 | 3/2010 | Francis |
| 2010/0228576 A1 | 9/2010 | Marti et al. |
| 2010/0318386 A1 | 12/2010 | Vaughan |
| 2011/0055058 A1 | 3/2011 | Hammad |
| 2011/0099092 A1 | 4/2011 | Gibson |
| 2011/0125538 A1 | 5/2011 | Joao |
| 2011/0173032 A1 | 7/2011 | Payne |

FOREIGN PATENT DOCUMENTS

| | | |
|---|---|---|
| EP | 757948 | 2/1997 |
| EP | 0920207 A1 | 6/1999 |
| EP | 1 868 153 A2 | 12/2007 |
| GB | 2 366 403 A | 8/2000 |
| JP | 62-69363 | 6/1987 |
| JP | 63-183666 | 11/1988 |
| JP | 63-298483 | 12/1988 |
| JP | 01304578 | 12/1989 |
| JP | 05-324689 | 12/1993 |
| JP | 07-93599 | 4/1995 |
| JP | 07-307932 | 11/1995 |
| JP | 08-191281 | 7/1996 |
| JP | H9-16608 | 1/1997 |
| JP | 09-044570 | 2/1997 |
| JP | 1997-134340 | 5/1997 |
| JP | 07-731191 A | 6/1997 |
| JP | 09-153089 | 6/1997 |
| JP | 09-319897 | 12/1997 |
| JP | 10-91818 | 4/1998 |
| JP | 10-105599 | 4/1998 |
| JP | 10-289281 | 10/1998 |
| JP | 10-293796 | 11/1998 |
| JP | 01-331290 | 11/2001 |
| JP | 05-258545 | 9/2005 |
| WO | WO 94/27258 | 11/1984 |
| WO | WO 92/12492 | 7/1992 |
| WO | WO 95/27949 | 10/1995 |
| WO | WO 98/10361 | 3/1998 |
| WO | WO 98/13753 | 4/1998 |
| WO | WO 98/14903 | 4/1998 |
| WO | WO 99/60489 | 11/1999 |
| WO | WO 00/28484 | 5/2000 |
| WO | WO 00/50982 | 8/2000 |
| WO | WO 00/65506 | 11/2000 |
| WO | WO 01/03040 | 1/2001 |
| WO | WO 01/15089 | 3/2001 |
| WO | WO 01/52139 | 7/2001 |
| WO | WO 01/84504 | 11/2001 |
| WO | WO 2010/145014 | 12/2010 |

OTHER PUBLICATIONS

"Sabre History, Buenos Aires Center", Sabre Holdings Careers—About Us: Sabre History—http://www.sabreargentina.corn.ar/sabre-history.html (1 of 6) [Nov. 26, 2010 6:45:14 PM].
"Sabre History, Business Development", Sabre Holdings, Travel Merchandising, Distribution, and Airline Products, http://www.sabre-holdings.com/aboutUs/history.html (1 of 7) [Nov. 26, 2010 6:44:33 PM].
Feb. 2, 2001 Written Opinion of the International Preliminary Searching Authority in International App. No. PCT/US00/10686 filed Apr. 21, 2000.
Oct. 9, 2002 Office Action in U.S. Appl. No. 09/533,213, filed Apr. 20, 2000.
Feb. 24, 2009 Office Action in U.S. Appl. No. 12/329,533, filed Dec. 5, 2008.
Apr. 2, 2009 Office Action in U.S. Appl. No. 12/244,727, filed Oct. 2, 2008.
About "Passenger List".
Ackerman, Jerry, No Ticket No Problem: Ticketless Travel Heralds a Computer-Driven Revolution in the Travel Industry, Boston Globe, Jun. 4, 1995.
Ackerman, No Ticket No Problem: Ticketless Travel Heralds a Computer-Driven Revolution in the Travel Industry, Boston Globe, Jun. 4, 1995.
Airlines Continue Flight to E-Ticketing, Brandweek, v. XXXVI, n 19, p. 3, May 8, 1995.
AirTran Airways, Inc.'s Answer to CEATS, Inc.'s First Amended Complaint, dated Jul. 26, 2010.
Alaska Airlines, Inc.'s Answer and Counterclaims to CEATS, Inc.'s First Amended Complaint, dated Aug. 4, 2010.
Alaska Airlines, Inc.'s Answer and Counterclaims to CEATS, Inc.'s First Amended Complaint, dated Jul. 22, 2010.
Alaska Airlines, Inc.'s Second Amended Answer and Counterclaims to CEATS, Inc.'s First Amended Complaint, dated Aug. 6, 2010.
Alaska Airlines, Inc.'s Second Amended Answer and Counter claims to CEATS, Inc.'s First Amended Complaint, dated Aug. 6, 2010.
Alesandrini, Kathryn, "Presentation World is a virtual conference center on CD-ROM", (Cinemar Corp) (Software Review), Computer Shopper, v15, n9, p. 204(1).
Alia—The Royal Jordanian, PLC's Answer to CEATS, Inc.'s First Amended Complaint and Counterclaim, dated Jul. 25, 2010.
All Nippon Airways Co., Ltd.'s First Amended Answer and Counterclaims to CEATS, Inc.'s First Amended Complaint, dated Aug. 4, 2010.
All Nippon Airways Co., Ltd.'s Second Amended Answer and Counterclaims to CEATS, Inc.'s First Amended Complaint, dated Aug. 9, 2010.
Anderson, Jennifer, "Ticket to Ride", PC Magazine, vol. 17, Issue No. 8, pp. 40-41, Apr. 21, 1998.
Andrienko, et al.: "Exploring spatial data with dominant attribute map and parallel coordinates", Computers, Environment and Urban Systems, 25 (2001) 5-15, 2001 Elsevier Science Ltd.
Andrienko, et al.: "Interactive maps for visual data exploration", research article, Int. J. Geographical Information Science, 1999, vol. 13, No. 4, 355-374.
Archtics Advertisement in BOMI Newsletter—May/Jun. 1996.
Bitauld, et al.: Journey Management, OR/MS Today, Oct. 1997—Airline Information Technology—http://www.lionhrtpub.com/orms/orms-10-97/Journey.html (1 of 8) [Nov. 26, 2010 5:45:48 PM].
Bly, "Pick Your Airline Seat on the Web", Los Angeles Times, Article Collections, May 11, 1997—http://articles/latimes.com/print/1997-05-11/travel/tr-57625_1_airline-seat (1 of 2) [Nov. 26, 2010 7:15:48 PM].
Bly, "Pick Your Airline Seat on the Web", Los Angeles Times, Article Collections, May 11, 1997.
BOMI (Box Office Management International) Newsletter, dated May/Jun. 1996.
BOMI (Box Office Management International) Newsletter, Jan. 1986.
BOMI (Box Office Management International) Newsletter, Jan. 1988.
BOMI (Box Office Management International) Newsletter, Jul./Aug. 1995.
BOMI (Box Office Management International) Newsletter, Mar. 1985.
BOMI (Box Office Management International) Newsletter, Nov. 1987.
BOMI (Box Office Management International) Newsletter, Winter 1981.
BOMI (Box Office Management International): 18th (sic) Annual Conference and Exhibition, Stake Your Claim in The New Ticketing Frontier, Denver, CO, Jan. 27-31, 1997, Conference Proceedings.
BOMI (Box Office Management International): 7th Annual "Europe Talks Tickets" Conference and Exhibition, Bologna, Italy, May 16-18, 1996, Conference Proceedings.

(56) References Cited

OTHER PUBLICATIONS

BOMI (Box Office Management International): Setting the Stage for Tomorrow's Opportunities, Fifteenth Annual Conference, New York, Jan. 25-28, 1994, Conference Proceedings.
BOMI (Box Office Management International): Tickets, Targets & Tulips, 5th Annual Europe Talks Tickets Conference and Exhibition, Amsterdam, The Netherlands, May 12-15, 1994, Conference Proceedings.
BOMI (Box Office Management International): Vienna Waits for You! Europe Talks Tickets, 6th Annual Conference and Exhibition, Vienna, Austria, Apr. 6-8, 1995, Conference Proceedings.
Burford, "Secure Electronic Ticketing on the Internet", Example Implementations—http://people.cs.uct.ac.za/~dburford/nis/sect7.htm (1 of 8) [Nov. 26, 2010 5:47:06 PM].
Business Traveller, by Casell, Mark: "Lufthansa introduces online seat selection and trials checked luggage pick-up service", Business Traveller, published Sep. 9, 2007; http://www.businesstraveller.com/news/lufthansa-introduces-online-seat-.
Business Wire, "First Union and Open Market join forces to creat a virtual community on the Internet", dated Mar. 15, 1995, downloaded from http://www.thefreelibrary.com/_/print/PrintArticle.aspx?id=16659415.
Business Wire, ElectroTix Offers New Visual Approach to Selling Tickets on Internet, May 28, 1998.
Caribbean Airlines, Limited's Answer to CEATS, Inc.'s First Amended Complaint and Counterclaim, dated Jul. 26, 2010.
Cartography on the Internet Seminar, 1995, http://maps.unomaha.edu/Seminar761/CartINTER.html (1 of 4) [Nov. 25, 2010 7:13:24 AM].
CEATS, Inc.'s Answer to Alaska Airlines, Inc. And its affiliate Horizon Air Industries, Inc. d/b/a: Horizon Air's Second Amended Counterclaims, dated Aug. 15, 2010.
CEATS, Inc.'s Answer to Alaska Airlines, Inc.'s Second Amended Counterclaims, dated Aug. 15, 2010.
CEATS, Inc.'s Answer to Alia—The Royal Jordanian Airlines, PLC's Counterclaims, dated Aug. 17, 2010.
CEATS, Inc.'s Answer to All Nippon Airways Co., Ltd.'s Second Amended Counterclaims, dated Aug. 15, 2010.
CEATS, Inc.'s Answer to Caribbean Airlines, Ltd.'s Counterclaims, dated Aug. 17, 2010.
CEATS, Inc.'s Answer to Concur Technologies, Inc.'s Counterclaims, Aug. 5, 2010.
CEATS, Inc.'s Answer to Continental Airlines, Inc.'s Second Amended Counterclaims, dated Aug. 15, 2010.
CEATS, Inc.'s Answer to Delta Air Lines, Ind.'s Second Amended Counterclaims, dated Aug. 15, 2010.
CEATS, Inc.'s Answer to Frontier Airlines, Inc.'s Counterclaims, dated Aug. 16, 2010.
CEATS, Inc.'s Answer to JetBlue Airways Corp.'s Second Amended Counterclaims, dated Aug. 15, 2010.
CEATS, Inc.'s Answer to Qatar Airways Q.C.S.C.'s Counterclaims, dated Aug. 17, 2010.
CEATS, Inc.'s Answer to Tickets.com's Counterclaims, dated Aug. 17, 2010.
CEATS, Inc.'s Answer to TicketsNow.corn, Inc.'s Second Amended Counterclaims, dated Aug. 15, 2010.
CEATS, Inc.'s Answer to United Air Lines, Inc.'s Second Amended Counterclaims, dated Aug. 15, 2010.
CEATS, Inc.'s Answer to Virgin America, Inc.'s Second Amended Counterclaims, dated Aug. 15, 2010.
CEATS, Inc.'s Motion to Dismiss Tickets.com's Counterclaims of Inequitable Conduct, Patent Misuse, Uneforceability, and Lack of Standing and to Strike Corresponding Affirmative Defenses, dated Aug. 23, 2010.
CEATS, Inc.'s Reply in Support of Its Motion to Dismiss Tickets.com's Counterclaims of Inequitable Conduct, Patent Misuse, Uneforceability, and Lack of Standing and to Strike Corresponding Affirmative Defenses, dated Sep. 23, 2010.
Chester, R., Tips for Net Explorer, Courier Mail, Jan. 20, 1998, pp. 15, Queensland, Australia.
Christel, Michael and Martin, David, Information Visualization Within a Digital Video Library, Journal of Intelligent Information Systems, 1998, vol. 11, pp. 235-257.
Chu, Larry and Chan, Bryan, Evolution of web site design: implications for medical education on the internet, Computers in Biology and Medicine, 1998, vol. 28, pp. 459-472.
Coleman, Terry Lee, "Tomahawks over Ticonderoga. (Mindscapre Incs wargarne)", Dec. 1994, Computer Gaming World, v125, p. 32(3).
Continental Airlines, E Service On-Line—http://web.archive.org/web/19991128070122/featuredfares2.continental.com/Error.asp?ErrNum=15.
Continental Airlines, Inc.'s First Amended Answer and Counterclaims to CEATS, Inc.'s First Amended Complaint, dated Aug. 4, 2010.
Continental Airlines, Inc.'s Second Amended Answer and Counterclaims to CEATS, Inc.'s First Amended Complaint, dated Aug. 6, 2010.
Corning, et al.: "Working with Active Server Pages" Copyright 1997 by Que Corporation.
DATAMAX, Software Resource Directory, 2003 Datamax Corporation, Orlando, FL, (submitted in ten parts).
Beats, Ken, "Coffee, Tea and The HP 3000, HP Professional", 13, 3, 64 (1), Mar. 1999.
Defendants' Amended Joint Invalidity Contentions, Dated Jan. 10, 2011.
Defendants' Joint Invalidity Contentions, Dated Dec. 14, 2010.
Defendants' joint Invalidity Contentions, Dated Jan. 4, 2011.
Delta Air Lines, Inc.'s First Amended Answer and Counterclaims to CEATS, Inc.'s First Amended Complaint, dated Aug. 4, 2010.
Delta Air Lines, Inc.'s Second Amended Answer and Counterclaims to CEATS, Inc.'s First Amended Complaint, dated Aug. 6, 2010.
Docket Sheet for case *Ceats, Inc. v. Continental Airlines, Inc., et al.,* Civil Action No. 6:10-cv-120 LED, U.S. District Court, Eastern District of Texas, dated Sep. 29, 2010.
Docket Sheet for case *Ceats, Inc. v. Continental Airlines, Inc., et al.,* Civil Action No. 6:10-cv-120 LED, U.S. District Court, Eastern District of Texas, Feb. 1, 2012.
Dodge, "Information Maps: Tools for Document Exploration", Casa, Work Paper Series, 1994, ISSN 1457-1298 .
DSA (Distributed System Architects, Inc.): "Archtics Ticketing System", Manassas, VS—newspaper clipping.
Dubberly, "An Introduction to Hypermedia and the Implications of Technology on Graphic Design Education", published by Graphic Design Education Association (GDEA), Annual National Symposia, Proceedings, 1989-1990.
Ebookers, "European Airlines—Online check-in at Lufthansa now with seat selection", Oct. 28, 2007; http://news.ebookers.com/news/online-check_in-at-lufthansa-now-with-se..
Eckel, Bruce: "Thinking in Java", Chapter 13 Introduction to Swing, 1998 by Prentice Hall PTR, ISBN 0-13-659723-8.
Elderbrock, et al.: "FrontPage 98 Bible", Copyright 1998 IDG Books Worldwide, Inc.
ElectroTix Offers New Visual Approach to Selling Tickets on Internet, May 1998, Business Wire.
Ericsson Readying Next Generation Mobile Phones, Mar. 22, 1999, Newsbytes News Network.
Exciting New Features Now Available on Microsoft Expedia, May 5, 1997, PR Newswire.
Exciting New Features Now Available on Microsoft Expedia, May 6, 1997, PR Newswire.
Farlex, The Free Library, "Continental expands E-Ticket Product; Introduces travel agency access", copyright 2010 Farlex, Inc., http://thefreelibra:ry.corn/Continental+expands+E-Ticket+product%3B+Introduces_travel_agency+access-a017488679 (1 of 6) [Nov. 26, 2010 7:16:58 PM].
Fastie, Will et al., "Be your own Travel Agent", PC Magazine, vol. 17, Issue No. 1, Jan. 6, 1998, pp. 177-196.
Feldman, Joan, Battle of the mouse clicks, Air Transport World, Jan. 1999, pp. 50-51.

(56) References Cited

OTHER PUBLICATIONS

Finelli, Patrick: "Product Reviews—Pre-Publication Draft, Stage Directions, Copyright 1997, Title the Complete Box Office Ticketing System for Windows 95" Subject Tick-It! 97. New Concepts Software, Inc.; CyberSEATS.
Finelli, Patrick: Product Reviews—Pre-Publication Draft, Stage Directions, Copyright 2001, Category Software Upgrade, Title Tick-It! 2K and the Web. New Concepts Software, Inc.; CyberSEATS.
Finnguide, "Online check-in at Lufthansa now with seat selection", Airline Travel and Aviation Indstry News, Sep. 21, 2007, http://www.finnguide.fi/AviationIndustry/aviation_airlines_news_07.asp..
Flanagan, "JavaScript—The Definitive Guide", 2nd edition, 1997, 1996, O'Reilly & Associates.
Flint, Perry, Web of Ambivalence, Air Transport World, Apr. 1998, pp. 31-36.
Flyer Talk Forums—"Northwest WorldPerks (Discontinued Programs)—NWA reports highest pax load factor in the Company's history—82.8%", Forum dated Jul. 2000, http://www.flyertalk.com/forum/archive/t-70418.html (1 of 8) [Nov. 26, 2010 6:09:24 PM].
Flyer Talk Forums —"TravelBuzz!—Best Internet Flight Reservations Systems", Forum dated Nov. 1999, http://www.flyertalk.com/forum/archive/t-285940.html (1 to 8) [Nov. 25, 2011 5:58:27 PM].
Flyer TalkForums—"seat selection while booking on lufthansa.com, new?" Forum dated Jan. 3, 2007, http://www.flyertalk.com/forum/miles-more-lufthansa-austrian-swiss-othe..
Forsyth, Gordon, Chipping in, AirCargoWorld, Oct. 1998, pp. 38-43.
Fraunhofer: Institut Software- und Systemtechnik, pp. 36-37, 1996.
Fredericiana—"Open Source, The Web, and German-American Oddities—Red or Green? Accessiblity of Lufthansa Seat Selections", http://fredericiana.com/2009/04/25/red-or-green-accessibility-of-lufthans..
Frontier Airlines, Inc.'s Answer and Counterclaims to CEATS, Inc.'s First Amended Complaint, datedJul. 23, 2010.
Fujimura, K., et al., Digital-Ticket-Controlled Digital Ticket Circulation, 8th USENIX Security Symposium, Aug. 1999.
GetThere.com, Prospectus Nov. 22, 1999.
Gocho, et al.: "Development of the MARS MR-10 Termial Device Serial No. 0009, Article No. 205", Railway and Electrical Engineering, pp. 33-37.
Granada Theater's Answer and Counterclaims to CEATS, Inc.'s First Amended Complaint, datedJul. 26, 2010.
Granada Theater's First Amended Answer and Counterclaims to CEATS, Inc.'s First Amended Complaint, dated Sep. 7, 2010.
Hayes, Mary, "Mobility is up, costs are down", Informationweek, n 700, pp. 251-257, Sep. 14, 1998.
Home Ticket Network—Internet and Touchtone Goes Live With Calgary Philharmonic Orchestra, Marketwire, Canadian Corporate News, May 27, 1998.
Home Ticket Network—Internet and Touchtone Goes Live With Calgary Philharmonic Orchestra, Marketwire, Canadian Corporate News, May 27, 1998, Marketwirem, Canadian Corporate News.
Hunter Kevil, L et al., Reviews: An Electronic Companion to Statistics. Paper book with CD-ROM in pocket, Electronic Resources Review, 1998, vol. 2, Issue 8, pp. 98-99, San Francisco, U.S.
IMS (Internet Merchandising Systems): "Tour Reservation Software and Internet Tour Software Booking Engine", downloaded from http://www.imscart.com/graphical_seat_selection_html (1 to 3) [Nov. 25, 2010 7:29:35 AM].
Information Week, "Mobility Is Up, Costs Are Down—Creative IT shapes transportation's future, from Web-based shipping to 'documentless' travel", by Mary Hayes, InformationWeek.com, Sep. 14, 1998.
INTIX (The International Ticketing Association) 19th Annual International Ticketing Association Conference and Exhibition, Jan. 20-23, 1998, Washington, DC, *Conference Proceedings* .
INTIX (The International Ticketing Association) 20th Anniversary History Book, 1999.
INTIX (The International Ticketing Association) 22nd Annual Conference and Exhibition—A Ticketing Odyssey Toronto, Jan. 30-Feb. 2, 2001, Toronto, Canada Conference Handout.
INTIX (The International Ticketing Association) 22nd Annual Conference and Exhibition—A Ticketing Odyssey Toronto, Jan. 30-Feb. 2, 2001, Toronto, Canada Conference Proceedings.
INTIX (The International Ticketing Association) 24th Annual Conference and Exhibition, Jan. 21-24, 2003, Denver, CO Conference Proceedings.
INTIX (The International Ticketing Association) 8th Annual Europe Talks Tickets Conference and Exhibition—Where Tickets Take Off!, May 8-10, 1997, London, UK, Conference Handout.
INTIX (The International Ticketing Association) 8th Annual Europe Talks Tickets Conference and Exhibition—Where Tickets Take Off!, May 8-10, 1997, London, UK, Conference Proceedings.
INTIX (The International Ticketing Association) 9th Annual Europe Talks Tickets Conference and Exhibition—Springtime in Paris, Apr. 23-25, 1998, Paris, France Conference Proceedings.
INTIX (The International Ticketing Association) Newsletter, *1998*—headline re Nashville Conference.
INTIX (The International Ticketing Association) Newsletter, Apr. 1998.
INTIX (The International Ticketing Association) Newsletter, Apr. 2000.
INTIX (The International Ticketing Association) Newsletter, Jan./Feb. 1999.
INTIX (The International Ticketing Association) Newsletter, Jan./Feb. 2000.
INTIX (The International Ticketing Association) Newsletter, Jan./Feb. 2002.
INTIX (The International Ticketing Association) Newsletter, Jul./Aug. 2000.
INTIX (The International Ticketing Association) Newsletter, Mar. 1999.
INTIX (The International Ticketing Association) Newsletter, Mar. 2000.
INTIX (The International Ticketing Association) Newsletter, May 1997.
INTIX (The International Ticketing Association) Newsletter, Nov./Dec. 1997.
INTIX (The International Ticketing Association) Newsletter, Nov./Dec. 1998.
INTIX (The International Ticketing Association) Newsletter, Nov./Dec. 2001.
INTIX (The International Ticketing Association) Newsletter, Oct. 1997.
INTIX (The International Ticketing Association) Newsletter, Sep. 1997.
INTIX (The International Ticketing Association) Newsletter, Sep. 1999.
INTIX (The International Ticketing Association) Newsletter, Sep. 2000.
Invalidity Contentions for the '361 Patent Regarding *Expedia's SeatPinPointer System*, Dated Dec. 14, 2010.
Invalidity Contentions for the '361 Patent Regarding ITN's gethere.com System, Dated Dec. 15, 2010.
Invalidity Contentions for the '361 Patent Regarding JP Patent App. No. H9-16608 to Fujii, Dated Dec. 14. 2010.
Invalidity Contentions for the '361 Patent Regarding JP Patent No. 10-289281 by Yoneta, Dated Dec. 14, 2010.
Invalidity Contentions for the '361 Patent Regarding Nordisk Film Biografer Ticket Booking System Project, Dated Dec. 14, 2010.
Invalidity Contentions for the '361 Patent Regarding Select Ticketing's Point Admission Selection System PASS, Dated Dec. 14, 2010.
Invalidity Contentions for the '361 Patent Regarding the Archtics System, Dated Dec. 15, 2010.
Invalidity Contentions for the '361 Patent Regarding The Seat Map Project by Vallet, Dated Dec. 14, 2010.
Invalidity Contentions for the '361 Patent Regarding The Source Ticket Systems, Dated Dec. 14, 2010.
Invalidity Contentions for the '361 Patent Regarding The TicketsLive System, Dated Dec. 14, 2010.
Invalidity Contentions for the '361 Patent Regarding U.S. Patent No. 5,781,892 to Hunt et al., Dated Dec. 14, 2010.
Invalidity Contentions for the '361 Patent Regarding United's Connection System, Dated Dec. 15, 2010.

(56) References Cited

OTHER PUBLICATIONS

Invalidity Contentions for the '663 Patent Regarding Expedia's SeatPinPointer System, Dated Dec. 14, 2010.
Invalidity Contentions for the '663 Patent Regarding ITN's gethere.com System, Dated Dec. 15, 2010.
Invalidity Contentions for the '663 Patent Regarding JP Patent No. 10-289281 by Yoneta, Dated Dec. 14, 2010.
Invalidity Contentions for the '663 Patent Regarding Nordisk Film Biografer Ticket Booking System Project, Dated Dec. 14, 2010.
Invalidity Contentions for the '663 Patent Regarding Select Ticketing's Point Admission Selection System PASS, Dated Dec. 14, 2010.
Invalidity Contentions for the '663 Patent Regarding the Archtics System, Dated Dec. 15, 2010.
Invalidity Contentions for the '663 Patent Regarding The Seat Map Project by Vallet, Dated Dec. 14, 2010.
Invalidity Contentions for the '663 Patent Regarding The Source Ticket Systems, Dated Dec. 14, 2010.
Invalidity Contentions for the '663 Patent Regarding The TicketsLive System, Dated Dec. 14, 2010.
Invalidity Contentions for the '663 Patent Regarding U.S. Patent No. 5,781,892 to Hunt et al., Dated Dec. 14, 2010.
Invalidity Contentions for the '663 Patent Regarding United's Connection System, Dated Dec. 15, 2010.
Invalidity Contentions for the '728 Patent Regarding Expedia's SeatPinPointer System, Dated Dec. 14, 2010
Invalidity Contentions for the '728 Patent Regarding ITN's gethere.com System, Dated Dec. 15, 2010.
Invalidity Contentions for the '728 Patent Regarding JP Patent App. No. H9-16608 to Fujii, Dated Dec. 14, 2010.
Invalidity Contentions for the '728 Patent Regarding JP Patent No. 10-289281 by Yoneta, Dated Dec. 14, 2010.
Invalidity Contentions for the '728 Patent Regarding Nordisk Film Biografer Ticket Booking System Project, Dated Dec. 14, 2010.
Invalidity Contentions for the '728 Patent Regarding Select Ticketing's Point Admission Selection System PASS, Dated Dec. 14, 2010.
Invalidity Contentions for the '728 Patent Regarding the Archtics System, Dated Dec. 15, 2010.
Invalidity Contentions for the '728 Patent Regarding The Seat Map Project by Vallet, Dated Dec. 14, 2010.
Invalidity Contentions for the '728 Patent Regarding the TicketsLive System, Dated Dec. 14, 2010
Invalidity Contentions for the '728 Patent Regarding U.S. Patent No. 5,781,892 to Hunt et al., Dated Dec. 14, 2010.
Invalidity Contentions for the '728 Patent Regarding United's Connection System, Dated Dec. 15, 2010.
Invalidity Contentions for the '729 Patent Regarding Expedia's SeatPinPointer System, Dated Dec. 14, 2010.
Invalidity Contentions for the '729 Patent Regarding ITN's gethere.com System, Dated Dec. 15, 2010.
Invalidity Contentions for the '729 Patent Regarding JP Patent App. No. H9-16608 to Fujii, Dated Dec. 14, 2010.
Invalidity Contentions for the '729 Patent Regarding JP Patent No. 10-289281 by Yoneta, Dated Dec. 14, 2010.
Invalidity Contentions for the '729 Patent Regarding Nordisk Film Biografer Ticket Booking System Project, Dated Dec. 14, 2010.
Invalidity Contentions for the '729 Patent Regarding Select Ticketing's Point Admission Selection System PASS, Dated Dec. 14, 2010.
Invalidity Contentions for the '729 Patent Regarding the Archtics System, Dated Dec. 15, 2010.
Invalidity Contentions for the '729 Patent Regarding the Seat Map Project by Vallet, Dated Dec. 14, 2010.
Invalidity Contentions for the '729 Patent Regarding the Source Ticket Systems, Dated Dec. 14, 2010.
Invalidity Contentions for the '729 Patent Regarding the TicketsLive System, Dated Dec. 14, 2010.
Invalidity Contentions for the '729 Patent Regarding U.S. Patent No. 5,781,892 to Hunt et al., Dated Dec. 14, 2010.
Invalidity Contentions for the '729 Patent Regarding United's Connection System, Dated Dec. 15, 2010.
Invalidity Contentions for the '866 Patent Regarding Expedia's SeatPinPointer System, Dated Dec. 14, 2010.
Invalidity Contentions for the '866 Patent Regarding ITN's gethere.com System, Dated Dec. 15, 2010.
Invalidity Contentions for the '866 Patent Regarding JP Patent App. No. H9-16608 to Fujii, Dated Dec. 14, 2010.
Invalidity Contentions for the '866 Patent Regarding JP Patent No. 10-289281 by Yoneta, Dated Dec. 14, 2010.
Invalidity Contentions for the '866 Patent Regarding Nordisk Film Biografer Ticket Booking System Project, Dated Dec. 14, 2010.
Invalidity Contentions for the '866 Patent Regarding Select Ticketing's Point Admission Selection System PASS, Dated Dec. 14, 2010.
Invalidity Contentions for the '866 Patent Regarding the Archtics System, Dated Dec. 15, 2010.
Invalidity Contentions for the '866 Patent Regarding the Seat Map Project by Vallet, Dated Dec. 14, 2010.
Invalidity Contentions for the '866 Patent Regarding the Source Tickets System, Dated Dec. 14, 2010.
Invalidity Contentions for the '866 Patent Regarding The TicketsLive System, Dated Dec. 14, 2010.
Invalidity Contentions for the '866 Patent Regarding U.S. Patent No. 5,781,892 to Hunt et al., Dated Dec. 14, 2010.
Invalidity Contentions for the '866 Patent Regarding United's Connection System, Dated Dec. 15, 2010.
Invalidity Contentions for the '869 Patent Regarding Expedia's SeatPinPointer System, Dated Dec. 14, 2010.
Invalidity Contentions for the '869 Patent Regarding ITN's gethere.com System, Dated Dec. 15, 2010.
Invalidity Contentions for the '869 Patent Regarding JP Patent App. No. H9-16608 to Fujii, Dated Dec. 14, 2010.
Invalidity Contentions for the '869 Patent Regarding JP Patent No. 10-289281 by Yoneta, Dated Dec. 14, 2010.
Invalidity Contentions for the '869 Patent Regarding Nordisk Film Biografer Ticket Booking System Project, Dated Dec. 14, 2010.
Invalidity Contentions for the '869 Patent Regarding Select Ticketing's Point Admission Selection System PASS, Dated Dec. 14, 2010.
Invalidity Contentions for the '869 Patent Regarding the Archtics System, Dated Dec. 15, 2010.
Invalidity Contentions for the '869 Patent Regarding the Seat Map Project by Vallet, Dated Dec. 14, 2010.
Invalidity Contentions for the '869 Patent Regarding the Source Ticket Systems, Dated Dec. 14, 2010.
Invalidity Contentions for the '869 Patent Regarding the TicketsLive System, Dated Dec. 14, 2010.
Invalidity Contentions for the '869 Patent Regarding U.S. Patent No. 5,781,892 to Hunt et al., Dated Dec. 14, 2010.
Invalidity Contentions for the '869 Patent Regarding United's Connection System, Dated Dec. 15, 2010.
Invalidity Contentions for the '870 Patent Regarding Expedia's SeatPinPointer System, Dated Dec. 14. 2010.
Invalidity Contentions for the '870 Patent Regarding ITN's gethere.com System, Dated Dec. 15, 2010.
Invalidity Contentions for the '870 Patent Regarding JP Patent App. No. H9-16608 to Fujii, Dated Dec. 14, 2010.
Invalidity Contentions for the '870 Patent Regarding JP Patent No. 10-289281 by Yoneta, Dated Dec. 14, 2010.
Invalidity Contentions for the '870 Patent Regarding Nordisk Film Biografer Ticket Booking System Project, Dated Dec. 14, 2010.
Invalidity Contentions for the '870 Patent Regarding Select Ticketing's Point Admission Selection System PASS, Dated Dec. 14, 2010.
Invalidity Contentions for the '870 Patent Regarding the Archtics System, Dated Dec. 15, 2010.
Invalidity Contentions for the '870 Patent Regarding the Seat Map Project by Vallet, Dated Dec. 14, 2010.
Invalidity Contentions for the '870 Patent Regarding the Source Ticket Systems, Dated Dec. 14, 2010.
Invalidity Contentions for the '870 Patent Regarding the TicketsLive System, Dated Dec. 14, 2010.
Invalidity Contentions for the '870 Patent Regarding U.S. Patent No. 5,781,892 to Hunt et al., Dated Dec. 14, 2010.
Invalidity Contentions for the '870 Patent Regarding United's Connection System, Dated Dec. 15, 2010.

(56) References Cited

OTHER PUBLICATIONS

Invalidity Contentions Regarding the Winscape and Wings ("WW") and Tick-it References, Dated Jan. 4, 2011.
ITN: Service That Never Stops, A Partnership Custom-Tailored to Your Needs, brochure, pp. 1-5.
JetBlue Airways Corporation's Answer and Counterclaims to CEATS, Inc.'s First Amended Complaint, dated Jul. 22, 2010.
JetBlue Airways Corporation's First Amended Answer and Counterclaims to CEATS, Inc.'s First Amended Complaint, dated Aug. 4, 2010.
JetBlue Airways Corporation's Second Amended Answer and Counterclaims to CEATS, Inc,'s First Amended Complaint, dated Aug. 6, 2010.
Kinetix Adds Powerful 3D VRML Capabilities to Hyperwire Web Title Authoring Software, Business Wire, Jul. 15, 1996.
Kramer, Matt, "Two Schedulers streamline chore of setting up meetings; Meetings marker packs C/S Power", May 8, 1995, PC Week, v12, n18, p. 59 (4).
Kuom, Matthias and Oertel, Britta, Virtual travel agencies, Netnomics, 1999, vol. 1, pp. 225-235.
Levere, Jane, Internet Pursuit Heats Up, Airline Business, Dec. 1998, pp. 16.
Levere, Jane, Low fares capture more web sales, Airline Business, Jan. 1998, pp. 62.
Levere, Jane, On-Line A new web challenger, Airline Business, Nov. 1998, pp. 49.
Levers, Jane., Online Review: Don't just look, book!, Airline Business, Nov. 1997, pp. 79.
Levere, Jane, United's answer to Travelocity, Airline Business, Sep. 1998, pp. 134.
Lewis, Torch, Fellow Viagrans, Unite!, Business & Commercial Aviation, Jan. 1999, pp. 112.
LexisNexis: Copyright 1999 The Sentinel, The Stentinel (Stoke).
Lin, Xia et al., Visu Interactions with Web Database Content, {Online} Available: http://research.cis.drexel.edu/mesh/meshPaper1.html, 1995.
Lufthansa, "Information on requirements and seat selection", printed from webpage on Oct. 27, 2010, http://lufthansa.com/us/en/Information-on-reqirements-and-seat-sel..
Makers of Box Office and Point of Sale Software, 2010, New Concepts Software, Inc. http://ncsoftware.com/CaseStudiesPalace.aspx plus clean, complete copy reprinted.
Marshall, Patrick, Schedule+Version 1.0. (Microsoft Corp.) (Software Review) (one of five evaluations of Microsoft Windows group scheduling software packages in 'Organize Meetings with the Greatest of Ease') (Evaluation), Aug. 23, 1993, InfoWorld, v15, n34, p. 65(4).
Martin, et al.: "Cooperation between input modalities for adaptive design of interactive multimedia presentations", Workshop, "Adaptive Design of Interactive Multimedia Presentations for Mobile Users", Mar. 1999.
*CEATS, Inc.* v. *Continental Airlines, Inc. et al.*, No. 6:10-cv-120-LED, letter dated Jan. 3, 2012, from McDermott Will & Emery, to Judge Davis. Document No. 797.
*CEATS Inc.* v. *Continental Airlines, Inc. et al.*, No. 6:10-cv-120-LED, letter dated Nov. 10, 2011, from McDermott Will & Emery, to Judge Davis. Document No. 689.
*CEATS Inc.* v. *Continental Airlines, Inc. et al.*, No. 6:10-cv-120-LED, letter dated Dec. 6, 2011, from McDermott Will & Emery, to Judge Davis. Document No. 721.
*CEATS Inc.* v. *Continental Airlines, Inc. et al.*, No. 6:10-cv-120-LED, letter dated Jan. 3, 2012, from McDermott Will & Emery, to Judge Davis. Document No. 790.
*CEATS Inc.* v. *Continental Airlines, Inc. et al.*, No. 6:10-cv-120-LED, letter dated Jan. 3, 2012, from McDermott Will & Emery, to Judge Davis. Document No. 793.
*CEATS Inc.* v. *Continental Airlines, Inc. et al.*, No. 6:10-cv-120-LED, Order signed by Judge Davis, dated Jan. 9, 2012. Document No. 808.
*CEATS Inc.* v. *Continental Airlines, Inc. et al.*, No. 6:10-cv-120-LED, letter dated Nov. 23, 2011, from Goldman Ismail Tomaselli Brennan & Baum, to Judge Davis, Document No. 709.
*CEATS Inc.* v. *Continental Airlines, Inc. et al.*, No. 6:10-cv-120-LED, letter dated Dec. 12, 2011, from Goldman Ismail Tomaselli Brennan & Baum, to Judge Davis. Document No. 729.
*CEATS Inc.* v. *Continental Airlines, Inc. et al.*, No. 6:10-cv-120-LED, letter dated Dec. 27, 2011, from Goldman Ismail Tomaselli Brennan & Baum, to Judge Davis. Document No. 786.
*CEATS Inc.* v. *Continental Airlines, Inc. et al.*, No. 6:10-cv-120-LED, Joint Final Pretrial Order, dated Feb. 1, 2012. Document No. 848.
MCI, Now the MCI Center is Just a Mouse Click Away; Washington, D.C.'s State-of-the-Art Arena Launches New Website, www.mcicenter.com, PR Newswire, Jul. 13, 1998, pp. 1.
Memorandum Opinion and Order re: construing disputed claim terms and denying motion for summary judgment, Dated Jul. 21, 2011.
Mills, Tim et al., Providing world wide access to historical sources, Computer Networks and ISDN Systems, 1997, vol. 29, pp. 1317-1325.
Musciano, et al.: "HTML—The Definitive Guide—Help for Web Authors", 3rd Edition, Aug. 1998.
Music & Copyright, n. 62, p. 2, Mar. 29, 1995.
Ndumu, DT et al., Towards desktop personal travel agents, BT Technol J, Jul. 1998, vol. 16, Issue 3, pp. 69-78.
Nielsen, Jakob: "Accessible Design for Users With Disabilities"Alertbox for Oct. 1995.
O'Donnell, "Kerry's Clips" Aug. 31, 1998, INTIX, http://web.archive.org/web/19990922150816/www.intix.org/html/kerrys1.htm (1 of 9) [Nov. 26, 2010 7:05:47 PM].
Online Demonstration, Car Rental Searching, downloaded from https://wcorp.itn.net/cgi/get?demo5:_T_VFfuu2sK on Dec. 20, 2010.
Online Demonstration, Gateway to The Reservation System, downloaded from https://wcorp.itn.net/cgi/get?demo8:_T_VFfuu2sK*itn/hot/a10213 on Dec. 20, 2010.
Online Demonstration, Hotel Reservations, downloaded from https://wcorp,itn.net/cgi/get?demo6:_T_VFfuu2sK on Dec. 20, 2010.
Online Demonstration, Making Your Reservation, downloaded from https://wcorp.itn.net/cgi/get?demo8:_T_VFfuu2sK*itn/hot/a10213 on Dec. 20, 2010.
Online Demonstration, Pricing, downloaded from https://wcorp.itn.net/cgi/get?demo4:_T_VFfuu2sK on Dec. 20, 2010.
Online Demonstration, Reading Availability, Legend withMileage—Price SFO to ORD, downloaded from https://wcorp.itn.net/cgi/get?demo3:_T_VFfuu2sK on Dec. 20, 2010.
Online Demonstration, Requesting Flights, downloaded from https://wcorp.itn.net/cgi/get?demo2:_T_VFfuu2sK on Dec. 20. 2010.
Online Demonstration, Step-by-Step Guide, downloaded from https://wcorp.itn.net/cgi/get?demo2_T_VFfuu2sK*itn/ord=NEWREC on Dec. 20, 2010.
Online Demonstration, Your Profile—Joe's Traveling Profile, downloaded from https://wcorp.itn.net/cgi/get?demo1:_T_VFfuu2sK on Dec. 20, 2010.
Online Ticketing System: Ticket Sales for Events & Attractions, 2010. Interactive Ticketing. Jul. 21, 2011. http://www.interactiveticketing.com/.
Past, present, and future office actions, amendments, arguments, and other relevant documents or materials in the file history of U.S. Appl. No. 09/553,213, filed Apr. 20, 2000, entitled Individual Seat Selection Ticketing and Reservation System, now abandoned.
Past, present, and future office actions, amendments, arguments, and other relevant documents or materials in the file history of application Serial No. PCT/US00/10686, filed Apr. 21, 2000, entitled Individual Seat Selection Ticketing and Reservation System, now abandoned.
Past, present, and future office actions, amendments, arguments, and other relevant documents or materials in the file history of co-pending U.S. Appl. No. 09/295,577, filed Apr. 22, 1999, entitled Individual Seat Selection Ticketing and Reservation System, which issued on Nov. 18, 2008 as U.S. Pat. No. 7454361.

(56) References Cited

OTHER PUBLICATIONS

Past, present, and future office actions, amendments, arguments, and other relevant documents or materials in the file history of co-pending U.S. Appl. No. 12/244,727, filed Oct. 2, 2008, entitled Individual Seat Selection Ticketing and Reservation System.

Past, present, and future office actions, amendments, arguments, and other relevant documents or materials in the file history of co-pending U.S. Appl. No. 12/329,507, filed Dec. 5, 2008, entitled Individual Seat Selection Ticketing and Reservation System.

Past, present, and future office actions, amendments, arguments, and other relevant documents or materials in the file history of co-pending U.S. Appl. No. 12/329,512, filed Dec. 5, 2008, entitled System and Method for Maintaining Coherency of Data Entries.

Past, present, and future office actions, amendments, arguments, and other relevant documents or materials in the file history of co-pending application U.S. Appl. No. 12/329,531, filed Dec. 5, 2008, entitled Dynamic Interactive User Interface.

Past, present, and future office actions, amendments, arguments, and other relevant documents or materials in the file history of co-pending application U.S. Appl. No. 12/329,533, filed Dec. 5, 2008, entitled System and Method for Selecting and Reserving Sets of Seats.

Past, present, and future office actions, amendments, arguments, and other relevant documents or materials in the file history of co-pending application U.S. Appl. No. 12/333,265, filed Dec. 11, 2008, entitled System and Method for Selecting and Reserving Airline Seats.

Past, present, and future office actions, amendments, arguments, and other relevant documents or materials in the file history of co-pending application U.S. Appl. No. 12/429,525, filed Apr. 24, 2009, entitled System and Method for Selecting and Reserving Time Slots for an Appointment.

Past, present, and future office actions, amendments, arguments, and other relevant documents or materials in the file history of co-pending U.S. Appl. No. 12/429,631, filed Apr. 24, 2009, entitled System and Method for Selecting and Reserving Rooms At a Venue.

Past, present, and future office actions, amendments, arguments, and other relevant documents or materials in the file history of co-pending U.S. Appl. No. 12/479,598, filed Jun. 5, 2009, entitled System and Method for Selecting and Reserving Airline Seats.

Past, present, and future office actions, amendments, arguments, and other relevant documents or materials in the file history of co-pending U.S. Appl. No. 12/479,601, filed Jun. 5, 2009, entitled System and Method for Selecting and Reserving Airline Seats.

Past, present, and future office actions, amendments, arguments, and other relevant documents or materials in the file history of co-pending U.S. Appl. No. 12/479,601, filed Jun. 5, 2009, entitled System and Method for Selecting and Reserving Airline Seats, which issued on Feb. 1, 2011 as U.S. Pat. No. 7881953.

Past, present, and future office actions, amendments, arguments, and other relevant documents or materials in the file history of co-pending U.S. Appl. No. 12/479,635, filed Jun. 5, 2009, entitled System and Method for Displaying Airline Seats.

Past, present, and future office actions, amendments, arguments, and other relevant documents or materials in the file history of co-pending application U.S. Appl. No. 12/488,497, filed Jun. 19, 2009, entitled System and Method for Selecting and Reserving Seats Using a Touch Screen Device.

Past, present, and future office actions, amendments, arguments, and other relevant documents or materials in the file history of co-pending U.S. Appl. No. 12/491,171, filed Jun. 24, 2009, entitled System and Method for Selecting and Reserving Airlines Seats.

Past, present, and future office actions, amendments, arguments, and other relevant documents or materials in the file history of co-pending U.S. Appl. No. 12/491,182, filed Jun. 24, 2009, entitled System and Method for Displaying Airlines Seats.

Past, present, and future office actions, amendments, arguments, and other relevant documents or materials in the file history of co-pending U.S. Appl. No. 12/572,186, filed Oct. 1, 2009, entitled System and Method for Managing Airline Seat Reservations, which issued on Feb. 1, 2011 as U.S. Pat. No. 7881954.

Past, present, and future office actions, amendments, arguments, and other relevant documents or materials in the file history of co-pending U.S. Appl. No. 13/185,451, filed Oct. 1, 2009, entitled System and Method for Arbitrating the Selection and Reserving of Airline Seats.

Past, present, and future office actions, amendments, arguments, and other relevant documents or materials in the file history of co-pending application U.S. Appl. No. 12/953,279, filed Nov. 23, 2010, entitled System and Method for Managing Airline Seat Reservations.

Past, present, and future office actions, amendments, arguments, and other relevant documents or materials in the file history of co-pending U.S. Appl. No. 13/368,955, filed Feb. 8, 2012, entitled System and Method for Selecting and Reserving Airline Seats.

Past, present, and future office actions, amendments, arguments, and other relevant documents or materials in the file history of co-pending U.S. Appl. No. 13/369,071, filed Feb. 8, 2012, entitled System and Method for Selection of Airline Seats and Payment Verification.

Peratalo, Tuula: "Tickets Via Internet: FiLippus", Ticket Service Finland, undated.

Peterson, "Interactive and Animanted Cartography", 1995, book review from http://maps.unomaha.edu/books/iacart/book.html (1 of 11) [Nov. 25, 2010 7:12:44 AM].

Pfaffenberger, et al.: "HTML 4 Bible", Copyright 1998 IDG Books Worldwide, Inc.

Pfaffenberger: "Official Microsoft Internet Explorer 4 Book", for Microsoft Windows 95 and Windows NT Operating Systems, Chapter 9 Make it Rock, Microsoft 1997.

Printout of Travelocity.com Seat Map archived Dec. 12, 1998 from http://web.archive.org/web/19990428171540/www2.travelocity.com/ttools/seatmap.html downloaded Sep. 23, 2008 (Printout of Travelocity Site as described in Anderson).

Quatar Airways, Q.C.S.C.'s Answer to CEATS, Inc.'s First Amended Complaint and Counterclaims, dated Jul. 30, 2010.

Raggett, et al.: "HTML 4.0 Specification", W3C REC-html40-971218, W3C Recommendation Dec. 18, 1997.

Ray, et al.: "HTML for Dummies—Adding Images", Quick Reference 2nd Edition, Published by IDG Books Worldwide, Inc., 1997.

Reibman, Greg, Boston's Don Law Launches Ticketing Firm; Keeps Ticketmaster From Top Area Venues, Billboard, Feb. 3, 1996.

Sabre Group, New Sabre BTS Release Speeds Travel Process for Corporate Travelers; Automatic Flight Upgrades, Visual Seat Maps Put Travelers in Control, PR Newswire, Mar. 2, 1998.

Sabre, Travel Planner Module, Seat Maps, Client Name Communication Plan, Jul. 17, 1999.

Sage research methods online: "A Study of Airlines' Online Reservation Services on the Internet", Journal of Travel Research Nov. 2000 vol. 39 No. 2 202-211 downloaded from http://jtr.sagepb.com/content/39/2/202.abstract (1 of 4) [Nov. 26, 2010 6:36:35 PM].

Selmer, Morten et al. "Project Document for Billetbestillings-system", Nordisk Film Biografer, Project running from Aug.-Nov. 1998, from http://www.theill.com/publications/billetbestilling.pdf.

Selmer, Morten et al. "Project Document for Billetbestillingssystem" (translation) Ticket Booking System, Nelles Translations—certification dated Dec. 7, 2010 in color.

Selmer, Morton et al. "Project Document for Billetbestillingssystem" (translation) Ticket Booking System, Nelles Translations—certification dated Dec. 7, 2010.

Shapiro, et al.: "FareBrowser: An Interactive Visualization Tool for Finding Low Airline Fares", modified Nov. 30, 1999 downloaded from http://www.cs.umd.edu/hcil/academics/courses/fall1999/cmsc838s/Project/billshap/ (1 to 15) [Nov. 26, 2010 6:35:03 PM].

Source Ticket Systems 1992.

Sun Microsystems: "The Java Develpoment Kit", Sun Microsystems, Inc., 1994-97—file://C:\_DTH/jdk1.1.2\indes.html.

Sun Microsystems: Volume in drive C is SYSTEM, Volume Serial Number is 8844-2C25, Directory of C:/_DTH?jdk1.1/docs/api—java htmls printed out.

Swanson, James, "Mouseover Mappings", Journal of the North American Cartographic Information Society, Winter 1997, pp. 46-47.

Swanson, James, Mouseover Mappings, Winter 1997 Journal of the North American Cartographic Information Society.

Symanzik, et al.: "Recent Developments for Interactive Statistical Graphics on the Web Using 'NVIXN'", 2002 Proceedings, American Statistical Association.

(56) References Cited

OTHER PUBLICATIONS

Synchro Systems Homepage, "VenueMaster" http://web.archive.org/web/19991007015705/http://www.synchro.co.uk/ (1 of 3) [Nov. 26, 2010 1:12:28 AM].
Synchro Systems Homepage, Indroduction, http://web.archive.org/web/19991007015705/http://www.synchro.co.uk/ (1 of2) [Nov. 26, 2010 12:40:30 AM].
Synchro Systems Homepage, Introduction, http://web.archive.org/web/19991114093846/http://www.synchro.co.uk/ (1 of2) [Nov. 26, 2010 12:47:19 AM].
Synchro Systems Homepage, logo http://web.archive.org/web/19991007015705/http://www.synchro.co.uk/ (1 of2) [Nov. 26, 2010 12:46:27 AM].
TCI: Ticket & Box Office Software.(software for the theater industry) TCI, Dec. 1, 1998 http://222.accessmylibrary.com/coms2/summary_0286-9326414_T.
Tendenz: Einfach 7.1.1 bedienende Gerate ans Internet hangen, Computerwoche, vol. 35, Aug. 29, 1997, Computerwoche, vol. 35, Aug. 29, 1997, Computerwoche.
The Java Development Kit, Version JDK 1.1.2—1997.
Thing L., The Web: towards 2001, Trends in Ecology and Evolution, 1997, vol. 12, Supplement, pp. 10-11.
Thompson, Linda, Travel Smart, Waikato Times, Jun. 1, 1998.
Ticketing Software, Box Office System, Printing Ticket Software. 1999-2011 SeatAdvisor Inc. Jul. 21, 2011. http://www.seatadvisor.com/.
Ticketless Travel Takes Flight at United Air ines, Jul. 27, 1995, USA Today, p. B1.
TicketMaster, "Your Seats Have Been Reserved", screen shot dated May 7, 1992 in color.
TicketMaster, Pacific Coliseum, screen shot of seating area in color.
TicketMaster, Pacific Coliseum, screen shot of seating area, at Ticket Kiosk in color.
TicketMaster, Queen Elizabeth Theatre, screen shot of stage area in color.
TicketNetwork, Inc. and Ticket Software, L.L.C. First Amended Answer to CEATS, Inc.'s First Amended Complaint, dated Aug. 5, 2010.
Tickets.com's Answer and Counterclaims to CEATS, Inc.'s First Amended Complaint, dated Jul. 26, 2010.
Tickets.com's First Amended Answer and Counterclaims to CEATS, Inc.'s First Amended Complaint, dated Aug. 20, 2010.
Tickets.com's Response to CEATS, Inc.'s Motion to Dismiss Counterclaims and Corresponding Affirmative Defenses, dated Sep. 17, 2010.
TicketsNow.com Inc.'s First Amended Answer and Counterclaims to CEATS, Inc.'s First Amended Complaint, dated Aug. 4, 2010.
TicketsNow.com, Inc.'s Answer and Counterclaims to CEATS, Inc.'s First Amended Complaint, dated Jul. 26, 2010.
TicketsNow.com, Inc.'s Second Amended Answer and Counterclaims to CEATS, Inc.'s First Amended Complaint, dated Aug. 6, 2010.
Tomlinson, Roger: "Synchro, The Company—The operation", Arts Marketing Association, Cambridge, UK, copyright 2003—http://www.a-m-a.co.uk/audiences_old/synchro.asp (1 of 2) [Nov. 26, 2010 6:56:13 PM].
Trask, Simon, Beatnik takes to the information superhighway, ProSound News Europe, Mar. 1997, pp. 32.
U.S. Appl. No. 08/354,267, filed Oct. 25, 1993 to Malamud, et al., File History.
United Air Lines, Inc.'s Answer and Counterclaims to CEATS, Inc.'s First Amended Complaint, dated Jul. 22, 2010.
United Air Lines, Inc.'s First Amended Answer and Counterclaims to CEATS, Inc.'s First Amended Complaint, dated Aug. 4, 2010.
United Air Lines, Inc.'s Second Amended Answer and Counterclaims to CEATS, Inc.'s First Amended Complaint, dated Aug. 6, 2010.
United Connection 2.0 User Manual 1995 in color.
United Connection 2.0 User Manual 1995.

US Airways' Amended Invalidity Contentions and Other Defendants' Amended Joint Supplemental Invalidity Contentions, Dated Jan. 28, 2011.
US Airways' invalidity Contentions and Other Defendants' Supplemental Joint Invalidity Contentions, Dated Jan. 28, 2011.
US Airways' Second Amended Invalidity Contentions and Other Defendants' Second Amended Joint Supplemental invalidity Contentions, Dated Jan. 28, 2011.
Variety: "Boxoffice Managers Conference Views Computer, Cable Growth, But People Still Vital in Selling", Variety, Auditorium-Arena, Wednesday, Feb. 1, 1984.
Virgin America, Inc.'s Answer to Counterclaims to CEATS, Inc.'s First Amended Complaint, dated Jul. 22, 2010.
Virgin America, Inc.'s First Amended Answer and Counterclaims to CEATS, Inc.'s First Amended Complaint, dated Aug. 4, 2010.
Virgin America, Inc.'s Second Amended Answer and Counterclaims to CEATS, Inc.'s First Amended Complaint, dated Aug. 6, 2010.
W3C, HTML 4.01 Specification, Aug. 24, 2009, <URL: http://www.w3.org/TR/1999/PR-html40-19990824/html40.pdf>.
Walker, David, A welcoming site; Web Mechanic, Sydney Morning Herald, Oct. 6, 1998, Issue Late edition, pp. 9, Australia.
Watanabe, "Basic Knowledge of Railway Electrical Systems", (16), No. 3 Article Serial No. 0016, Railway and Electrical Engineering, Mar. 1999, vol. 10.
Wise, A, Interactive learning aided by JavaScript, ALT-J, 1999, vol. 7, Issue 2, pp. 46-56.
Zaff, David: "Western Region 'Total Forecast' and Graphical Watch/Warning Displays Via the Internet", Western Region Technical Attachment No. 99-03, Mar. 2, 1999—http://www.wrh.noaa.gov/wrh/99TAs/9903/indes.html [Nov. 25, 2010 [7:25:17 AM].
Claudius, Michael, "Examination Before Trial", dated Dec. 1, 2011. *Re Ceats v. Continental.*
Theill, Peter, "Examination Before Trial", dated Dec. 1, 2011. *Re Ceats v. Continental.*
Transcript of Markman and Motion Hearing, dated Jul. 14, 2011. *Re Ceats v. Continental.*
*Ceats v. Zillow, Inc.*, No. 6:12-cv-00082, Complaint filed Feb. 23, 2012.
Microsoft Computer Dictionary, Fourth Edition, p. 270 liquid crystal display to Live3D—1999.
Merriam-Webster's Collegiate Dictionary, Tenth Edition, pp. 680, 853, 854—1999.
ATTDEV_VSS-Visual SourceSafe Explorer,screen shot—1999.
PC The Top 100 Web Sites, 2 pages.
Sloan, Gene: "Microsoft's travel Web site up to speed", USA Today, Friday, May 9, 1997.
Applegate, et al.: "American Express Interactive", Corporate Information Strategy and Management, Text and Cases, Sixth Edition 2003.
Sottili, et al.: "Fare Game", The Washington Post, Dec. 14, 1997; p. E01.
Micronews Article: "Expedia Helps You Get the Best Deals on Leisure Travel", Oct. 4, 1996, from http://www.sorayab.com.
Stoltz, Craig: "Nothing But Net: The Rundown on Travel-Booking Sites on the Web", The Washington Post, Sep. 13, 1998.
Evans, Judith: "Online Travel Firms Organize to Defend Niche", The Washington Post, Jun. 15, 1998; p. F16.
Kirchner, Jake: "The Best of 1997", PC Magazine, Jan. 1998.
Fish & Richardson Library Services, Literature Search re travel. Literature search performed in Dialog (a product of ProQuest), search performed Sep. 1, 2011 in 30 pages.
McNulty, Mary Ann: "Amex Signs 100th AXI Customer, Speeds Rollouts", Business Travel News, Issue 407, Jun. 22, 1998.
Rosen, Cheryl: "Corp. Starts Agency. . . As Does Microsoft", Business Travel News, Issue 359, Oct. 28, 1996.
Northwest Airlines article: "New Technology Builds Revenues, Enhances Customer Convenience, Reduces Costs", Building Better Customer Service re 1997-1998 sales, one page.
Girishankar, Saroja: "American Express Online Travel Service Flies High", The Networking Newspaper, Dec. 1, 1997, cover and pp. 7, 15.
American Express, American Express pilots AXI in the UK. M2 Presswire, Aug. 17, 1998—3 pages.

(56) References Cited

OTHER PUBLICATIONS

MCI Spotlights Customer Networking Solutions at Networld ± Interop; American Express, The Weather Channel and AgriBank Headline the Show, PR Newswire, Oct. 9, 1997.
Reinders, et al.: "The Future for Direct Retailing of Travel and Tourism Products: The Influence of Information Technology", Prog. Tourism Hospit. Res. 4, 1-15 (1998).
Rosen, Cheryl: "Beta Tests on Amex-Microsoft Booking Tool", Business Travel News, Jun. 23, 1997 (2 pages).
Vallet, Nicolas: "The Seat Map Project", Professional Thesis Report, Multimedia Communications Eurecom Institute, Jun. 1998, 39 pages.
International Directory of Company Histories, vol. 58, 2004 (7 pages).
Cho, et al.: "Cyberspace Hospitality: Is the Industry Ready?", Educator, Council on Hotel, Restaurant & Institutional Education, Fall 1995/vol. 7, No. 4.
Earn Up to 20,000 Bonus Miles and Enter to Win an International Trip for Two!, PR Newswire Mar. 9, 1998 (3 pages).
Expedia.com Travel Programs Generate More Than $1 Million in Revenues for Program Participants and Add New Members, PR Newswire, Apr. 2, 1998 (3 pages).
Fox, Linda: "Microsoft's Expedia to be 'top on-line travel service'", Travel Trade Gazette UK & Ireland, Nov. 11, 1998 pNA (1 page).
Kong, Deborah: "Microsoft to Sell Minority Stake in Online Travel Services", Knight-Ridder Tribune Business News, 1999 (2 pages).
Kornik, Joseph: "Expedia overhaul adds more content, set selection to site", Travel Weekly, May 22, 1997, v.56, n40, p. 22(1) (2 pages).
Kornik, Joseph: "Microsoft launches accredited on-line travel agency", Travel Weekly, Oct. 24, 1995, v.55, n85,p. 37(1) (1 page).
Kornik, Joseph: "Microsoft touts on-line agency in mainstream consumer press", Travel Weekly, Nov. 21, 1996, v.55, n93, p. 1(2) (2 pages).
Kornik, Joseph: "Milestone for Expedia: $1M in sales in 7 days; airline fare are sparks flurry of reservation", Travel Weekly, Mar. 10, 1997, v.56, n19, p. 33(1) (1 page).
Laschever, A.: "Have Modem, Will Travel", After Hours, The Personal Side of Technology, PC Magazine Aug. 2000.
Microsoft Enters Agreement With Pegasus Systems for Internet Hotel Booking Services, PR Newswire, Nov. 7, 1997 (3 pages).
Quinlan, Michael: "Expedia Challenge", Travel Agent, Aug. 16, 1999 (4 pages) (submitted in two parts).
"100 Rising Stars, Meet the Future Leaders of the Travel Industry", Travel Agent—Third Annual Bonus Issue, Apr. 29, 1999, (4 pages).
American Express and Microsoft Unveil Online Travel Reservations Systems for Corporations, News Press Release, Jul. 14, 1997—(2 pages).
IEEE Standard Glossary of Computer Hardware Terminology, IEEE std 610.104994 (108 pages).
"Introducing Microsoft Expedia online travel services", add in The Wall Street Journal, Friday, Nov. 15, 1996, p. B15 (2 pages).
Microsoft Expedia and Continental Airlines to Give Away 1 Million Frequent Flier Miles, 611 Microsoft News Center, Feb. 26, 1997.
Weekly Sales Hit on Expedia $1 Million, Microsoft News Center, Feb. 24, 1997.
Continental Airlines Selects Microsoft Internet Explorer 3.0 for Corporate Intranet, Microsoft News Center, Feb. 5, 1997.
Microsoft Expedia Reaches New E-Commerce Milestone With $12 Million in Sales for Jan. 1998, Microsoft News Center, Feb. 12, 1998.
Microsoft Expedia.com Launches Associates Program, Microsoft News Center, Feb. 11, 1998.
Microsoft Online Sites With Acclaim in Industry Ratings, Microsoft News Center, Feb. 9, 1998.
Take Your Friends on a Trip to Acapulco!, Microsoft News Center, Feb. 5, 1998.
Six Romantic Trip Tips to Plan the Perfect Valentine's Day Getaway, Microsoft News Center, Feb. 4, 1998.
Spring Vacation Bargains Abound for the Last-Minute Traveler, Microsoft News Center, Mar. 23, 1998.
Expedia.com Wins Top Honors for Editorial Content and Ease of Use, Microsoft News Center, May 14, 1998.
Microsoft Corp., and InfoSpace Inc. announce that the companies have signed a distribution agreement, Microsoft News Center, Jul. 21, 1998.
What One Lucky Visitor Will Win, Microsoft News Center, Jul. 14, 1998.
What's New, vol. 1, Issue 4—vol. 1, Issue 3, Microsoft News Center, Sep. 1998 and Aug. 10, 1998.
Cahners Gains Worldwide Exclusive Contract to Supply Hotel Information and Advertising Sales Support to New Initiative, Microsoft News Center, Aug. 6, 1998.
American Express to Become Featured Card on Expedia.com, Microsoft News Center, Sep. 29, 1998.
Sales Soar Beyond $350 Million in Less Than Two Years, Microsoft News Center, undated.
Momentum of MSN Continues With Updated Release of Award-Winning Online Travel Services, Microsoft News Center, Oct. 19, 1998.
Microsoft Expedia.com Bring a Friend for $99 Promotion Details, Microsoft News Center, 628 Oct. 12, 1998.
Ten Days in Australia for $1,198, Microsoft News Center, Oct. 1998.
Give Travel as a Gift—Promotion, Microsoft New Center, Nov. 16, 1998.
New Sites to Offer Locally Relevant Booking and Planning Services, Microsoft News Center, Nov. 12, 1998.
New Deals Boost Web Presence of Expedia and Improve Travel Offerings on Popular Web Sites, Microsoft News Center, Nov. 3, 1998.
Expedia's "Deals" Section Benefits Both Travel Suppliers and Consumers, Microsoft News Center, Jan. 11, 1999.
MSN Expedia Reports Record Sales and Growth for 1998, Microsoft News Center, Jan. 5, 1999.
Expedia Express, 1998 Highlights, Microsoft News Center, January, vol. 1, Issue 8.
Expedia Express, Feb. 1999, vol. 1 Issue 9, Microsoft News Center.
MSN Expedia Inks Largest Hotel Advertising and Co-Marketing Buys on the Internet, Microsoft News Center, Mar. 29, 1999.
MSN Expedia Expands its Travel Marketplace, Mar. 29, 1999.
American Express and Microsoft Form Alliance to Provide Internet/Intranet Travel Services, Microsoft News Center, Jul. 29, 1996.
Microsoft to Offer Truly Interactive Web-Zine Featuring Travel Adventures, Microsoft News Center, Jul. 17, 1996.
Microsoft Taps Shandwick to Drive Interactive Media Division PR, Microsoft News Center, Sep. 19, 1996.
Microsoft Expedia Travel Services Debuts on the Web, Microsoft News Center, Oct. 22, 1996.
MSN Expedia Wins PC Magazine's Editor's Choice Award for Best Leisure Travel Site, Microsoft News Center, Mar. 23, 1999.
Microsoft Expedia Brings Internet Travel Services to Canada, Microsoft News Center Apr. 2, 1997.
Exciting New Features Now Available on Microsoft Expedia, Microsoft News Center May 5, 1997.
Grab Your Chance to Fly Around the World, Microsoft News Center, Jul. 31, 1997.
Buy Your Next American Airlines Ticket on MSN Expedia, Get the Next at Half Off, Microsoft News Center, Mar. 22, 1999.
Microsoft Expedia Travel Service to Be Premier Provider of Active Channel Content for Microsoft Internet Explorer 4.0, Microsoft News Center, Oct. 1, 1997.
Microsoft Expedia.com Offers Exclusive Low Prices on Vacation Pacakages Online, Microsoft News Center, Nov. 6, 1997.
Microsoft Expedia.com Adds Online Mapping and Vacation Packages, Microsoft News Center, Nov. 6, 1997.
MSN Expedia and MaxMiles Join Forces to Save Travelers Time, Microsoft News Center, Mar. 22, 1999.
Expedia.com Offers Consumers One-Stop Online Travel Shopping, Microsoft News Center, Jan. 27, 1998.
Expedia.com Reaches New E-Commerce Milestone With $12 Million in Sales for Jan. 1998.
Expedia, Inc., Company History.

(56) References Cited

OTHER PUBLICATIONS

Microsoft Expedia.com and Lufthansa German Airlines Announce the Ultimate Destination Sweeptstakes and Miles & More Bonus Offer, Microsoft News Center, Mar. 9, 1998.
Microsoft Takes Equity Stake in VactionSpot Parent Company Rezworks, Microsoft News Center, Apr. 27, 1998.
Expedia Travel Network and Expedia Associates Program Show success in First Two Months, Microsoft News Center, Apr. 2, 1998.
KLM Is First International Licensee and Fifth Licensee Overall of the Platform to Streamline Travel-Booking Capabilities for Consumers, Microsoft News Center, Apr. 2, 1998.
Expedia Express—Mar. 1999, vol. 1 Issue 10, Microsoft News Center.
MSN Expedia Hits Record $16 Million in Weekly Sales, Microsoft News Center, Apr. 14, 1999.
Expedia Express—Apr. 1999, vol. 1, Issue 11, Microsoft News Center.
MSN Expedia Broadens Travel Marketplace With Launch of Business Travel Section, Microsoft News Center, May 25, 1999.
Travelers Who Use MSN Expedia to Book a Night at Any Participating Starwood Hotel or Resort Get Half Off Up to Five Nights on a Future Stay, Microsoft News Center, Nov. 24, 1999.
MSN Expedia Brings Online Travel to the Airwaves Via Innovative Radio Program, Microsoft News Center, Jun. 23, 1999.
Expedia Express—Jun. 1999, vol. 2, Issue 1, Microsoft News Center.
Expedia.com Breaks New Ground in Online Travel, Microsoft News Center, Jul. 26, 1999.
Expedia.com Leads the Way in Online Travel Boom, Microsoft News Center, Jul. 26, 1999.
Expedia.com Solidifies Leadership Position in Online Travel Industry, Microsoft News Center, Jul. 21, 1999.
Expedia Express—Jul. 1999, vol. 2, Issue 2, Microsoft News Center.
*Ceats v. Continental*, No. 6:10-cv-120 Led, Verdict Form filed Mar. 21, 2012.
Expedia.com SQ-e Travel Video Demo Screenshot.
Expedia.com Applet Viewer Video Demo Screenshot.
*Ceats, Inc. v, Expedia, Inc.* No. 6:12-cv-0097, Complaint filed Feb. 27, 2012.
*Ceats v. Continental*, No. 6: 10-cv-120 Led, Verdict Form filed Mar. 21, 2012.
Ceats' Renewed Motion for Judgment as a Matter of Law of Non-Invalidity or, Alternatively, for a New Trial, *Ceats, Inc. v. Continental Airlines, Inc.*, Civil Action No. 6:10-cv-120 LED, filed Apr. 18, 2012.
Defendant Alaska Airlines, Inc.'s Renewed Motion for Judgment as a Matter of Law on Non-Infringement of the Patents-In-Suit, *Ceats, Inc. v. Continental Airlines, Inc.*, Civil Action No. 6:10-cv-120 LED, filed Apr. 24, 2012.
Defendant JetBlue Airways Corporation's Renewed Motion for Judgment as a Matter of Law on Non-Infringement of the Patents-In-Suit, *Ceats, Inc. v. Continental Airlines, Inc.*, Civil Action No. 6:10-cv-120 LED, filed Apr. 24, 2012.
Defendants' Renewed Motion for Judgment as a Matter of Law, *Ceats, Inc. v. Continental Airlines, Inc.*, Civil Action No. 6:10-cv-120 LED, filed Apr. 24, 2012.
Defendants' Opposition to Plaintiff's Renewed Motion for Judgment as a Matter of Law of Non-Invalidity or, Alternatively, for a New Trial, *Ceats, Inc. v. Continental Airlines, Inc.*, Civil Action No. 6:10-cv-120 LED, filed May 21, 2012.
Docket Sheet for case *Ceats, Inc. v. Contintental Airlines, Inc.*, Civil Action No. 6:10-cv-120 LED, U.S. District Court, Eastern District of Texas, May 23, 2012 (submitted in two parts).
Screenshots depicting a seat selection from videos DX-001 through DX-011 produced during trial, *Ceats, Inc. v. Continental Airlines, Inc.*, Civil Action No. 6:10-cv-120 LED, video DX-001 dated Jan. 6, 1997, video DX-002 dated Jan. 7, 1997, video DX-003 dated Jan. 7, 1997, video DX-004 dated Jan. 8, 1997, video DX-005 dated Mar. 20, 1997, video DX-007 dated Mar. 20, 1997, video DX-008 dated Mar. 20, 1997, video DX-009 dated Mar. 20, 1997, video DX-010 dated Mar. 21, 1997, and video DX-011 dated Mar. 21, 1997.
Screenshots depicting a mouse over from videos DX-001 through DX-011 produced during trial, *Ceats, Inc. v. Continental Airlines, Inc.*, Civil Action No. 6:10-cv-120 LED, video DX-001 dated Jan. 6, 1997, video DX-002 dated Jan. 7, 1997, video DX-003 dated Jan. 7, 1997, video DX-004 dated Jan. 8, 1997, video DX-005 dated Jan. 8, 1997, video DX-006 dated Mar. 20, 1997, video DX-007 dated Mar. 20, 1997, video DX-008 dated Mar. 20, 1997, video DX-009 dated Mar. 20, 1997, video DX-010 dated Mar. 21, 1997, and video DX-011 dated Mar. 21, 1997.
Screenshots depicting a credit card payment from videos DX-001 through DX-011 produced during trial, *Ceats, Inc. v. Continental Airlines, Inc.*, Civil Action No. 6:10-cv-120 LED, video DX-001 dated Jan. 6, 1997, video DX-002 dated Jan. 7, 1997, video DX-003 dated Jan. 7, 1997, video DX-004 dated Jan. 8, 1997, video DX-005 dated Jan. 8, 1997, video DX-006 dated Mar. 20, 1997, video DX-007 dated Mar. 20, 1997, video DX-008 dated Mar. 20, 1997, video DX-009 dated Mar. 20, 1997, video DX-010 dated Mar. 21, 1997, and video DX-011 dated Mar. 21, 1997.
Screenshots depicting a credit card payment from videos DX-001 through DX-011 produced during trial, *Ceats, Inc. v. Continental Airlines, Inc.*, Civil Action No. 6:10-cv-120 LED, video DEX-001 dated Jan. 6, 1997, video DX-002 dated Jan. 7, 1997, video DX-003 dated Jan. 7, 1997, video DX-004 dated Jan 8, 1997, video DX-005 dated Jan. 8, 1997, DX-006 dated Mar. 20, 1997, video DX-007 dated Mar. 20, 1997, video DX-008 dated Mar. 20, 1997, video DX-009 dated Mar. 20, 1997, video DX-010 dated Mar. 21, 1997, and video DX-011 dated Mar. 21, 1997.
Screenshots depicting an "E-Ticket" From videos DX-001 through DX-011 produced during trial, *Ceats, Inc. v. Continental Airlines, Inc.*, Civil Action No. 6:10-cv-120 LED, video DX-001 dated Jan. 6, 1997, video DX-002 dated Jan. 7, 1997, video DX-003 dated Jan. 7, 1997, video DX-004 dated Jan. 8, 1997, video DX-005 dated Jan. 8, 1997, video DX-006 dated Mar. 20, 1997, video DX-007 dated Mar. 20, 1997, video DX-008 dated Mar. 20, 1997, video DX-009 dated Mar. 20, 1997, video DX-010 dated Mar. 21, 1997, and video DX-011 dated Mar. 21, 1997.
Screenshots depicting a purchase confirmation from videos DX-001 through DX-011 produced during trial, *Ceats, Inc. v. Continental Airlines, Inc.*, Civil Action No. 6:10-cv-120 LED, video DX-001 dated Jan. 6, 1997, video DX-002 dated Jan. 7, 1997, video DX-003 dated Jan. 7, 1997, video DX-004 dated Jan. 8, 1997, video DX-005 dated Jan. 8, 1997, video DX-006 dated Mar. 20, 1997, video DX-007 dated Mar. 20, 1997, video DX-008 dated Mar. 20, 1997, video Dx-009 dated Mar. 20, 1997, video DX-010 dated Mar. 21, 1997, and video DX-011 dated Mar. 21, 1997.
Screenshots depicting an itinerary from videos DX-001 through DX-011 produced during trial, *Ceats, Inc. v. Continental Airlines, Inc.*, Civil Action No. 6:10-cv-120 LED, video DX-001 dated Jan. 6, 1997, video DX-002 dated Jan. 7, 1997, video DX-003 dated Jan. 7, 1997, video DX-004 dated Jan. 8, 1997, video DX-005 dated Jan. 8, 1997, video DX-006 dated Mar. 20, 1997, video DX-007 dated Mar. 20, 1997, video DX-008 dated Mar. 20, 1997, video DX-009 dated Mar. 20, 1997, video DX-010 dated Mar. 21, 1997, and video DX-011 dated Mar. 21, 1997.
Transcript produced during trial, *Ceats, Inc. v. Continental Airlines, Inc.*, Civil Action No. 6:10-cv-120 LED, video DX-001 dated Jan. 6, 1997.
Transcript produced during trial, *Ceats, Inc. v. Continental Airlines, Inc.*, Civil Action No. 6:10-cv-120 LED, video DX-002 dated Jan. 7, 1997.
Transcript produced during trial, *Ceats, Inc. v. Continental Airlines, Inc.*, Civil Action No. 6:10-cv-120 LED, video DX-003 dated Jan. 7, 1997.
Transcript produced during trial, *Ceats, Inc. v. Continental Airlines, Inc.*, Civil Action No. 6:10-cv-120 LED, video DX-004 dated Jan. 8, 1997.
Transcript produced during trial, *Ceats, Inc. v. Continental Airlines, Inc.*, Civil Action No. 6:10-cv-120 LED, video DX-005 dated Jan. 8, 1997.
Transcript produced during trial, *Ceats, Inc. v. Continental Airlines, Inc.*, Civil Action No. 6:10-cv-120 LED, video DX-006 dated Mar. 20, 1997.

(56) References Cited

OTHER PUBLICATIONS

Transcript produced during trial, *Ceats, Inc. v. Continental Airlines, Inc.*, Civil Action No. 6:10-cv-120 LED, video DX-007 dated Mar. 20, 1997.
Transcript produced during trial, *Ceats, Inc. v. Continental Airlines, Inc.*, Civil Action No. 6:10-cv-120 LED, video DX-008 dated Mar. 20, 1997.
Transcript produced during trial, *Ceats, Inc. v. Continental Airlines, Inc.*, Civil Action No. 6:10-cv-120 LED, video DX-011 dated Mar. 21, 1997.
Email from Brian Emanuels produced during trial, *Ceats, Inc. v. Continental Airlines, Inc.* Civil Action No. 6:10-cv-120 LED, sent May 2, 1997.
Microsoft Performance Review of Rodel Broas produced during trial, *Ceats, Inc. v. Continental Airlines, Inc.*, Civil Action No. 6:10-cv-120 LED, dated Jun. 11, 1997.
Document titled "Seat Map & Seat Selection Test Cases" produced during trial, *Ceats, Inc. v. Continental Airlines, Inc.*, Civil Action No. 6:10-cv-120 LED, updated Jun. 30, 1997.
Document titled "Microsoft Expedia Test Specification" produced during trial, *Ceats, Inc, v. Continental Airlines, Inc.*, Civil Action No. 6:10-cv-120 LED, updated Mar. 19, 1997.
Microsoft Expedia Flight Wizard screenshots produced during trial, *Ceats, Inc. v. Continental Airlines, Inc.*, Civil Action No, 6:10-cv-120 LED.
Microsoft Performance Reviews of Mark Rentz produced during trial, *Ceats, Inc. v. Continental Airlines, Inc.*, Civil Action No. 6:10-cv-120 LED, signed Jan. 24, 2001, Jul. 5, 2000, Jan. 30, 2000, Aug. 19, 1999, Mar. 8, 1999, Aug. 7, 1998, Feb. 4, 1998, and Mar. 3, 1997.
Document titled UI Group 1—Flight Wizard (EXP) produced during trial, *Ceats, Inc. v. Continental Airlines, Inc.*, Civil Action No. 6:10-cv-120 LED, last changed on Mar. 26, 1999.
Document titled "Microsoft Corporation Web Server Services Agreement" produced during trial, *Ceats, Inc. v. Continental Airlines, Inc.*, Civil Action No, 6:10-cv-120 LED, executed on Mar. 21, 1997.
Document titled "Amendment No. 1 to Microsoft Corporation License Agreement for Microsoft Travel Technology" produced during trial, *Ceats, Inc. v. Continental Airlines, Inc.*, Civil Action No. 6:10-cv-120 LED, executed on Jul. 9, 1998.
Microsoft Performance Reviews of Jeff Lubetkin produced during trial, *Ceats, Inc. v. Continental Airlines, Inc.*, Civil Action No, 6:10-cv-120 LED, signed Jul. 30, 1997, Aug. 5, 1998, Feb. 10, 1999, Aug. 13, 1999, and Jul. 21, 2000.
American Express Travel Related Services Memorandum produced during trial, *Ceats, Inc. v. Continental Airlines, Inc.*, Civil Action No. 6:10-cv-120 LED, dated Jul. 24, 1996.
Document titled "Agreement between Microsoft Corporation and American Express Travel Related Services Company, Inc." produced during trial, *Ceats, Inc. v. Continental Airlines, Inc.*, Civil Action No. 6:10-cv-120 LED, executed Jul. 25, 1996.
Letter to American Express Travel Related Services Company, Inc. produced during trial, *Ceats, Inc. v. Continental Airlines, Inc.*, Civil Action No. 6:10-cv-120 LED, dated May 15, 1998.
Document titled "Project Outline" produced during trial, *Ceats, Inc. v. Continental Airlines, Inc.*, Civil Action No. 6:10-cv-120 LED.
American Express Travel Related Services Memorandum produced during trial, *Ceats, Inc. v. Continental Airlines, Inc.*, Civil Action No. 6:10-cv-120 LED, dated Jan. 9, 1996.
American Express Travel Related Services Memorandum produced during trial, *Ceats, Inc. v. Continental Airlines, Inc.*, Civil Action No. 6:10-cv-120 LED, dated Jun. 4, 1996.
Email from John Fish produced during trial, *Ceats, Inc. v. Continental Airlines, Inc.*, Civil Action No. 6:10-cv-120 LED, sent Jun. 26, 1998.
Document titled "Continental Airlines: FlyContinental website update plan" produced during trial, *Ceats, Inc. v. Continental Airlines, Inc.*, Civil Action No. 6:10-cv-120 LED, written in 1997 per testimony given by Joseph Van Auken, Jr. during trial.
Document titled "Continental Enhancements" produced during trial, *Ceats, Inc. v. Continental Airlines, Inc.*, Civil Action No. 6:10-cv-120 LED, updated Jan. 13, 1998.
Document titled "Seat Pinpointer" produced during trial, *Ceats, Inc. v. Continental Airlines, Inc.*, Civil Action No. 6:10-cv-120 LED.
Document titled "Flight Wizard Screens" produced during trial, *Ceats, Inc. v. Continental Airlines, Inc.*, Civil Action No. 6:10-cv-120 LED, updated Feb. 16, 1998.
Document titled "Non Managed Business Travel Product" produced during trial, *Ceats, Inc. v. Continental Airlines, Inc.*, Civil Action No. 6:10-cv-120 LED.
Document titled "Introduction to MS Integrate" produced during trial, *Ceats, Inc. v. Continental Airlines, Inc.*, Civil Action No. 6:10-cv-120 LED.
Document titled "The Best Seat in the House is Just a Mouse Click Away" produced during trial, *Ceats, Inc. v. Continental Airlines, Inc.*, Civil Action No. 6:10-cv-120 LED, dated Jan. 24, 1999.
Document titled "PASSbook," version 2.4.1 produced during trial, *Ceats, Inc. v. Continental Airlines, Inc.*, Civil Action No. 6:10-cv-120 LED, dated Dec. 1, 1997 (submitted in five parts).
CQ Magazine produced during trial, *Ceats, Inc. v. Continental Airlines, Inc.*, Civil Action No. 6:10-cv-120 LED, Spring 1998 (submitted in four parts).
Continental Magazine article titled "Excellence on Display: Interactive Exhibit Wins Award" produced during trial, *Ceats, Inc. v. Continental Airlines, Inc.*, Civil Action No. 6:10-cv-120 LED, Oct. 1998.
Information Disclosure statement filed on Sep. 6, 2011 in U.S. Appl. No. 12/953,279 (transmittal enclosed).
Information Disclosure statement filed on Jan. 31, 2012 2011 in U.S. Appl. No. 12/953,279 (transmittal enclosed).
Information Disclosure statement filed on Feb. 1, 2012 2011 in U.S. Appl. No. 12/953,279 (transmittal enclosed).
Information Disclosure statement filed on Feb. 6, 2012 2011 in U.S. Appl. No. 12/953,279 (transmittal enclosed).
Information Disclosure statement filed on Feb. 24, 2012 2011 in U.S. Appl. No. 12/953,279 (transmittal enclosed).
Information Disclosure statement filed on Mar. 16, 2012 2011 in U.S. Appl. No. 12/953,279 (transmittal enclosed).
Information Disclosure statement filed on Mar. 26, 2012 2011 in U.S. Appl. No. 12/953,279 (transmittal enclosed).
Information Disclosure statement filed on May 24, 2012 2011 in U.S. Appl. No. 12/953,279 (transmittal enclosed).
All About The GetThere.com, "About Internet GetThere.com", 1997-2001 GetThere LP, http://www.itn.com/cgi/get?itn/about.
*CEATS, Inc. v. Continental Airlines, Inc.*, CEATS' Motion for Judgement as a Matter of Law of Non-Invalidity or, Alternatively, for a New Trial, and Order, mailed Apr. 18, 2012.
Wardell, "Airline Reservation Systems a Report & Overview," Airline Reservation Systems, Jul. 1991.
*CEATS, Inc. v. Continental Airlines, Inc.*, Appeal from the United States District Court for the Easter District of Texas in No. 10-CV-1020, dated Apr. 26, 2013.
Wardell, "Electronic Distribution & Emerging Strategies," ©1998 by: David Wardell, pp. 1-17.
Wardell, "Airline reservation systems in the USA," Travel & Tourism Analyst, Jan. 1987, The Economist Publications Limited, pp. 45-56.
Mastering the Basics, 1998, The Select institute, produced as ORBART 874-901.
HTML The Definitive Guide, 1996, produced as ORBART 4611-4730.
Continental expands E-ticket product; Introduces travel agency access, Sep. 26, 1995, Business Wire http://www.thefreelibrary.com/business+wire/1995/september/26-p53, produced as ORBART 4334-4339.
Synchro Systems Company Information, Nov. 26, 2010, produced as ORBART 4886-4887.
MS, American Express go on the road, Jul. 1996, Bloomberg Business News-http://articles.baltimoresun.com/1996-07-30/business/1996212075_1_inernet-travel-network-american-express-microsoft, produced as ORBART 11157-11158.

(56) References Cited

OTHER PUBLICATIONS

Microsoft, American Express hook up Reservation system formed for corporate travelers, Jul. 1996, Bloomberg Business News-http://articles.baltimoresun.com/1996-07-30/business/1996212075_1_internet-travel-network-amencan-express-microsoft, produced as ORBART 11160-11161.
Employers, Agents, turn to Computers to Make Travel Easier, Aug. 1996, Tom Belden, Inquirer staff Writer—http://articles.philly.com/1996-08-19/business/25644504_1_travel-managers-big-travel-agendes-national-business-travel-association, produced as ORBART 11165-11166.
Online Travel Takes Off, Oct. 1996, Jeff Peline-CNET—http://news.cnet.com/online-travel-takes-off/2100-1023_3-240236.html, produced as ORBART 11169-11172.
Monsanto to test Rome as Part of travel redesign, Mar. 1997, Mary Ann McNulty-Business Travel News, produced as ORBART 13087-13089.
Amexco's AXI Self-Booking Product Makes Debut to Trade, Jul. 1997, Isae Wada and David Jones, produced as ORBART 13120-13122.
Tripping out on the Web: Amex and Microsoft, Aug. 1996, The Economist, produced as ORBART 15608-15609.
American Express Interactive (AXI), Jun. 2003, Jin Park, produced as ORBART 15610-15616.
American Express Interactive, Dec. 2001, Lynda Applegate—Harvard Business School, produced as ORBART 15617-16517.
Assign Your own Seat, Sep. 1995, The Buffalo News, produced as ORBART 9891.
Net Travel, 1996, Mary Goodwin Kristin Miller, Shaun Witten, produced as ORBART 9940-10355.
Tourism Development, 1996, William Gartner, produced as ORBART 10609-11148.
Low Cost Booking Software, May 1996, Cheryl Rosen, Business Travel News, produced as ORBART 11151-11152.
Select Ticketing is the World Leader in Electronic Ticket sales, Oct. 1996, The Business Journal, produced as ORBART 11175-11178.
E-Commerce and V-Business: Business Models for Global Success, 2001, Stuart Barnes and Brian Hunt, produced as ORBART 15289-15289.
RSA Tools Follow Set Standard, Nov. 1996, CNET News, produced as ORBART 15639-15643.
SET Secure Electronic Transaction Specification Book 1: Business Description, May 1997, produced as ORBART 15644-15723.
SET Secure Electronic Transaction Specification Book 2: Business Description, May 1997, produced as ORBART 15724-16352.
SET Secure Electronic Transaction Specification Book 3: Business Description, May 1997, produced as ORBART 16353-16614.
External Interface Guide to SET Secure Electronic Transaction, Sep. 1997, produced as ORBART 16615-16732.
SET Standard Inches Forward, Jan. 1997, CNET News, produced as ORBART 16733-16737.
Information technology for Travel and Tourism-ISBN_0273602292.pdf, 1994, Gary Inkpen, produced as ORBART 9583-9885.
Use These Saavy Tactics to Avoid the Hassles of Modern Air Travel—The Buffalo News (Buffalo NY).pdf, Jan. 1995, Julie Moline, produced as ORBART 9886-9890.
Information and Communication Technologies in Tourism—ISBN_3211827986.pdf, Stefan Klein, Beat Schmid, A Min Tjoa, Hannes Werthner, produced as ORBART 10356-10604.
How to Plan Your Dream Vacation using the Web, 1997, Elizabeth Dempsey, produced as ORBART 0011187-11647.
International Travel and Tourism, 1997, Helle Sorensen, produced as ORBART 11648-12018.
The Travel Industry, 1997, Check Gee, James Makens, Dexter Choy, produced as ORBART 12330-12827.
Tips for the Savvy Traveler, 1997, Deborah Burns, produced as ORBART 12828-13086.
Show Focuses on Travel Overhauls, Mar. 1997, Cheryl Rosen and Mary Ann McNulty-Business Travel News, produced as ORBART 13090-13093.
Software emerges to Make Travel Itineraries on Internet, Jun. 1997, Tom Belden, produced as ORBART 13115-13116.
Software lets Travelers Book it, Jul. 1997, Tom Belden, produced as ORBART 001312-13125.
Information technology for Travel and Tourism, 1998, Gary Inkpen, produced as ORBART 13149-13866.
Face-Offs debut on TTW Stage, Oct. 1998, Business Travel News, produced as ORBART 001338-13945.
Electronic Information Distribution in Tourism and Hospitality, 1999, P O'Connor, produced as ORBART 13958-14140.
Internet Distribution of European Travel and Tourism Services, 1999, Carl Marcussen, produced as ORBART 14141-14442.
Internet Marketing for Your Tourism Business, 2000, Susan Sweeny, produced as ORBART 14447-15038.
Internet Resources for Leisure and Tourism, 2000, William Theobald and H.E. Dunsmore, produced as ORBART 15039-15288.
The Role of Global Computer Reservation Systems in the Travel Industry Today and in the Future.pdf, 1997, Axel Schulz, produced as ORBART 10605-10608.
Amadeus System on eClients will get Global Platform. Pdf, May 1996, Cheryl Rosen, produced as ORBART 11149.
Enter Microsoft. Pdf, Jul. 1996, Cheryl Rosen, produced as ORBART 11153-11156.
Travel Services are first online commerce offerings to fly.pdf, Jul. 1996, Lisa Nishimoto, produced as ORBART 11159.
Microsoft American Express in Online Deal-Los Angeles Times.pdf, Jul. 1996, Bloomberg Business News, produced as ORBART 11162.
United Connection Mouse.pdf, Oct. 1996, Inside Flyer, produced as ORBART 11167-11168.
Sabre—Interactive Seat Maps.pdf, Dec. 1996, Scott Alvis, produced as ORBART 11171183.
More Airlines Offer Online Tix.pdf, Dec. 1996, Business Travel News, produced as ORBART 11184.
American Express interactive.pdf, 1997, Christine Cox, produced as ORBART 11185-11186.
WORLDSPAN Introduces WORLDSPAN trip Manager Automated Trip Planning for the Corporate Traveler.pdf, May 1997, PR Newswire, produced as ORBART 13094-13096.
UNIGLOBE Travel Online offers first travel web site with High-Tech-High Touch support network.pdf, Jun. 1997, Susan Hetzler, produced as ORBART 13097-13098.
21st Century Travel Distribution System.pdf, Jun. 1997, George A. Smith, produced as ORBART 13099-13109.
Worldspan Debuts Business Travel System at TTW.pdf, Jun. 1997, Cheryl Rosen, produced as ORBART 13110-13114.
Airline information on-line on the internet FAQ—Google groups.pdf, Sep. 1997, John Levine, produced as ORBART 13126-13141.
Easy Travel Booking—AmEx and Microsoft Team Up on a New Corporate Travel Service—Black Enterprise. Pdf, Oct. 1997, Valerie Gray, Kenneth Miles, produced as ORBART 13142-13143.
It's no small world for ITN—Silicon Valley Business Journal.pdf, Oct. 1997, Lorna Fernandes, produced as ORBART 13144-13148.
Information Technology for Travel and Tourism—ISBN_0582310024.pdf, 1997, Gary Inkpen, produced as ORBART 13149-13548.
Traveling via the Web.pdf, Jan. 1998, Andrew Lee, produced as ORBART 13867-13891.
Amex Inks T&E Deal.pdf, Jan. 1998, Cheryl Rosen, produced as ORBART 13892-13895.
Microsoft Future.pdf, Jan. 1998, Steve Hamm, produced as ORBART 13896-13906.
Online travel arrangements begin to catch on.pdf, Mar. 1998, Howard Millman, produced as ORBART 13907.
New territory for Net travel—Net News.pdf, Apr. 1998, CNET News, produced as ORBART 13908-13911.
Microsoft—Is Your Company Its Next Meal.pdf, Apr. 1998, David Kirkpatrick, produced as ORBART 13912-13916.
Navigating Travel on the Web—CBS News.pdf, May 1998, Tiare Rath, produced as ORBART 0013917-13919.

(56) References Cited

OTHER PUBLICATIONS

American Express Simplifies speeds Up Reservations—Direct Marketing News.pdf, Jun. 1998, Nadine Kjellberg, produced as ORBART 13920-13922.
American Express Announces New Features in the Latest release of AXI Plus Accelerated Rollout.pdf, Jul. 1998, Business Wire, produced as ORBART 13923-13925.
Polaroid taps AXI Feature.pdf, Oct. 1998, Cheryl Rosen, produced as ORBART 0013930-13931.
AXI BTS Ready to Begin European Rollout Race, Oct. 1998, Amon Cohen, produced as ORBART 1393-13934.
Amex Acquires Travel One as it targets Mid-Market.pdf, Oct. 1998, Sarah Welt, produced as Orbart 13935-13937.
The E-Travel Revolution Over.pdf, Nov. 1998, Craig Stoltz, produced as ORBART 13946-13949.
Multiplicity of Internet services helps travelers click their way to paradise (travel)—The Boston Herald, Nov. 1998, Jarrett Liotta, produced as ORBART 13950-13953.
Booking Sites Grow But Where's Profit Chicago Tribune.pdf, Dec. 1998, Paul Grimes, produced as ORBART 13954-13957.
American Express announces New Online Trip-Planning Tools for AXI Travel(SM) Users.pdf, Jan. 1999, PR NEWSWIRE produced as ORBART 14443-14444.
Booklt! Is the Internet Booking Engine of Choice for Online Travel Reservations.pdf, Feb. 1999 produced as ORBART 0014445.
TripWeb—Online Travel Agency We offer online Reservations car rentals Hotels Cruiselines Passports & Visa Info, Feb. 1999 produced as ORBART 0014446.
Internet Resources for Leisure and Tourism ISBN_0750646446, 2000, William Theobald and H.E. Dunsmore, produced as ORBART 15039-15288.
VenueMaster/TicketMaster Welcome to the Synchro Systems—VenueMaster, produced as ORBART_0004238-4240, 1998.
VenueMaster/TicketMaster Welcome to the Synchro Systems Homepage, produced as ORBART_0004237, 1998.
VenueMaster/TicketMaster Welcome to the Synchro Systems Homepage—Intro, produced as ORBART_0004241-42, 1998.
VenueMaster/TicketMaster Welcome to the Synchro Systems Homepage Last Modified Jan. 12, 1998, produced as ORBART_0004235-4236, 1998.
VenueMaster/TicketMaster Venue Master Articles Full Text, produced as ORBART_0001215-1221, 1998.
E-Fares (Featured Fares)/Continental Airlines, 1998: E-Fares Site Archive produced as ORBART_0004936.
E-Fares (Featured Fares)/Continental Airlines, 1998: Agency Direct—Help Files produced as ORBART_0007629-49.
United Connection/United Airlines, 195-98: United Manual, produced as ORBART_0005607-5754.
United Connection/United Airlines, 195-98: Marketing brochure, produced as ORBART_0004448-4563.
American Express Interactive ("AXI"), Rome, and CO.O.L. Travel, 1996-2000: PR Newswire, "Exciting New Features Available on Microsoft's Expedia." See U.S. Patent 7,454,361 File History (Parent to the Patents-in-Suit).
American Express Interactive ("AXI"), Rome, and CO.O.L. Travel, 1996-2000: Information Technology for Travel and Tourism, produced as ORBART_0013149-13866.
Tick-It!/New Concepts Software, Inc., 1993: Ticket & Box Office Software, produced as ORBART_0007360-7416.
Tick-It!/New Concepts Software, Inc., 1993: Makers of Box Office and Point of Sale Software, produced as ORBART_0007419-21.
Tick-It!/New Concepts Software, Inc., 1993: Product Reviews—Tick-It @ 2K and the Web, produced ORBART_0007422-25.
Tick-It!/New Concepts Software, Inc., 1993: Product Reviews—Tick-It!, produced as ORBART_0007426-29.
Tick-It!/New Concepts Software, Inc., 1993: Datamax Software Resource Directory, produced as ORBART_0007430-624.
*Orbitz's Invalidity Contentions CEATS, Inc. v. Orbitz Worldwide Inc.*, Civil Action No. 2:13-cv-01385, dated Feb. 7, 2014.

\* cited by examiner

FIG. 5

Begin Program

```
<Markup language>
<REM --- Imports the file "datasource.inc" which creates variable "datasource" which is used to tell markup language datasource to connect to.  --->
<INCLUDE NAME="database\datasource.inc">
<REM--- In case a database or other type of error occurs, this display the error message. --->
<ERROR>
<FONT FACE="Verdana, Arial" SIZE="+1"><B>An Error Has Occurred</B></FONT><P> <FONT FACE="Verdana, Arial" SIZE="-1"><B>Error Message = :i_errortext </B></FONT><P>
<FONT FACE="Verdana, Arial" SIZE="-1"><B>database Error = :i_databaseerrortext</B></FONT><P>
<FONT FACE="Verdana, Arial" SIZE="-1"><B>database Error = i_databaseerrorstmt </B></FONT><P>
</ERROR>
<REM --- Begin normal markup language here   --->
<markup language>
<HEAD>
<TITLE>Ticketing & Reservation System</TITLE>
</HEAD>
<BODY BACKGROUND="images/background.jpg" TEXT="#000000" LINK="#006666" VLINK="#006666">
<CENTER>
<IMG SRC="images/masthead_concerts.gif" HEIGHT=60 WIDTH=280><P>
```

```
<FONT FACE="Verdana,Arial". SIZE=-1><B>To begin reserving your seat(s), please select
the concert date/time you wish to attend next to the performer you want to
see:</B></FONT>
<TABLE BORDER=0 CELLSPACING=5 CELLPADDING=5>
<REM --- Begin database query to retrieve all performances that is      --->
<REM --- currently available. Will loop until all available             --->
<REM --- performing artists and their performances are listed.          --->
<REM--- Part of the return from the query are the links that will       --->
<REM --- take you to the next step of the reservation.                  --->
        <database DBNAME=":datasource"
        database="SELECT id, name, picture, sequence
        FROM category
        WHERE active=1 AND parent=-1
        ORDER BY sequence"
        ALIAS="concert">
        <databaseFETCH ALIAS="concert">
        <WHILE NOTALIAS=i_databaseempty>
        <TR>
        <TO COLSPAN=2>
        <FONT FACE="Verdana,Arial" SIZE=+1><B>:concert_name</B></FONT>
        </TD></TR><TR><TD VALIGN="top">
        <img src=imagesLconcert_picture align=top border="1">
        </TD><TD>
        <Markup language DBNAME=":datasource"
            database="SELECT id, name, date, time
            FROM category
            WHERE active=1 AND parent=rconcert_id
            ORDER BY date, time"
            OUTPUT="<FONT FACE="Verdana,Arial" SIZE=-1><B>
```

```
            <A HREF='Reserve1.ihtml?&id=;1'>:2</A>
            </B></FONT><p>">
       </TD></TR><TR><TD COLSPAN=2><HR></TD></TR>
       <databaseFETCH ALIAS="concert">
       </WHILE ALIAS=i_databaseempty>
   </database ALIAS="concert">
   <'TABLE>
   </BODY>
   </markup language>
processing then passes to:
   <Markup language>
   <REM--- Imports the file "datasource.inc" which creates the          --->
   <REM --- variable "datasource" which is used to tell Markup language which   --->
   <REM --- database datasource to connect to.                  --->
   <INCLUDE NAME="database\datasource.inc">
   <REM In case a database or other type of error occurs, this will display the error message. >
   <ERROR>
   <FONT FACE="Verdana,Arial" SIZE="+1"><B>An Error Has Occurred</B></FONT><P>
   <FONT FACE="Verdana,Arial" SIZE="-1"><B>Error Message =
   :i_errortext</B></FONT><P>
   <FONT FACE="Verdana,Arial" SIZE="-1"><B>database Error =
   :idatabaseerrortext</B></FONT><P>
   <FONT FACE="Verdana,Arial" SIZE="-1"><B>database Error =
   :i_databaseerrorstmt</B></FONT><P>
   </ERROR>
   <REM --- Begin normal markup language here --- >
   <markup language>
   <HEAD>
   <TITLE>Ticketing & Reservation System - Select Seat(s)</TITLE>
```

FIG. 5 (CONT.)

```
</HEAD>
<REM --- All seats clicked will pass its information to a input box, "newseats". When done,
the information will be passed to "process.ihtml" and be processed by "reserve2.ihtml". --- >
<REM --- This code allows the ability to select multiple seats before proceeding to the next
step of reservation process. Other features include listing the selected seats in the
"number" text box to show the seats that has been clicked. This script also alters the button
text to be grammatically correct. --- >
<SCRIPT LANGUAGE="JavaScript">
<!--
function selectseat(idnum, seatnum)
{
reserved = document. seats. number. value;
if (reserved == "")
{
document. seats. newseats. value = "<Markup language DBNAME=:"+"datasource
database='INSERT INTO basket (custid, pid, qty) VALUES (:"+"custid, "+idnurn+",
1)'><database DBNAME=:"+"datasource database='SELECT cost FROM products WHERE
id="+idnum+"'><databaseFETCH><iEQ NAME='ticketprice' VALUE=:"+"1"></database><iEQ
NAME='total' VALUE=<iEVAL EXPR=:"+"ticketprice + :"+"total' PREC='2'>><Markup
language DBNAME=:"+" datasource database='INSERT INTO orderdetail (pid, aid, qty, sell)
VALUES ("+idnum+", :"+"oid, 1, :"+"ticketprice)'>";
document.seats.number.value = seatnum;
document. seats. button1. value = "Reserve Seat";
document.seats.button2.value = "Clear Choice";
}
else
{
document. seats.newseats. value += "<Markup language DBNAME=:"+"datasource
database='INSERT INTO basket (custid, pid, qty) VALUES (:"+"custid, "+idnum+",
```

```
1)'><database DBNAME=:"+"datasource database='SELECT cost FROM products WHERE
id="idnum+'"><databaseFETCH><iEQ NAME='ticketprice' VALUE=:"+"1></database><iEQ
NAME='total' VALUE=<iEVAL EXPR=':"+"ticketprice + :"+"total' PREC='2'>><Markup
language DBNAME=:"+"datasource database='INSERT INTO orderdetail (pid, old, qty, sell)
VALUES ("+idnum+", :"+"oid, 1, :"+"ticketprice)'>";
document.seats.number.value = reserved+", "+seatnum;
document.seats.button1.value = "Reserve Seats";
document.seats.button2.value = "Clear Choices";
}
}
function clear()
{
document.seats.newseats.value = '"';
}
//-->
</SCRIPT>
<BODY BACKGROUND="images/background.jpg" TEXT="#000000" LINK="#006666"
VLINK="#006666">
<REM --- Begin database query to retrieve the last id number from table "orderdetail" for the
purpose of creating a new instance of the stage image whenever a new order has occurred.
This will prevent the browser from displaying an old floor image from its cache as a different
image name is called every time the file is run. --- >
<database DBNAME=":datasource"
        database="SELECT max(id)
        FROM orderdetail">
        <databaseFETCH>
        <iEQ NAME="imagenum" VALUE=:1>
        <databaseFETCH>
</database>
```

FIG. 5
(CONT.)

```
<iEQ NAME="imagetype" VALUE=".jpg">
<CENTER>
<TABLE BGCOLOR=40000001 BORDER=0 CELLPADDING=5 CELLSPACING=0
WIDTH=500>
<TR><TD><CENTER>
<FONT FACE="Verdana,Arial" SIZE=+1 COLOR='#FFFFFF'><B>
Concert Reservation System
</B></FONT>
</CENTER>
</TD></TR></TABLE></CENTER><p>
<REM - Loads the core image that will be dynamically altered for use as the image map. - >
<iIMAGEFROMFILE NAME="stage" FILENAME="images/stage.jpg" TYPE="jpeg">
<MAP NAME="stage" BORDER=0>
<REM --- Begin database query to retrieve all seat information for the image map
"stage". Will loop until all available seat information for this particular performance is listed.    --->
<REM --- The return query will be used only if the "active" attribute of that particular seat is
marked "true" or "1".    --- >
<REM --- If active, the seat's information, including image map coordinates will be displayed.
Otherwise, the seat on the image map will be x'd out according to the x and y coordinates
associated with it.          --->
<database DBNAME=":datasource"
database="SELECT id, active, x, y, shape, corrds, name, mouseout, mouseover1,
mouseover2, mouseover3
        FROM products
        WHERE catid=:id">
        <databaseFETCH>
        <iWHILE NOTALIAS=i_databaseempty>
        <iEQ NAME="active" VALUE=:2>
        <iCASE ALIAS="active" VALUE=1>
```

FIG. 5 (CONT.)

```
<AREA SHAPE=":5" COORDS=":6" HREF="javascript:selectseat(:1,':7')" ALT="Seat # :7"
OnMouseOut=:8 OnMouseOver=:9 :7 :10 :7 :11 >
        </iCASE ALIAS="active">
        <iCASE ALIAS="active" VALUE=0>
        <iIMAGETEXT NAME="stage" TEXT="X" X=:3 Y=:4 COLOR="red">
        </iCASE ALIAS="active">
        <databaseFETCH>
        </iWHILE ALIAS=i_databaseempty>
</database>
</MAP>
<CENTER>
<FONT FACE="Verdana,Arial" SIZE="-1"><B>
Click on the seat you wish to reserve.
</B></FONT>
<TABLE BORDER=1 CELLPADDING=0 CELLSPACING=0>
<TR><TD>
<REM --- Converts the dynamically generated image, "stage", into a web friendly image type -
"jpeg".      --->
<iIMAGEWRITE NAME="stage" FILENAME="images/ch_stage-:id-:imagenum:"imagetype"
TYPE="jpeg" QUALITY="30">
<REM --- Deletes the temporary image "stage" as it is no longer needed. --- >
<iIMAGEDESTROY NAME="stage">
<IMG SRC="images/legend.jpg" BORDER=0 HEIGHT=20 WIDTH=584><BR>
<IMG SRC="images/ch_stage-:id-imagenum:imagetype" BORDER=0 USEMAP="#stage"
HEIGHT=315 WIDTH=584>
</CENTER>
</TD></TR></TABLE>
<FONT FACE='Verdana,Arial' SIZE=-1><B>
An "X" denotes a seat that has already been taken.
```

FIG. 5 (CONT.)

```
</B></FONT>
<FORM NAME="seats" ACTION="process.ihtml" METHOD="post">
<CENTER>
<TABLE BGCOLOR='#000000' BORDER=0 CELLPADDING=0 CELLSPACING=0>
<TR><TD>
<TABLE BGCOLOR='#FFFFFF' BORDER=0 CELLPADDING=5 CELLSPACING=1>
<TR><TD><CENTER>
<FONT FACE='Verdana,Arial' SIZE=-1><B>
Your mouse is over seat#: <INPUT TYPE="text" NAME="seatnum" SIZE=5>
</B></FONT></CENTER>
</TD></TR><TR><TD><CENTER>
<FONT FACE='Verdana,Arial' SIZE=-1><B>
Selected Seats:<BR><INPUT TYPE="text" NAME="number" SIZE=40>
<BR>
<INPUT TYPE="hidden" NAME="newseats" SIZE=50>
<INPUT TYPE="submit" NAME="button1" VALUE="Reserve Seat"> <INPUT
TYPE="reset" NAME="button2" VALUE="Clear Choice" onClick="clear()">
</B></FONT>
</CENTER>
</TD></TR></TABLE></TD></TR></TABLE></CENTER>
</FORM></CENTER></BODY>
</markup language>
```
which then passes to a template:
```
<Markup language>
<REM --- Imports the file "datasource.inc" which creates the variable "datasource" which is
used to tell Markup language which ODBC datasource to connect to.
<iINCLUDE NAME="database\datasource.inc">
<REM --- In case a database or other type of error occurs, this will display the error
message. - >
```

FIG. 5 (CONT.)

```
<ERROR>
<FONT FACE="Verdana,Arial" SIZE="+1"><B>An Error Has Occurred</B></FONT><P>
<FONT FACE="Verdana,Arial" SIZE="-1"><B>Error Message =
:i_errortext</B></FONT><P>
<FONT FACE="Verdana,Arial" SIZE="-1"><B>database Error =
:i_databaseerrortext</B></FONT><P>
<FONT FACE="Verdana,Arial" SIZE="-1 "><B>database Error =
:i_databaseerrorstmt</B></FONT><P>
</ERROR>
<REM--- Copy a preformatted file, "empty.ihtml" into a new file,      --- >
<REM --- "reserve2.ihtml".                                           --->
<iCOPYFILE SRC="empty.ihtml" DST="reserve2.ihtml>
<REM --- Appends the information passed from "reseve1.ihtml" to "reserve2.ihtml" for
process. Other html information is also passed.                      --->
<iFILE NAME="reserve2.ihtml" DATA=":newseats" OP="append">
<iFILE NAME="reserve2.ihtml" DATA="<INPUT TYPE='hidden' NAME='total'
VALUE=:total>" OP="append">
<iFILE NAME="reserve2.ihtml" DATA="</FORM>" OP="append">
<iFILE NAME="reserve2.ihtml" DATA="</CENTER>" OP="append">
<iFILE NAME="reserve2.ihtml" DATA="<P>" OP="append">
<iFILE NAME="reserve2.ihtml" DATA="</BODY>" OP="append">
<iFILE NAME="reserve2.ihtml" DATA="</markup language>" OP="append">
<REM --- Once the information is appended into "reserve2.ihtml", it will be automatically
push the page "reserve2.ihtml" to the browser.                       --->
<iREDIR URL="reserve2.ihtml">
```
which then combines information and passes to:
```
<Markup language>
<REM --- Imports the file "datasource.inc" which creates the variable "datasource" which is
used to tell Markup language which ODBC datasource to connect to.    --->
```

FIG. 5
(CONT.)

```
<iINCLUDE NAME="database\datasource.inc">
<REM --- In case a database or other type of error occurs, this will display the error
message. - >
<ERROR>
<FONT FACE="Verdana,Arial" SIZE="+1"><B>An Error Has Occurred</B></FONT><P>
<FONT FACE="Verdana,Arial" SIZE="-1"><B>Error Message =
:i_errortext</B></FONT><P>
<FONT FACE="Verdana,Arial" SIZE="-1"><B>database Error =
:idatabaseerrortext</B></FONT><P>
<FONT FACE="Verdana,Arial" SIZE="-1"><B>database Error =
:i_databaseerrorstmt</B></FONT><P>
</ERROR>
<REM --- Copy a preformatted file, "empty.ihtml" into a new file, "reserve2.ihtml".   --->
<iCOPYFILE SRC="empty.ihtml" DST="reserve2.ihtmr>
<REM Appends the information passed from "reseve1.ihtml" to "reserve2.ihtml" for
process. Other html information is also passed.   --- >
<iFILE NAME="reserve2.ihtml" DATA=":newseats" OP="append">
<iFILE NAME="reserve2.ihtml" DATA="<INPUT TYPE='hidden' NAME='total
VALUE=:total>" OP="append">
<iFILE NAME="reserve2.ihtml" DATA="</FORM>" OP="append">
<iFILE NAME="reserve2.ihtml" DATA="</CENTER>" OP="append">
<iFILE NAME="reserve2.ihtml" DATA="<P>" OP="append">
<iFILE NAME="reserve2.ihtml" DATA="</BODY>" OP="append">
<iFILE NAME="reserve2.ihtml" DATA="</markup language>" OP="append">
<REM --- Once the information is appended into "reserve2.ihtml", it will be automatically
push the page "reserve2.ihtml" to the browser.
<iREDIR URL="reserve2.ihtml">
then (takes all information from index & reserve one and conbines it to with the information
in empty) then passes to:
```

FIG. 5 (CONT.)

```
<!Markup language>
<REM --- Imports the file "datasource.inc" which creates the variable "datasource" which is
used to tell Markup language which ODBC datasource to connect to. --- >
<iINCLUDE NAME="database\datasource.inc">
<REM -- In case a database or other type of error occurs, this will display the error
message. -- >
<ERROR>
<FONT FACE="Verdana,Arial" SIZE="+1"><B>An Error Has Occurred</B></FONT><P>
<FONT FACE="Verdana,Arial" SIZE="-1"><B>Error Message =
:i_errortext</B></FONT><P>
<FONT FACE="Verdana,Arial" SIZE="-1"><B>database Error =
:i_databaseerrortext</B></FONT><P>
<FONT FACE="Verdana,Arial" SIZE="-1"><B>database Error =
i_databaseerrorstmt</B></FONT><P>
</ERROR>
<REM --- Begin normal markup language here            --->
<markup language>
<HEAD>
<TITLE>Ticketing & Reservation System - Customer Information</TITLE>
</HEAD>
<BODY BACKGROUND="images/background.jpg" TEXT="#000000" LINK="#006666"
VLINK="#006666">
<REM-------Get Customer Info------->
<CENTER>
<TABLE BGCOLOR='#000000' BORDER=0 CELLPADDING=5 CELLSPACING=0
WIDTH=500>
<TR><TD><CENTER>
<FONT FACE='Verdana,Arial' SIZE=+1 COLOR='#FFFFFF'><B>
Ticketing & Reservation System
```

FIG. 5 (CONT.)

```
</B></FONT>
</CENTER>
</TD></TR>
</TABLE><p>
<FORM ACTION=reserve3.ihtml METHOD=POST>
<TABLE BGCOLOR='#000000' BORDER=0 CELLPADDING=0 CELLSPACING=0>
<TR><TD>
<TABLE BGCOLOR='#FFFFFF' BORDER=0 CELLPADDING=5 CELLSPACING=1>
    <TR>
    <TD COLSPAN=2><CENTER><FONT FACE='Verdana,Arial' SIZE=-1><B>CUSTOMER INFORMATION</CENTER></TD>
    </TR><TR>
    <TD><FONT FACE='Verdana,Arial' SIZE=-1><B>Name as appear on CC</B></FONT></TD>
    <TD><FONT FACE='Verdana,Arial' SIZE=-1><B><INPUT TYPE="text" NAME="name" MAXLENGTH=50 SIZE=40></B></FONT></TD>
    </TR><TR>
    <TD><FONT FACE='Verdana,Arial' SIZE=-1><B>Phone</B></FONT></TD>
    <TD><FONT FACE='Verdana,Arial' SIZE=-1><B><INPUT TYPE="text" NAME="phone" MAXLENGTH=50 SIZE=12></B></FONT></TD>
    </TR><TR>
    <TD><FONT FACE='Verdana,Arial' SIZE=-1><B>Email</B></FONT></TD>
    <TD><FONT FACE='Verdana,Arial' SIZE=-1><B><INPUT TYPE="text" NAME="email" MAXLENGTH=50 SIZE=40></B></FONT></TD>
    </TR><TR>
    <TD><FONT FACE='Verdana,Arial' SIZE=-1><B>CC Number</B></FONT></TD>
    <TD><FONT FACE='Verdana,Arial' SIZE=-1><B><INPUT TYPE="text" NAME="ccnum" MAXLENGTH=50 SIZE=40></B></FONT></TD>
    </TR><TR>
```

FIG. 5 (CONT.)

```
          <TD><FONT FACE='Verdana,Arial' SIZE=-1><B>Expiration
(MM/YY)</B></FONT></TD>
          <TD><FONT FACE='Verdana,Arial' SIZE=-1><B>Month <INPUT TYPE="text"
NAME="ccmexp" MAXLENGTH=50 SIZE=2> / Year <INPUT TYPE="text" NAME="ccyexp"
MAXLENGTH=50 SIZE=2> ... example: 12/99</B></FONT></TD>
          </TR><TR>
          <TD COLSPAN=2>
          <CENTER>
          <FONT FACE='Verdana,Arial' SIZE=-1><B>
          <INPUT TYPE="submit" VALUE="Reserve Seats">
          <BR>
          <INPUT TYPE="reset" VALUE="Clear Choices">
          </B></FONT>
          </CENTER>
          </TD></TR>
</TABLE>
</TD></TR></TABLE>
<iEQ NAME="total" VALUE=0>
<iEQ NAME="date" VALUE='<iDATE>'>
<REM --- Begin database command to insert a new customer profile into the database. This
step is primarily for the purpose of obtaining a new customer id to associate this transaction.
The customer's ip and captured and inserted into a new record in the "customers" table.
The marker, "new" is flagged "true" for the attrieval of the new id. Once the new customer id
is captured, the marker "new" is turned off.                        --->
<Markup language DBNAME=:datasource
          database="INSERT INTO customers (ip, new)
          VALUES (':i_ip',1)">
<database DBNAME=:datasource
          database="SELECT id
```

FIG. 5 (CONT.)

```
            FROM customers
            WHERE new=1">
            <databaseFETCH>
            <iEQ NAME="custid" VALUE=:1>
</database>
<Markup language DBNAME=:datasource
            database="UPDATE customers
            SET new=0
            WHERE id=:custid">
<REM --- Begin database command to insert a new reservation into the database. This step
is primarily for the purpose of creating a new reservation record, flagged with the newly
obtained customer id, so that the transaction information may be processed in
"resere3.ihtml".            --->
<Markup language DBNAME=:datasource
            database="INSERT INTO orders (orderdate, approvalcode, receiptnum, totalcharge,
custid)
            VALUES (':date','0000', '0000', :total, :custid)"
FAILURE="The order could not be processed at this time due to technical difficulties.">
<REM --- Begin database command to obtain the reservation id that was just created. This
information, coupled with the customer id, will be used to identify this particular transaction
in the database and be updated in "resere3.ihtml"            --->
            <database DBNAME=:datasource
            database="SELECT max(id)
            FROM orders">
            <databaseFETCH>
            <iEQ NAME="oid" VALUE=:1>
</database>
            <INPUT TYPE="hidden" NAME="reserve" VALUE="receipt">
            <INPUT TYPE="hidden" NAME=custid VALUE=:custid>
```

FIG. 5
(CONT.)

```
        <INPUT TYPE="hidden" NAME=phone VALUE=:phone>
        <INPUT TYPE="hidden" NAME=email VALUE=:email>
        <INPUT TYPE="hidden" NAME=oid VALUE=:oid>
```
<Markup language DBNAME=:datasource database='INSERT INTO basket (custid, pid, qty) VALUES (:custid, 6431, 1)'><database DBNAME=:datasource database='SELECT cost FROM products WHERE id=6431'><databaseFETCH><iEQ NAME='ticketprice' VALUE=:1></database><iEQ NAME='total' VALUE=<iEVAL EXPR=':ticketprice + :total' PREC='2'>><Markup language DBNAME=:datasource database='INSERT INTO orderdetail (pid, oid, qty, sell) VALUES (6431, :oid, 1, :ticketprice)'><Markup language DBNAME=:datasource database='INSERT INTO basket (custid, pid, qty) VALUES (:custid, 6428, 1)'><database DBNAME=:datasource database='SELECT cost FROM products WHERE id=6428'><databaseFETCH><iEQ NAME='ticketprice' VALUE=:1></database><iEQ NAME='total' VALUE=<iEVAL EXPR=':ticketprice + :total' PREC='2'>><Markup language DBNAME=:datasource database='INSERT INTO orderdetail (pid, aid, qty, sell) VALUES (6428, :oid, 1, :ticketprice)'><Markup language DBNAME=:datasource database='INSERT INTO basket (custid, pid, qty) VALUES (:custid, 6429, 1)'><database DBNAME=:datasource database='SELECT cost FROM products WHERE id=6429'><databaseFETCH><EQ NAME='ticketprice' VALUE=:1></database><iEQ NAME='total' VALUE=<iEVAL EXPR=':ticketprice + :total' PREC='2'>><Markup language DBNAME=:datasource database='INSERT INTO orderdetail (pid, oid, qty, sell) VALUES (6429, :oid, 1, :ticketprice)'><Markup language DBNAME=:datasource database='INSERT INTO basket (custid, pid, qty) VALUES (:custid, 6430, 1)'><database DBNAME=:datasource database='SELECT cost FROM products WHERE id=6430'><databaseFETCH><iEQ NAME='ticketprice' VALUE=:1></database><iEQ NAME='total' VALUE=<iEVAL EXPR=':ticketprice + :total' PREC='2'>><Markup language DBNAME=:datasource database='INSERT INTO orderdetail (pid, aid, qty, sell) VALUES (6430, :oid, 1, :ticketprice)'><INPUT TYPE='hidden' NAME='total' VALUE=:total></FORM></CENTER><P></BODY></markup language> takes in credit card information and passes to:

FIG. 5 (CONT.)

```
<!Markup language>
<REM --- Imports the file "datasource.inc" which creates the variable "datasource" which
is used to tell Markup language which ODBC datasource to connect to.
<iINCLUDE NAME="database\datasource.inc">
<REM -- In case a database or other type of error occurs, this will display the error
message. - >
<ERROR>
<FONT FACE="Verdana,Arial" SIZE="+1"><B>An Error Has Occurred</B></FONT><P>
<FONT FACE="Verdana,Arial" SIZE="-1"><B>Error Message =
:i_errortext</B></FONT><P>
<FONT FACE="Verdana,Arial" SIZE="-1"><B>database Error =
:i_databaseerrortext</B></FONT><P>
<FONT FACE="Verdana,Arial" SIZE="-1"><B>database Error =
:i_databaseerrorstmt</B></FONT><P>
</ERROR>
<REM --- Begin normal markup language here       --->
<markup language>
<HEAD>
<TITLE>Ticketing & Reservation System - Confirmation</TITLE>
</HEAD>
<BODY BACKGROUND="images/background.jpg" TEXT="#000000" LINK="#006666"
VLINK="#006666">
<REM --- Checks to see if the instance "reserve" with a value of   --->
<REM --- "receipt" is passed to this page. If so, the codes within  --- >
<REM --- the iCASE and /iCASE tags are executed. This is primarily --- >
<REM --- for security purposes as the instanced "reserved" is only --- >
<REM --- called in the step immediately before. If a visitor       --->
<REM --- accidentally stumbled upon this file, nothing will be run   --->
<REM --- unless all previous steps are completed.                 --->
```

FIG. 5 (CONT.)

```
<iCASE ALIAS="reserve" VALUE="receipt">
<CENTER>
<TABLE BGCOLOR='#000000' BORDER=0 CELLPADDING=5 CELLSPACING=0
WIDTH=500>
<TR><TD>
<CENTER>
<FONT FACE='Verdana,Arial' SIZE=+1 COLOR='#FFFFFF'><B>
Concert Reservation System
</B></FONT>
</CENTER>
</TD></TR>
</TABLE>
</CENTER><p>
<REM --- Two steps are combined here:            --->
<REM --- 1. The reservation information captured in      --->
<REM --- "reserve2.ihtml" is passed to the iPAY tag which    --->
<REM --- processes the information and passes it to CyberCash   --->
<REM --- for verification. If successful, the tag returns  --- >
<REM --- "success", otherwise it returns a variation of "fail"  --- >
<REM --- 2. iIF checks to see if the verification is a success or --- >
<REM --- failure. If successful, it will process the codes    --->
<REM --- immediately after it, which includes updating the    --->
<REM --- database with a successful reservation. If anything    --->
<REM --- other than "success" is returned, iIF will skip to   --->
<REM --- the iELSE tag and execute all codes thereafter.    --->
<iIF COND=<iPAY SERVER="C3"
            amount=:total
            id=:oid
            ccnum=":ccnum"
```

```
                    ccmexp=":ccmexp"
                    ccyexp=":ccyexp"
                    name=":name"
                    capture="false"
                    HOST="http://cr.cybercash.com/cgi-bin"
                    PORT=80
                    SECRET="vendorid-26"
                    CRYPTOKEY="j1y1o1ohNU1 ciTdPF1 hsvHFjlpnCpR"»
<CENTER>
<TABLE BGCOLOR='#000000' BORDER=0 CELLPADDING=0 CELLSPACING=0>
<TR><TD>
<TABLE BGCOLOR='#FFFFFF' BORDER=0 CELLPADDING=5 CELLSPACING=1
WIDTH=500>
<TR><TD>
<FONT FACE="Verdana,Arial" SIZE="-1">
<B>The credit card has been approved and the reservation has been processed.<P>
The following are the Authorization Code and Receipt Number:</B><p>
<b>Authorization Code:</b> :i_pay_authnumber<BR>
<b>Receipt Number: </b> :ipay_transactionnumber<P>
<b>Customer Name:</b> :name<BR>
<b>Total Amount:</b> $:total<BR>
<b>Credit Card Number:</b> :ccnum<BR>
<b>Month of Expiration:</b> :ccmexp<BR>
<b>Year of Expiration:</b> :ccyexp<BR>
<REM --- Begin database query to update the "customers" table with customer information
captured in "reserve2.ihtml".          --->
<Markup language DBNAME=:datasource
                    database="UPDATE customers
                    SET contact=':name', phone=':phone, email=':email'
```

FIG. 5 (CONT.)

```
                    WHERE id=:custid">
<REM --- Begin database query to update the "orders" table is updated with the approval
code returned by CyberCash, as well as the transaction information (total charge, credit
card number, etc).                              --->
<Markup language DBNAME=:datasource
            database="UPDATE orders
            SET approvalcode=':i_pay_authnumber',
receiptnum=':i_pay_transactionnumber', totalcharge=:total,cc=':ccnum', ccm=':ccmexp',
ccy=':ccyexp'
            WHERE id=:oid"
        FAILURE="The information was not saved correctly.<br>">
<REM --- Begin database query to turn off the availability of the seats that have been
reserved by setting the "active" attribute of the seats to "0".         --->
<database ALIAS="markoff" dbname=":datasource" database="SELECT pid FROM
orderdetail WHERE oid=:oid">
        <databaseFETCH ALIAS="markoff">
        <iWHILE NOTALIAS=i_databaseempty>
            <Markup language dbname=":datasource"
                database="UPDATE products
                SET active=0
                    WHERE id=:markoff_pid">
            <databaseFETCH ALIAS="markoff">
        </iWHILE ALIAS=i_databaseempty>
</database ALIAS="markoff">
</FONT>
</TD></TR>
</TABLE>
</TD></TR>
</TABLE>
```

FIG. 5 (CONT.)

```
</CENTER><p>
<iELSE>
<CENTER>
<TABLE BGCOLOR='#000000' BORDER=0 CELLPADDING=0 CELLSPACING=0>
<TR><TD>
<TABLE BGCOLOR='#FFFFFF' BORDER=0 CELLPADDING=5 CELLSPACING=1
WIDTH=500>
<TR><TD>
<FONT FACE="Verdana,Arial" SIZE="-1"><B>
This transaction could not be processed by Cyber Cash at this time. Either the Credit Card
Information was invalid or the Cyber Cash server is currently not available.
</B></FONT>
</TD></TR>
</TABLE>
</TD></TR>
</TABLE>
</CENTER>
</iIF>
<FORM ACTION="index.ihtml" METHOD="post">
<CENTER>
<TABLE BGCOLOR='#000000' BORDER=O CELLPADDING=O CELLSPACING=0>
<TR><TD>
<TABLE BGCOLOR='#FFFFFF' BORDER=0 CELLPADDING=5 CELLSPACING=1
WIDTH=500>
<TR><TD>
<CENTER>
<FONT FACE="Verdana,Arial" SIZE="-1"><B>
<INPUT TYPE="submit" VALUE="Return to Concert Selection">
</B></FONT>
```

FIG. 5
(CONT.)

```
</CENTER>
</TD></TR>
</TABLE>
</TD></TR>
</TABLE>
</CENTER>
</FORM>
<FORM ACTION="http://domainname/filename" METHOD="post">
    <CENTER>
<TABLE BGCOLOR= 000000' BORDER=0 CELLPADDING=0 CELLSPACING=0> <TR><TD>
<TABLE BGCOLOR='#FFFFFF' BORDER=0 CELLPADDING=5 CELLSPACING=1
WIDTH=500>
<TR><TD>
<CENTER>
<FONT FACE="Verdana,Arial" SIZE="-1"><B>
<INPUT TYPE="submit" VALUE="Return to On-Line Ticketing & Reservation Front Desk">
</B></FONT></CENTER>
</TD></TR><TTABLE></TD></TR></TABLE></CENTER>
</FORM>
</CASE ALIAS="reserve">
</BODY>
</markup language>
```
which verifies and confirms payment information

FIG. 5
(CONT.)

SYSTEM AND METHOD FOR MANAGING SEAT RESERVATIONS

CROSS REFERENCE TO RELATED APPLICATIONS

This application is a continuation of U.S. patent application Ser. No. 13/530,779 filed on Jun. 22, 2012, which is a continuation of U.S. patent application Ser. No. 12/953,279 filed on Nov. 23, 2010, now U.S. Pat. No. 8,219,448 which issued on Jul. 10, 2012, which is a continuation of U.S. patent application Ser. No. 12/479,635 filed on Jun. 5, 2009, now U.S. Pat. No. 7,885,839 which issued on Feb. 8, 2011, which is a continuation of U.S. patent application Ser. No. 12/244,727 filed on Oct. 2, 2008, now U.S. Pat. No. 7,685,009 which issued on Mar. 23, 2010, which is a continuation of U.S. patent application Ser. No. 09/295,577 filed on Apr. 22, 1999, now U.S. Pat. No. 7,454,361 which issued on Nov. 18, 2008, the entire disclosures of which are hereby incorporated by reference.

BACKGROUND

This invention relates to an electronic means by which people can select the exact seat or seats they want for any type of event or reserve an appointment for any activity such as a doctor or dentist appointment or even an appointment to have their car lubed. More specifically, a customer or a ticket re-seller or a venue operator can go, for example, to the internet and select the event or activity for which he wants a ticket or tickets or reserve a time, and reserve and order the exact seat or seats or the time of his choosing directly online. The seat or seats or reserved time he selects is then removed from the inventory for that activity or event and made not available for any other buyer and such is so indicated by a graphical representation or other such indicator on the online map or picture representing availability of seating or time for that event. For an appointment reservation, the user connects to the internet or other wide area network, such as a bulletin board, from his home or office computer and connects to a page that displays a reservation calendar with which he can interact, such as to reserve a specific time period for himself.

1. Field of the Invention

In accordance with the present invention a remote location ticketing and reservation system for any venue comprises an internet or network compatible computer program constructed generally to afford access to a database, or other record maintained in electronic form, containing information about all sold and unsold seating for any specific venue or event and means and method by which a remote user, through use of a computer terminal or other such device, may access said database or other record and receive at his location through any computer terminal or other such device information about which specific seats remain available and then through a computer mouse or keyboard or other such input device select a specific seat or seats for that specific event and reserve such for himself for use during said event.

2. Prior Art

The inadequacies and inefficiencies of present ticketing and reservation systems are recognized and addressed through this invention. The rapid growth of the internet now makes it possible for anyone at his home or office to avail himself of the advantages of the instant invention through a simple internet or other wide area network connection.

Prior art makes a feeble attempt to address the inconvenience of ticket ordering. U.S. Pat. No. 5,797,126 (1988), Helbling, et al., describes a series of individual kiosks in wireless communication with a central station where a visitor can locate events of interest, view an excerpt of scenes from that venue and purchase tickets. This falls far short of the instant invention since it still requires a user to physically visit a remote site to avail himself of the service. Additionally, said prior art makes extensive use of what is called "kiosks" implying that, unlike the instant invention, it is only from his specialized machines that such services may be rendered.

U.S. Pat. No. 4,974,252 describes a more interactive theater attendance system where patrons are permitted two way communications between themselves and a broadcast center but this is still far from objectives of the instant invention and requires that persons be in attendance at the theater and, further some attendant be present at the remote broadcast center. The instant invention is fully automated and, other than the normal monitoring of any application for a wide area network, requires no human attendance or intervention.

U.S. Pat. No. 3,427,438 describes a ticket vending system where sales of tickets can be recorded on a seating layout but, again falls far short of the instantaneous update and automatic operation of the instant invention. U.S. Pat. No. 5,333,257 allows for a view from a seat but that is now common for internet applications where a hyperlink to any graphic is routinely provided and ancillary to and even unnecessary to the instant invention. Other prior art does nothing to make ticket ordering or seating reservations more readily available and does nothing to improve the information flow to prospective customers so that they may make a more informed decision about attending any given event.

Consider the traveler who has planned a vacation in, say, New York City and wants tickets for some Broadway show. Presently he has either to phone and accept someone else's definition of what constitutes "best available" or wait until he gets into town and seek out a scalper or reseller agency and he still isn't sure exactly what his seats offer.

OBJECTS AND ADVANTAGES

Several objects and advantages of the present invention are:

(a) to always provide customers with a seat selection comprised of the total of the then best available seats for any given event;

(b) to make equally available to all customers all then available seats for any given event to that said customer, so he may select for himself the seat or seats he wants for that event;

(c) to provide an alternative means to visiting box office or a ticket reseller for a customer to select and reserve for himself the then best available seat or seats for any arena, stadium, theater, airline flight or any other such venue where seating is available;

(d) to provide to a ticket sensitive venue operator better control over the seating and seat availability for the various events he offers;

(e) to provide to a ticket sensitive venue operator better accounting of his seating for the various events he offers;

(f) to provide to the general public a more cost effective means by which he may reserve and buy tickets for any given event;

(g) to provide to a venue operator a more cost effective means by which he may sell tickets for any given event;

(h) to provide to the general public an automated 24 hours a day, seven days a week means by which he may reserve and purchase the specific seats he wants for an event;

(i) to provide to a venue operator an automated 24 hours a day, seven days a week means by which he may offer reservation and purchase of a seat or seats that are individually selectable by a customer;

(j) to permit the venue operator to avoid overbooking an event;

(k) to permit the venue operator to avoid underbooking an event;

(l) to permit a doctor or other professional for whom his time is a commodity to better schedule and regulate his time and interact with patients or others in the online environment;

(m) to provide to the general public a 24 hours a day, seven days a week means by which they may schedule appointments with doctors, dentists, automotive mechanics and the like with full knowledge that the appointment time they select is still available.

Further objects and advantages are to provide any venue operator the benefit of better control over his ticket inventory and sales such as to improve his profitability and the efficiency of his operation and to provide to the general ticket buying public better information and an easier means by which they may acquire their desired ticket or tickets for any event.

SUMMARY

The ticketing and reservation system of the present invention, in one particular embodiment thereof, includes a computer program operating on a server for a wide area network (WAN), generally described by the flow chart of FIG. 1 and the accompanying code example which implements the instant invention in practice:

First, when a user accesses the system means is provided to initialize the process and return to the user a menu from which he selects his venue of interest. This can be a selectable menu arranged by artist or date or time or specific theater or football team or baseball team or name or activity or any combination thereof such that the user is given sufficient information from which to make a decision. An example would be someone looking for the next event at a given theater at a time that starts at 7:00 pm. One of many possible series of computer instructions to perform this function is:

←Send database query to retrieve all venues that are currently available in the system→
←Server receives and processes query→
←Query is looped until all available performances and venues are retrieved→
←Markup Language engine converts result to display compatible format for output to client computer→
←Begin normal markup language here→
←Begin reservation process selecting the event date/time next to the desired venue→

THEN, upon user submittal, the server initializes the process of returning to the user all available seats:

←Send database query to retrieve all seats that are currently available in the system for this event→
←Server receives and processes query→
←Query is looped until all available seats are retrieved→
←Markup language engine converts result to markup language format for output to client computer→
←Begin normal markup language here→
←Continue reservation process by selecting the desired seat or seats→

THEN, upon user submittal we create a new customer record in the Wide Area Network server and tell the system which database to connect to fulfill the user's request(s):

←Send database command to insert new record in customer database and obtain record id→

←Send database command to insert new record in reservation "order" database and obtain record id→
←Send database command to insert new record for each selected seat in the reservation "detail" database→
←Begin normal markup language here→
←Continue reservation process by requesting client payment information→

THEN, upon user submittal the information is passed for verification:

←Submit client information for verification→
←If verification is successful, send database command to update customer record in customer database with information previously collected→
←If verification is successful, send database command to update reservation record in reservation "order" database with verification information→
←If verification is successful, send database command to remove selected seats from seat inventory database and mark as no longer available for future selection→
←Markup language engine converts result to markup language format for output to client computer→
←Begin normal markup language here→
←If verification is successful, confirmation is generated via Markup language engine to markup language format for output to client computer→
←If verification is unsuccessful, a failure notice is generated via Markup language engine to markup language format for output to client computer→
←If verification is unsuccessful, client is presented with option to provide his payment information again or abandon his reservation→

While this is one preferred form of the code there are many other code sequences that will perform the same function that will be immediately obvious to one skilled in the art.

BRIEF DESCRIPTION OF THE DRAWINGS

The aforementioned objects and advantages of the present invention as well as additional objects and advantages thereof will be more fully understood hereinafter as a result of a detailed description of a preferred embodiment when taken in conjunction with the following drawings in which:

FIG. 5 is a complete code set for one preferred embodiment of the present invention.

DETAILED DESCRIPTION OF THE PREFERRED EMBODIMENT

Figure 1:
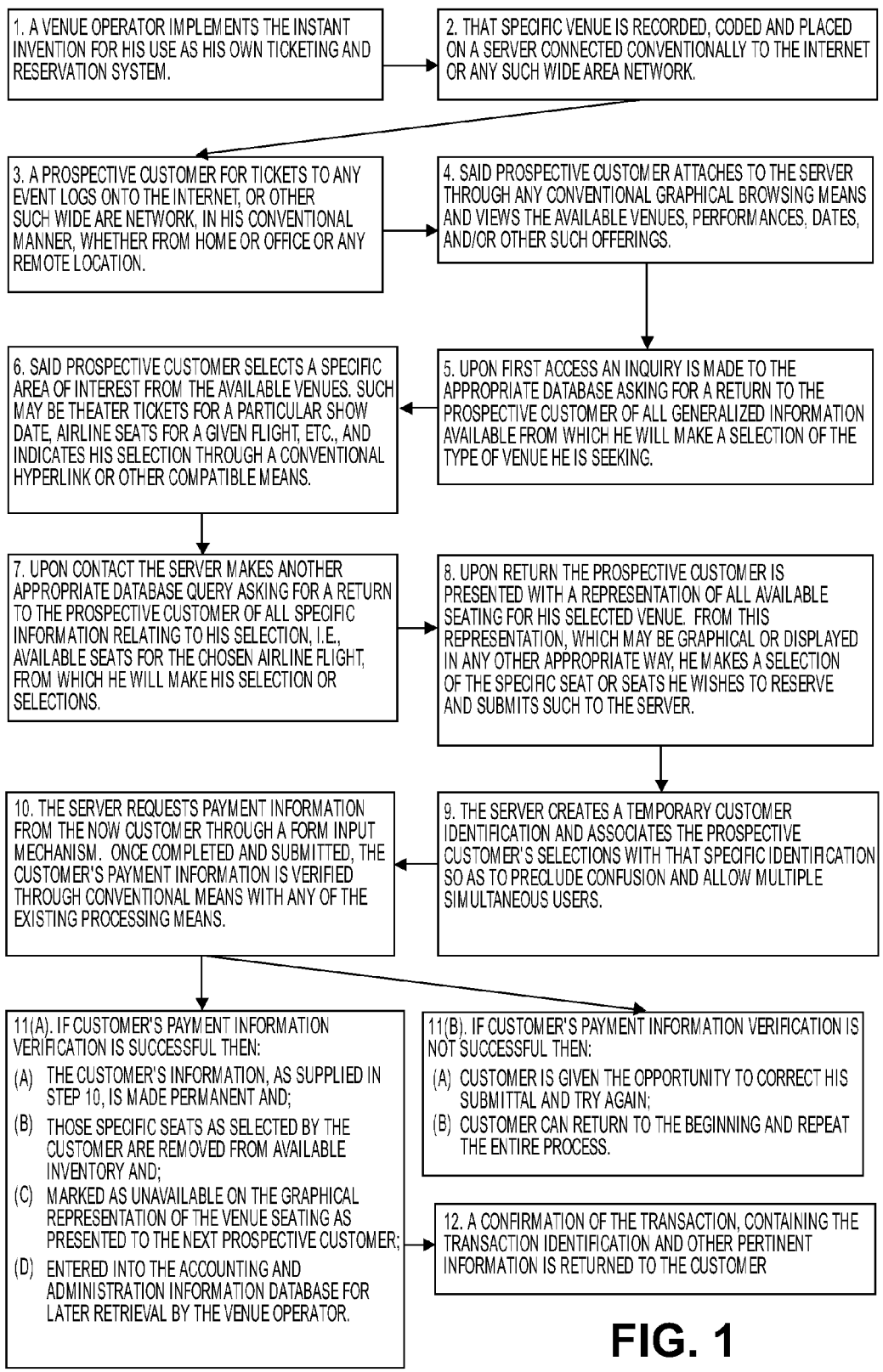
FIG. 1 is a block diagram of the present invention illustrating the major components thereof and the interactivity that takes place between the potential customer and the instant invention.

Referring to FIG. 1, it will be seen that the operator of a venue implements the instant invention for purposes of allowing remotely located users to reserve specific seating for specific events 1. By doing so, he initiates those certain actions necessary to display an internet web site to all online users 2. A prospective customer for the venues offering(s) logs onto the internet 3 and acquires the aforesaid internet web site 4 which implements the instant invention. He can be connected to the internet by any conventional means yet this by no means implies that the wide area network must be what is commonly referred to as the "internet." Upon first contact by the prospective customer, an inquiry is directed to the appropriate database, which may be located concurrent with the primary server hosting the program for the instant invention or may be located remotely, such as at the physical location of the venue, asking for a return of information to the prospective customer of all appropriate information contained therein relative to his inquiry 5. The prospective customer indicates his desired seat or seats through conventional computer input means and directs that information back to the server hosting the code necessary to the implementation of the instant invention 6. Upon contact 7 the server again makes an appropriate database query and returns to the prospective customer all pertinent information relating to his selection, such as which seats are still available for the chosen performance, airline flight, boxing match, etc. The prospective customer is then presented with a representation of all then available seating for his selected venue 8. From this representation, the prospective customer makes his selection of a seat or seats by indicating such through a mouse click, keyboard entry or other means, such as but not limited to a touch screen. Simultaneously, the server, through the coding necessary to implement the instant invention, creates a temporary customer identification 9 that is used to associate this potential customer with this later selection and permit system use by multiple simultaneous users. Once the customer has made his seat selection he is asked for payment information 10. That information is processed through conventional internet or other electronic means and once the information and payment are verified 11a the customer information, as supplied in 10, is made permanent and the seat or seats he has selected are removed from inventory and blocked from duplicate sale, both graphically when presented to the next prospective customer and in the database where information for accounting and administrative purposes is retained. If the customer's payment information cannot be verified 11b then he is given an opportunity to correct the information or start over with a new transaction. Upon verification of the customer's payment information he receives a confirmation of the transaction 13 containing all appropriate reference information for his records.

Figure 2:
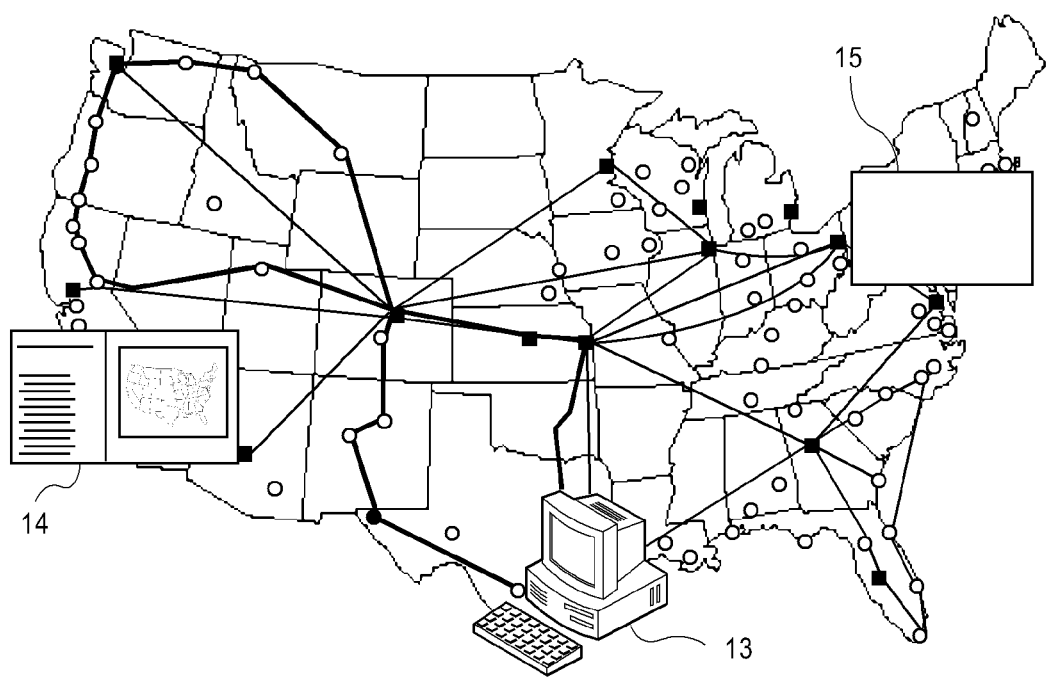
FIG. 2 is an illustration of the concept of the present invention utilizing the internet as the Wide Area Network to which users connect to perform the desired function and shows an example of a remotely located user accessing the functionality of the instant invention for purposes of reserving seats for a dinner theater performance in a distant city.

Referring to FIG. 2, it will be seen that, for example, a user in Houston 13 is planning to vacation in New York and wishes to see a play at a dinner theater there that utilizes the present invention for ticketing and reservations 15. The user in Houston, or in any other location worldwide, connects to the internet in the conventional way and retrieves the appropriate web site through his graphical browser from a server located in, say, Anaheim, Calif. 14. Through implementation of the instant invention the user is able to see the exact seating arrangement of the remote dinner theater and select the exact seat or seats he wants for the performance of his choice. Such additional information as is appropriate can be provided to the remote user to assist him in making an informed decision as to which seat or seats he wishes to occupy for this performance.

Figure 3A:
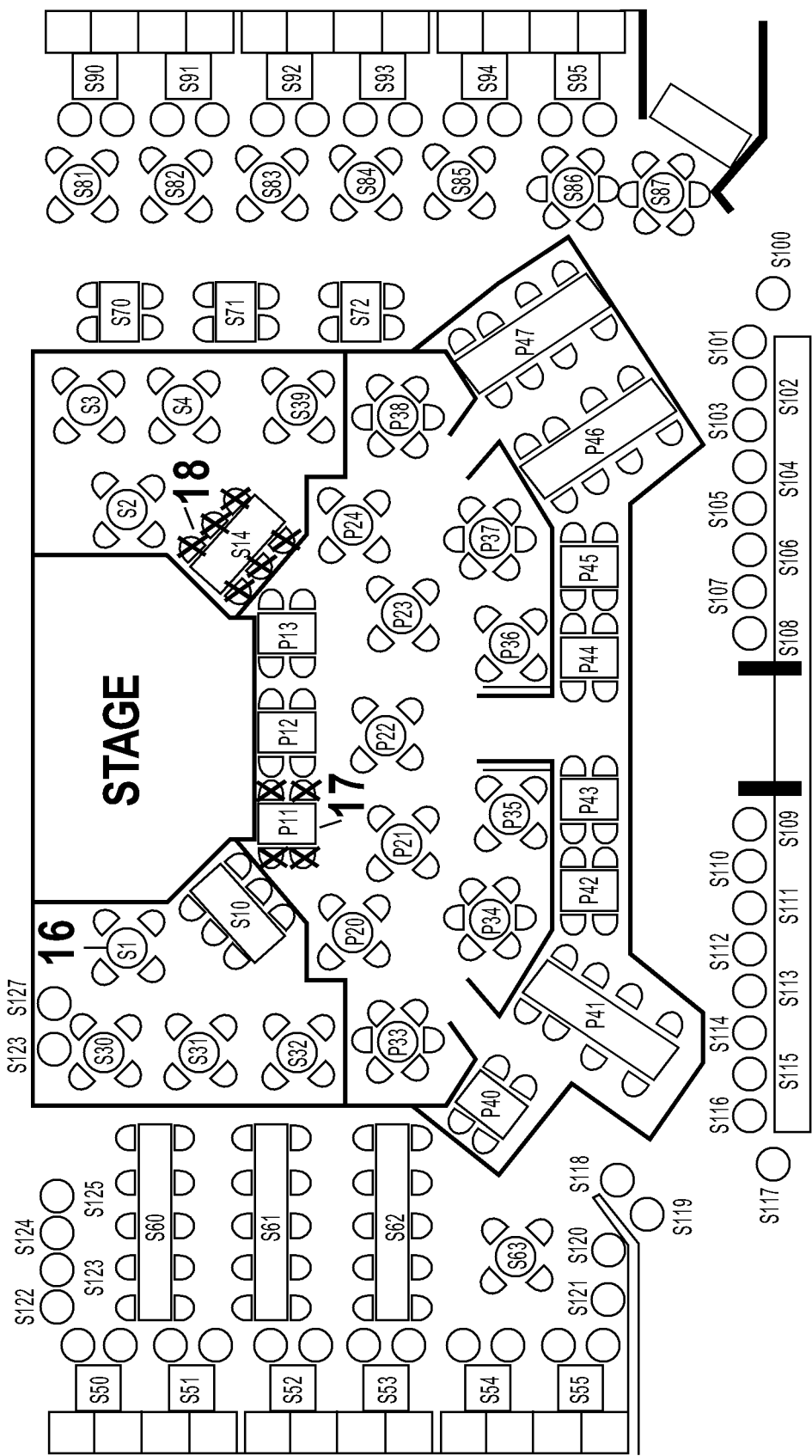
FIGS. 3A and 3B are illustrations of the concept of the present invention refined down to the functionality of reserving specific seats and blocking duplicate sale of those seats that are already reserved.
Figure 3B:
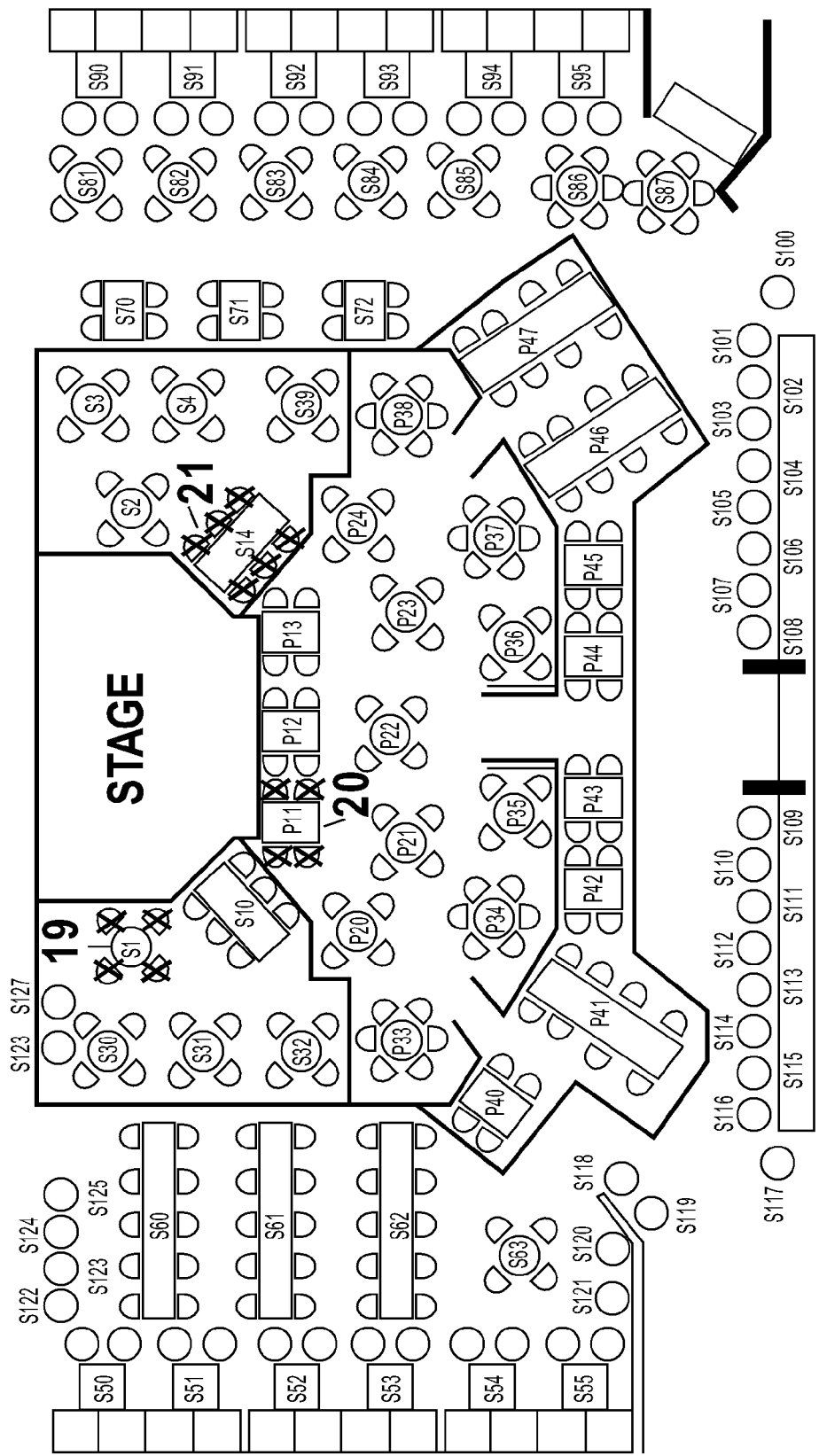

Referring to FIGS. 3A and 3B, it will be seen that in FIG. 3A that, at the user selected venue, all seats at table P11 17 and at table S14 18 have been previously taken and are so indicated by the graphical representation of an "X" over those seats. Our potential customer wants to seat a party of four at table S1 16 and so indicates by clicking his mouse on those four seats or by so indicating through an alternative standard computer input means. Once his payment method is verified his selected seats are removed from inventory and so indicated on the graphical representation by placing an "X" over those seats 19 while retaining the "X" over those seats previously sold at table P11 20 and table S14 21. The next prospective customer is advised that these seats are no longer available for this performance by the new graphical representation shown in FIG. 3B that is his first viewing screen upon entry into the system. In the event that two prospective customers wish to reserve the exact same seat or seats, that prospective customer who first receives validation of his payment method is given those seats while the other prospective customer is notified that while making his decision the seats he wants have already been sold and offers him a chance to select other seating.

Figure 4A:
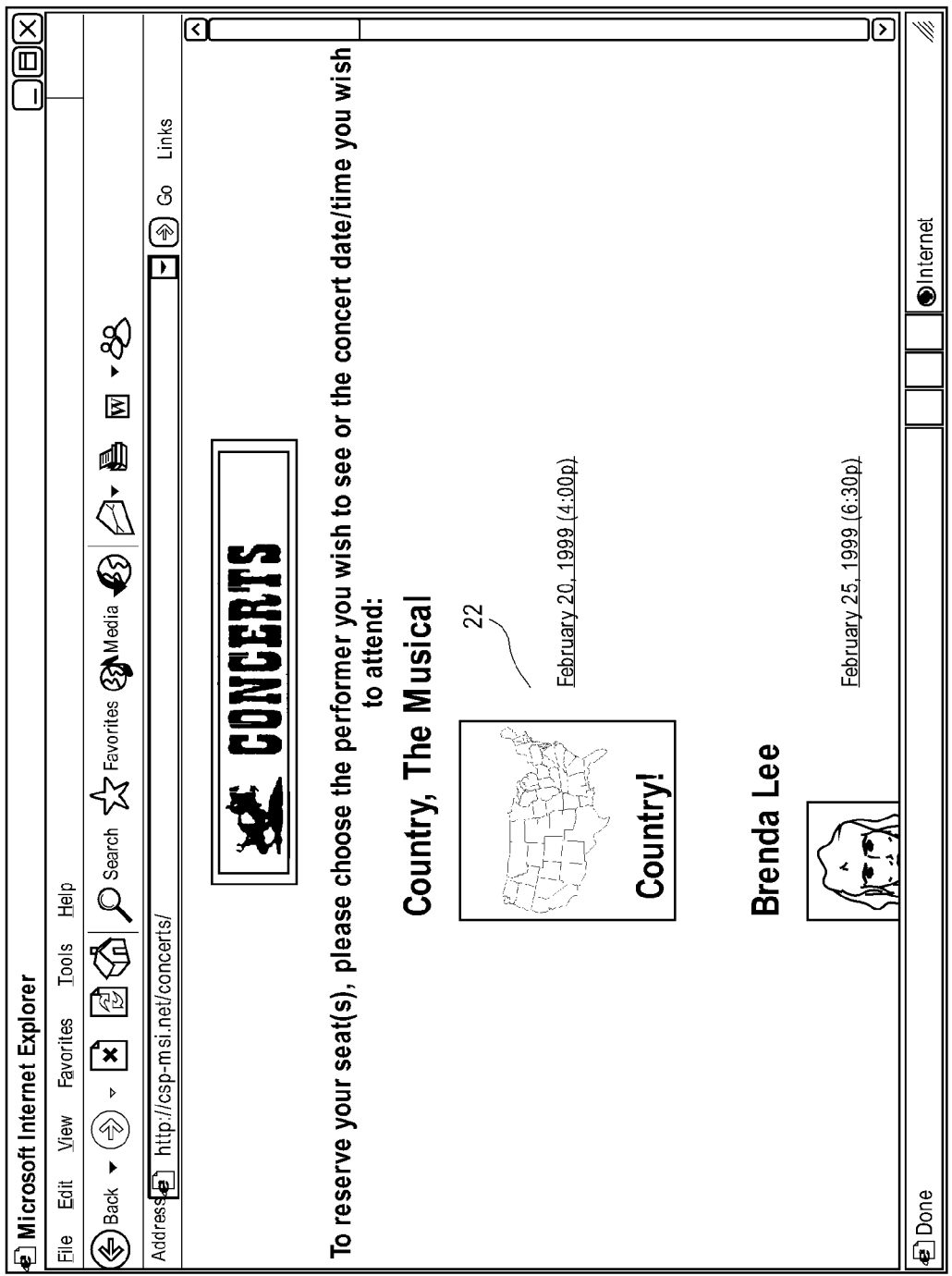
FIGS. 4A to 4E are sample screens seen by a remote user of the instant invention during a session wherein he selects and orders four specific seats for a distant dinner theater show.
Figure 4B:
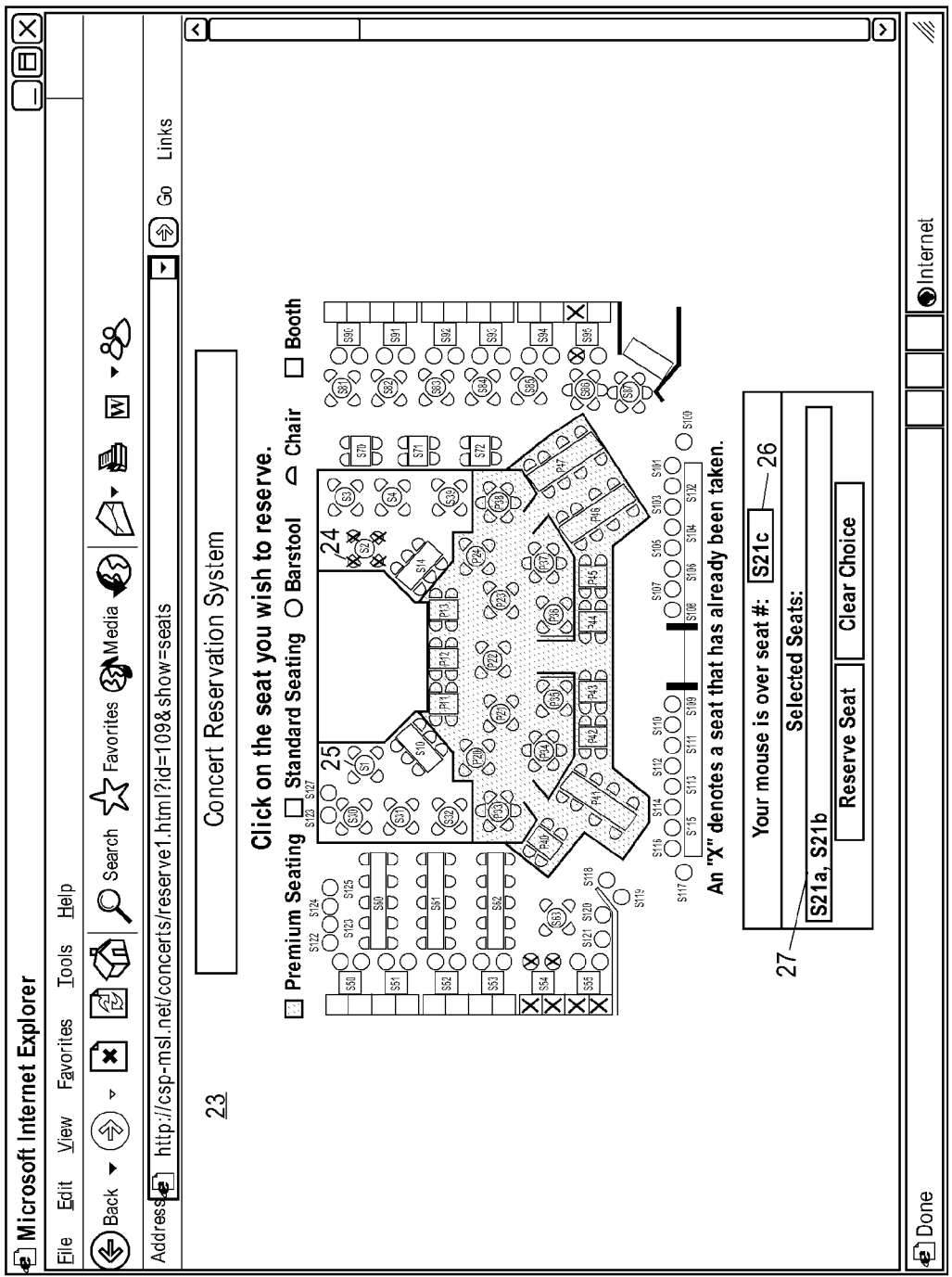
Figure 4C:
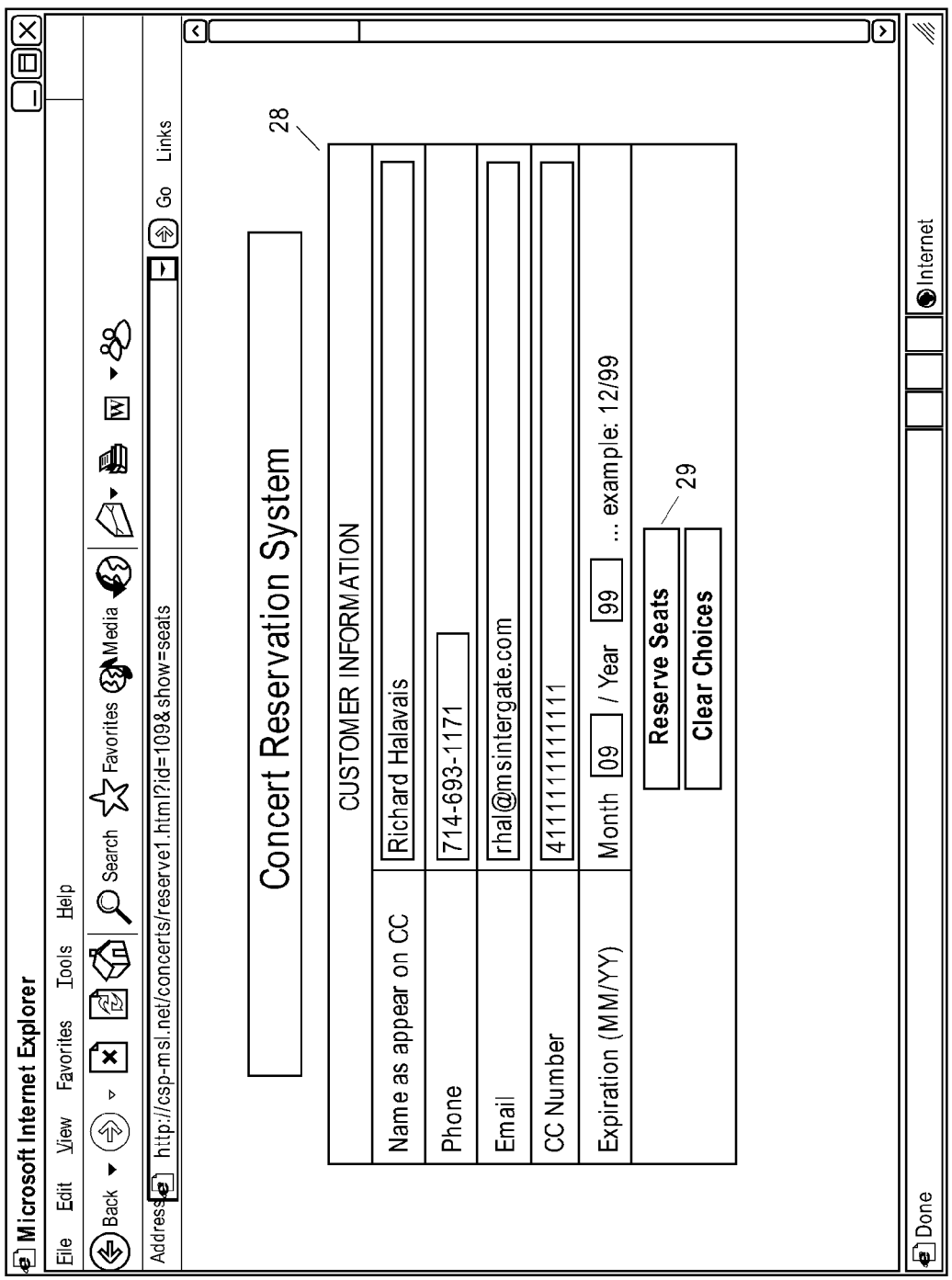
Figure 4D:
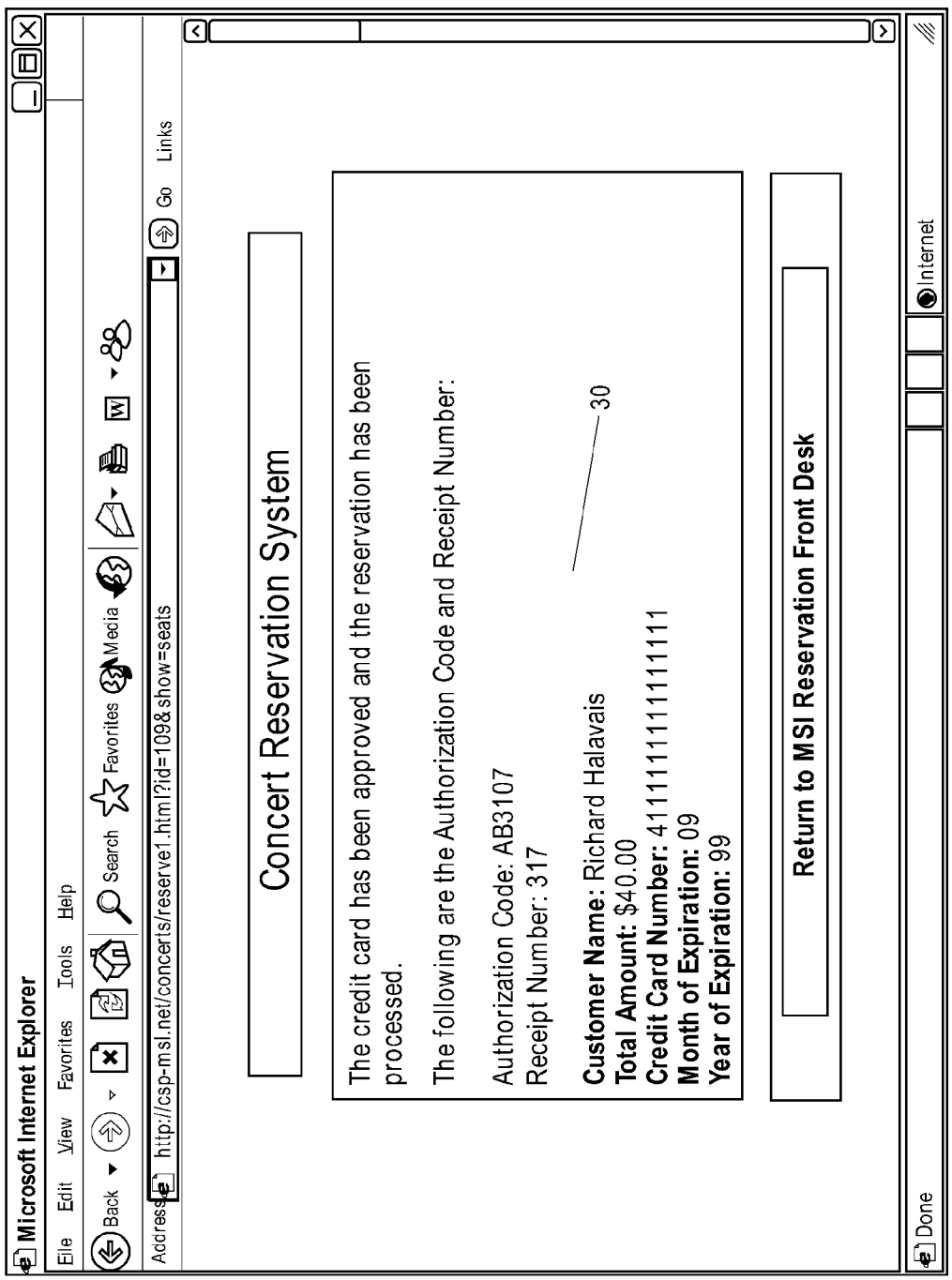
Figure 4E:
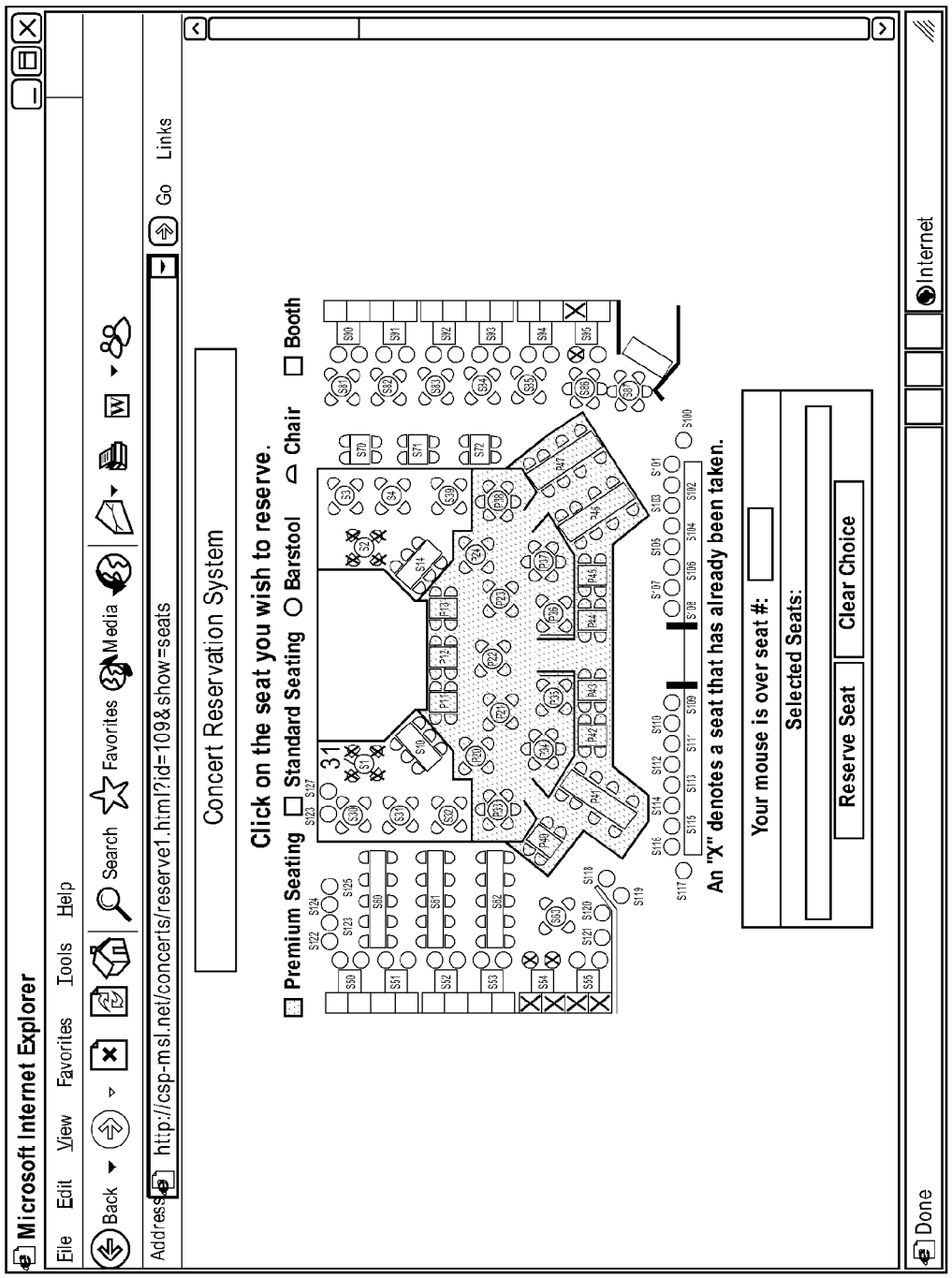

Referring to FIGS. 4A to 4E, one will see the screens presented to a user when he accesses the system and as he progresses through the process of selecting a specific seat or seats, then reserves and pays for them. FIG. 4A is where the first screen presented shows links to available performances for that selected venue 22. FIG. 4B is the second screen 23 and shows a view of the seating available for that venue with seats that have already been taken crossed off with an "X" 24. Our hypothetical user decides that he would like to have his party of four sit at table S1 25 and selects the four seats around that table by clicking on them with his mouse. As he moves his mouse over individual seats the seat number appears in the window at the bottom of his screen 26 and when he clicks on a seat it is added to a running tally of the seats he has already taken 27. Only seats that have not previously been taken show up in the mouse-over window 26. After completing his selections the user clicks on the "Reserve Seats" button and FIG. 4C shows his next screen, which asks him for his payment information 28. He enters the required information and again clicks the "Reserve Seats" button 29. FIG. 4D is the next screen and it tells him that his payment method has been accepted (or rejected) and relates information about the transaction 30 such as his transaction code and the receipt number that he can use as a ticket or as a voucher with which to redeem his ticket or tickets at the venue box office when he arrives for the performance. Finally, FIG. 4E shows the opening screen the next visitor to the system is presented with the same set of screens except that the seats reserved by our hypothetical user 31 are marked off as already taken.

Referring to FIG. 5, one will see one of many possible coding schemes making possible the results of the present invention.

Those having skill in the art to which the present invention pertains will now understand that there are virtually unlimited uses for the present invention. By way of example, the present invention may be readily used to reserve specific seats on commercial airliners or reserve specific staterooms on a cruise ship, as well as for reserving seats for any venue from community theater or little league baseball to major league sporting events.

The present invention has been described in sufficient detail to enable one skilled in the art to make and use the invention. Accordingly, specific details which are readily available in the art or otherwise conventional have been omitted to prevent obfuscation of the essential features of the invention.

In view of the foregoing it will be understood that the present invention may be implemented in a variety of alternative methods but that all such implementations are deemed to be within the scope of the present invention which is to be limited only by the claims appended hereto:

What is claimed is:

1. A system for interactively receiving a selection for one or more seats and removing the one or more seats from inventory, the system comprising:
   one or more processors configured to execute instructions;
   a server configured via instructions executable by the one or more processors to:
      receive, over a computer network as a part of a first reservation browser session, a first data query for a first seat map for a flight from a first personal computing device operated by a first user, wherein the first seat map comprises data descriptive of a first set of one or more available seats on the flight and a first set of one or more unavailable seats on the flight, the first seat map being configured to enable a browser of the first personal computing device to generate a first interactive seating display within the browser of the first personal computing device representing the first set of one or more available seats on the flight;
      receive, over the computer network as a part of a second reservation browser session, a second data query for a second seat map for the flight from a second personal computing device operated by a second user, wherein the second seat map comprises data descriptive of a second set of one or more available seats on the flight and a second set of one or more unavailable seats on the flight, the second seat map being configured to enable a browser of the second personal computing device to generate a second interactive seating display within the browser of the second personal computing device representing the second set of one or more available seats on the flight;
      query a data storage system for information descriptive of available seats for the flight;
      transmit, as a part of the first reservation browser session, the first seat map over the computer network to the first personal computing device;
      transmit, as a part of the second reservation browser session, the second seat map over the computer network to the second personal computing device, wherein the first reservation browser session and the second reservation browser session at least partially overlap in time;
      receive, as a part of the first reservation browser session, from the first personal computing device over the computer network, a first selection of at least one seat from among the first set of one or more available seats;
      receive, as a part of the second reservation browser session, from the second personal computing device over the computer network, a second selection of at least one seat from among the second set of one or more available seats, wherein the second selection comprises at least one overlapping seat within the first selection;
      receive, as a part of the first reservation browser session, from the first personal computing device payment information data;
      request acceptance of the received payment information data;
      remove, in response to acceptance of the received payment information data, from inventory and assign, as associated with the first user, the at least one seat corresponding to the first selection;
      transmit to the first personal computing device, as part of the first reservation browser session, a first notification that the at least one seat corresponding to the first selection has been assigned as associated with the first user; and
      transmit, in response to assignment of the at least one seat corresponding to the first selection as associated with the first user, to the second personal computing device, as part of the second reservation browser session, a second notification that the at least one overlapping seat is not available to the second user.

2. The system of claim 1, wherein the second notification is transmitted before acceptance of the received payment information data is requested.

3. The system of claim 1, wherein the second notification is transmitted after acceptance of the received payment information data is requested.

4. The system of claim 1, wherein the first selection of at least one seat from among the first set of one or more available seats is selected by touch screen input.

5. The system of claim 1, wherein the server is further configured to transmit, to the first personal computing device, a printable ticket for a seat assigned as associated with the first user.

6. The system of claim 1, wherein the first seat map is further configured to enable the browser of the first personal computing device to generate an additional display of information about the first set of one or more available seats on the flight in response to the first user placing a location indicator over a portion of the first interactive seating display.

7. The system of claim 6, wherein the first seat map comprises javascript that enables the browser of the first personal computing device to generate the additional display of information about the first set of one or more available seats on the flight in response to the first user placing the location indicator over the portion of the first interactive seating display.

8. The system of claim 1, wherein the flight comprises a single flight occurring at a first time.

9. The system of claim 1, wherein at least one of the first personal computing device or the second personal computing device comprises a wireless communication connection.

10. A system for interactively receiving a selection for one or more seats and removing the one or more seats from inventory, the system comprising:
   one or more processors configured to execute instructions;
   a server configured via instructions executable by the one or more processors to:
      receive, over a computer network as a part of a first reservation browser session, a first data query for a first seat map for a flight from a first personal computing device operated by a first user, wherein the first seat map comprises data descriptive of a first set of one or more available seats on the flight and a first set of one or more unavailable seats on the flight, the first seat map being configured to enable a browser of the first personal computing device to generate a first interactive seating display within the browser of the first personal computing device representing the first set of one or more available seats on the flight;
      receive, over the computer network as a part of a second reservation browser session, a second data query for a second seat map for the flight from a second personal computing device operated by a second user, wherein the second seat map comprises data descriptive of a second set of one or more available seats on the flight and a second set of one or more unavailable seats on the flight, the second seat map being configured to enable a browser of the second personal computing device to generate a second interactive seating display within the browser of the second personal computing device representing the second set of one or more available seats on the flight;

query a data storage system for information descriptive of available seats for the flight;

transmit, as a part of the first reservation browser session, the first seat map over the computer network to the first personal computing device;

transmit, as a part of the second reservation browser session, the second seat map over the computer network to the second personal computing device, wherein the first reservation browser session and the second reservation browser session at least partially overlap in time;

receive, as a part of the first reservation browser session, from the first personal computing device over the computer network, a first selection of at least one seat from among the first set of one or more available seats;

receive, as a part of the second reservation browser session, from the second personal computing device over the computer network, a second selection of at least one seat from among the second set of one or more available seats, wherein the second selection comprises at least one overlapping seat within the first selection;

receive, as a part of the first reservation browser session, from the first personal computing device payment information data;

request acceptance of the received payment information data;

remove, in response to acceptance of the received payment information data, from inventory and assign, as associated with the first user, the at least one seat corresponding to the first selection;

transmit to the first personal computing device, as part of the first reservation browser session, a first notification that the at least one seat corresponding to the first selection have been assigned as associated with the first user;

transmit, to the first personal computing device, a printable ticket for a seat assigned as associated with the first user; and transmit, in response to assignment of the at least one seat corresponding to the first selection as associated with the first user, to the second personal computing device, as part of the second reservation browser session, a second notification that the at least one overlapping seat is not available to the second user.

11. The system of claim 10, wherein the second notification is transmitted before acceptance of the received payment information data is requested.

12. The system of claim 10, wherein the second notification is transmitted after acceptance of the received payment information data is requested.

13. The system of claim 10, wherein the first selection of at least one seat from among the first set of one or more available seats is selected by touch screen input.

14. The system of claim 10, wherein the first seat map is further configured to enable the browser of the first personal computing device to generate an additional display of information about the first set of one or more available seats on the flight in response to the first user placing a location indicator over a portion of the first interactive seating display.

15. The system of claim 14, wherein the first seat map comprises javascript that enables the browser of the first personal computing device to generate the additional display of information about the first set of one or more available seats on the flight in response to the first user placing the location indicator over the portion of the first interactive seating display.

16. The system of claim 10, wherein the flight comprises a single flight occurring at a first time.

17. The system of claim 10, wherein at least one of the first personal computing device or the second personal computing device comprises a wireless communication connection.

18. A system for interactively receiving a selection for one or more seats and removing the one or more seats from inventory, the system comprising:

one or more processors configured to execute instructions;

a server configured via instructions executable by the one or more processors to:

receive, over a computer network as a part of a first reservation browser session, a first data query for a first seat map for a flight from a first personal computing device operated by a first user, wherein the first seat map comprises data descriptive of a first set of one or more available seats on the flight and a first set of one or more unavailable seats on the flight, the first seat map being configured to enable a browser of the first personal computing device to generate a first interactive seating display within the browser of the first personal computing device representing the first set of one or more available seats on the flight;

receive, over the computer network as a part of a second reservation browser session, a second data query for a second seat map for the flight from a second personal computing device operated by a second user, wherein the second seat map comprises data descriptive of a second set of one or more available seats on the flight and a second set of one or more unavailable seats on the flight, the second seat map being configured to enable a browser of the second personal computing device to generate a second interactive seating display within the browser of the second personal computing device representing the second set of one or more available seats on the flight;

query a data storage system for information descriptive of available seats for the flight;

transmit, as a part of the first reservation browser session, the first seat map over the computer network to the first personal computing device;

transmit, as a part of the second reservation browser session, the second seat map over the computer network to the second personal computing device, wherein the first reservation browser session and the second reservation browser session at least partially overlap in time;

receive, as a part of the first reservation browser session, from the first personal computing device over the computer network, a first selection of at least one seat from among the first set of one or more available seats, the first selection of at least one seat from among the first set of one or more available seats selected by touch screen input;

receive, as a part of the second reservation browser session, from the second personal computing device over the computer network, a second selection of at least one seat from among the second set of one or more available seats, wherein the second selection comprises at least one overlapping seat within the first selection;

receive, as a part of the first reservation browser session, from the first personal computing device payment information data;

request acceptance of the received payment information data;

remove, in response to acceptance of the received payment information data, from inventory and assign, as associated with the first user, the at least one seat corresponding to the first selection;

transmit to the first personal computing device, as part of the first reservation browser session, a first notification that the at least one seat corresponding to the first selection have been assigned as associated with the first user; and transmit to the second personal computing device, as part of the second reservation browser session, a second notification that the at least one overlapping seat is not available to the second user.

19. The system of claim 18, wherein the second notification is transmitted before acceptance of the received payment information data is requested.

20. The system of claim 18, wherein the second notification is transmitted after acceptance of the received payment information data is requested.

21. The system of claim 18, wherein the server is further configured to transmit, to the first personal computing device, a printable ticket for a seat assigned as associated with the first user.

22. The system of claim 18, wherein the first seat map is further configured to enable the browser of the first personal computing device to generate an additional display of information about the first set of one or more available seats on the flight in response to the first user placing a location indicator over a portion of the first interactive seating display.

23. The system of claim 22, wherein the first seat map comprises javascript that enables the browser of the first personal computing device to generate the additional display of information about the first set of one or more available seats on the flight in response to the first user placing the location indicator over the portion of the first interactive seating display.

24. The system of claim 18, wherein the flight comprises a single flight occurring at a first time.

25. The system of claim 18, wherein at least one of the first personal computing device or the second personal computing device comprises a wireless communication connection.

26. A method of interactively receiving a selection for one or more seats and removing the one or more seats from inventory, the method comprising:

receiving, by a server over a computer network as a part of a first reservation browser session, a first data query for a first seat map for a flight from a first personal computing device operated by a first user, wherein the first seat map comprises data descriptive of a first set of one or more available seats on the flight and a first set of one or more unavailable seats on the flight, the first seat map being configured to enable a browser of the first personal computing device to generate a first interactive seating display within the browser of the first personal computing device representing the first set of one or more available seats on the flight;

receiving, by the server over the computer network as a part of a second reservation browser session, a second data query for a second seat map for the flight from a second personal computing device operated by a second user, wherein the second seat map comprises data descriptive of a second set of one or more available seats on the flight and a second set of one or more unavailable seats on the flight, the second seat map being configured to enable a browser of the second personal computing device to generate a second interactive seating display within the browser of the second personal computing device representing the second set of one or more available seats on the flight;

querying, by the server, a data storage system for information descriptive of available seats for the flight;

transmitting, by the server as a part of the first reservation browser session, the first seat map over the computer network to the first personal computing device;

transmitting, by the server as a part of the second reservation browser session, the second seat map over the computer network to the second personal computing device, wherein the first reservation browser session and the second reservation browser session at least partially overlap in time;

receiving, as a part of the first reservation browser session, from the first personal computing device over the computer network, a first selection of at least one seat from among the first set of one or more available seats;

receiving, as a part of the second reservation browser session, from the second personal computing device over the computer network, a second selection of at least one seat from among the second set of one or more available seats, wherein the second selection comprises at least one overlapping seat within the first selection;

receiving, as a part of the first reservation browser session, from the first personal computing device, payment information data;

requesting acceptance of the received payment information data;

removing, in response to acceptance of the received payment information data, from inventory and assigning, as associated with the first user, the at least one seat corresponding to the first selection;

transmitting to the first personal computing device, as part of the first reservation browser session, a first notification that the at least one seat corresponding to the first selection have been assigned as associated with the first user; and transmitting, in response to assignment of the at least one seat corresponding to the first selection as associated with the first user, to the second personal computing device, as part of the second reservation browser session, a second notification that the at least one overlapping seat is not available to the second user;

wherein the server comprises one or more processors configured to execute instructions.

27. The method of claim 26, wherein transmitting a second notification comprises transmitting the second notification before requesting acceptance of the received payment information data.

28. The method of claim 26, wherein transmitting a second notification comprises transmitting the second notification after requesting acceptance of the received payment information data.

29. The method of claim 26, wherein the first selection of at least one seat from among the first set of one or more available seats is selected by touch screen input.

30. The method of claim 26, further comprising transmitting, to the first personal computing device, a printable ticket for a seat assigned as associated with the first user.

31. The method of claim 26, wherein the first seat map is further configured to enable the browser of the first personal computing device to generate an additional display of information about the first set of one or more available seats on the flight in response to the first user placing a location indicator over a portion of the first interactive seating display.

32. The method of claim 31, wherein the first seat map comprises javascript that enables the browser of the first personal computing device to generate the additional display of information about the first set of one or more available seats on the flight in response to the first user placing the location indicator over the portion of the first interactive seating display.

33. The method of claim 26, wherein the flight comprises a single flight occurring at a first time.

34. The method of claim 26, wherein at least one of the first personal computing device or the second personal computing device comprises a wireless communication connection.

35. A system for interactively receiving a selection for one or more seats and removing the one or more seats from inventory, the system comprising:
one or more processors configured to execute instructions;
a server configured via instructions executable by the one or more processors to:
receive, over a computer network as a part of a first reservation browser session, a first data query for a first seat map for a flight from a first personal computing device operated by a first user, wherein the first seat map comprises data descriptive of a first set of one or more available seats on the flight and a first set of one or more unavailable seats on the flight, the first seat map being configured to enable a browser of the first personal computing device to generate a first interactive seating display within the browser of the first personal computing device representing the first set of one or more available seats on the flight;
receive, over the computer network as a part of a second reservation browser session, a second data query for a second seat map for the flight from a second personal computing device operated by a second user, wherein the second seat map comprises data descriptive of a second set of one or more available seats on the flight and a second set of one or more unavailable seats on the flight, the second seat map being configured to enable a browser of the second personal computing device to generate a second interactive seating display within the browser of the second personal computing device representing the second set of one or more available seats on the flight;
query a data storage system for information descriptive of available seats for the flight;
transmit, as a part of the first reservation browser session, the first seat map over the computer network to the first personal computing device;
transmit, as a part of the second reservation browser session, the second seat map over the computer network to the second personal computing device, wherein the first reservation browser session and the second reservation browser session at least partially overlap in time;
receive, as a part of the first reservation browser session, from the first personal computing device over the computer network, a first selection of at least one seat from among the first set of one or more available seats;
receive, as a part of the second reservation browser session, from the second personal computing device over the computer network, a second selection of at least one seat from among the second set of one or more available seats, wherein the second selection comprises at least one overlapping seat within the first selection;
receive, as a part of the first reservation browser session, from the first personal computing device, payment information data;
request acceptance of the received payment information data;
transmit, in response to acceptance of the received payment information data, a request to remove from inventory and assign, as associated with the first user, the at least one seat corresponding to the first selection;
transmit to the first personal computing device, as part of the first reservation browser session, a first notification that the at least one seat corresponding to the first selection have been assigned as associated with the first user; and
transmit, in response to assignment of the at least one seat corresponding to the first selection as associated with the first user, to the second personal computing device, as part of the second reservation browser session, a second notification that the at least one overlapping seat is not assigned to the second user.

36. The system of claim 35, wherein the second notification is transmitted before acceptance of the received payment information data is requested.

37. The system of claim 35, wherein the second notification is transmitted after acceptance of the received payment information data is requested.

38. The system of claim 35, wherein the first selection of at least one seat from among the first set of one or more available seats is selected by touch screen input.

39. The system of claim 35, wherein the server is further configured to transmit, to the first personal computing device, data that can be used to print a ticket.

40. The system of claim 35, wherein the first seat map is further configured to enable the browser of the first personal computing device to generate an additional display of information about the first set of one or more available seats on the flight in response to the first user placing a location indicator over a portion of the first interactive seating display.

41. The system of claim 40, wherein the first seat map comprises javascript that enables the browser of the first personal computing device to generate the additional display of information about the first set of one or more available seats on the flight in response to the first user placing the location indicator over the portion of the first interactive seating display.

42. The system of claim 35, wherein the flight comprises a single flight occurring at a first time.

43. The system of claim 35, wherein at least one of the first personal computing device or the second personal computing device comprises a wireless communication connection.

44. A system for interactively receiving a selection for one or more seats and removing the one or more seats from inventory, the system comprising:
one or more processors configured to execute instructions;
a server configured via instructions executable by the one or more processors to:
receive, over a computer network as a part of a first reservation browser session, a first data query for a first seat map for a flight from a first personal computing device operated by a first user, wherein the first seat map comprises data descriptive of a first set of one or more available seats on the flight and a first set of one or more unavailable seats on the flight, the first seat map being configured to enable a browser of the first personal computing device to generate a first interactive seating display within the browser of the first personal computing device representing the first set of one or more available seats on the flight;

receive, over the computer network as a part of a second reservation browser session, a second data query for a second seat map for the flight from a second personal computing device operated by a second user, wherein the second seat map comprises data descriptive of a second set of one or more available seats on the flight and a second set of one or more unavailable seats on the flight, the second seat map being configured to enable a browser of the second personal computing device to generate a second interactive seating display within the browser of the second personal computing device representing the second set of one or more available seats on the flight;

query a data storage system for information descriptive of available seats for the flight;

transmit, as a part of the first reservation browser session, the first seat map over the computer network to the first personal computing device;

transmit, as a part of the second reservation browser session, the second seat map over the computer network to the second personal computing device, wherein the first reservation browser session and the second reservation browser session at least partially overlap in time;

receive, as a part of the first reservation browser session, from the first personal computing device over the computer network, a first selection of at least one seat from among the first set of one or more available seats;

receive, as a part of the second reservation browser session, from the second personal computing device over the computer network, a second selection of at least one seat from among the second set of one or more available seats, wherein the second selection comprises at least one overlapping seat within the first selection;

receive, as a part of the first reservation browser session, from the first personal computing device, payment information data;

request acceptance of the received payment information data;

transmit, in response to acceptance of the received payment information data, a request, to remove from inventory and assign, as associated with the first user, the at least one seat corresponding to the first selection;

transmit to the first personal computing device, as part of the first reservation browser session, a first notification that the at least one seat corresponding to the first selection have been assigned as associated with the first user;

transmit, to the first personal computing device, data that can be used to print a ticket; and transmit, in response to assignment of the at least one seat corresponding to the first selection as associated with the first user, to the second personal computing device, as part of the second reservation browser session, a second notification that the at least one overlapping seat is not assigned to the second user.

45. The system of claim 44, wherein the second notification is transmitted before acceptance of the received payment information data is requested.

46. The system of claim 44, wherein the second notification is transmitted after acceptance of the received payment information data is requested.

47. The system of claim 44, wherein the first selection of at least one seat from among the first set of one or more available seats is selected by touch screen input.

48. The system of claim 44, wherein the first seat map is further configured to enable the browser of the first personal computing device to generate an additional display of information about the first set of one or more available seats on the flight in response to the first user placing a location indicator over a portion of the first interactive seating display.

49. The system of claim 48, wherein the first seat map comprises javascript that enables the browser of the first personal computing device to generate the additional display of information about the first set of one or more available seats on the flight in response to the first user placing the location indicator over the portion of the first interactive seating display.

50. The system of claim 44, wherein the flight comprises a single flight occurring at a first time.

51. The system of claim 44, wherein at least one of the first personal computing device or the second personal computing device comprises a wireless communication connection.

52. A system for interactively receiving a selection for one or more seats and removing the one or more seats from inventory, the system comprising:

one or more processors configured to execute instructions;

a server configured via instructions executable by the one or more processors to:

receive, over a computer network as a part of a first reservation browser session, a first data query for a first seat map for a flight from a first personal computing device operated by a first user, wherein the first seat map comprises data descriptive of a first set of one or more available seats on the flight and a first set of one or more unavailable seats on the flight, the first seat map being configured to enable a browser of the first personal computing device to generate a first interactive seating display within the browser of the first personal computing device representing the first set of one or more available seats on the flight;

receive, over the computer network as a part of a second reservation browser session, a second data query for a second seat map for the flight from a second personal computing device operated by a second user, wherein the second seat map comprises data descriptive of a second set of one or more available seats on the flight and a second set of one or more unavailable seats on the flight, the second seat map being configured to enable a browser of the second personal computing device to generate a second interactive seating display within the browser of the second personal computing device representing the second set of one or more available seats on the flight;

query a data storage system for information descriptive of available seats for the flight;

transmit, as a part of the first reservation browser session, the first seat map over the computer network to the first personal computing device;

transmit, as a part of the second reservation browser session, the second seat map over the computer network to the second personal computing device, wherein the first reservation browser session and the second reservation browser session at least partially overlap in time;

receive, as a part of the first reservation browser session, from the first personal computing device over the computer network, a first selection of at least one seat from among the first set of one or more available seats, the first selection of at least one seat from among the first set of one or more available seats selected by touch screen input;

receive, as a part of the second reservation browser session, from the second personal computing device over the computer network, a second selection of at least one seat from among the second set of one or more available seats, wherein the second selection comprises at least one overlapping seat within the first selection;

receive, as a part of the first reservation browser session, from the first personal computing device, payment information data;

request acceptance of the received payment information data;

transmit, in response to acceptance of the received payment information data, a request, to remove from inventory and assign, as associated with the first user, the at least one seat corresponding to the first selection;

transmit to the first personal computing device, as part of the first reservation browser session, a first notification that the at least one seat corresponding to the first selection have been assigned as associated with the first user; and transmit to the second personal computing device, as part of the second reservation browser session, a second notification that the at least one overlapping seat is not assigned to the second user.

53. The system of claim 52, wherein the second notification is transmitted before acceptance of the received payment information data is requested.

54. The system of claim 52, wherein the second notification is transmitted after acceptance of the received payment information data is requested.

55. The system of claim 52, wherein the server is further configured to transmit, to the first personal computing device, data that can be used to print a ticket.

56. The system of claim 52, wherein the first seat map is further configured to enable the browser of the first personal computing device to generate an additional display of information about the first set of one or more available seats on the flight in response to the first user placing a location indicator over a portion of the first interactive seating display.

57. The system of claim 56, wherein the first seat map comprises javascript that enables the browser of the first personal computing device to generate the additional display of information about the first set of one or more available seats on the flight in response to the first user placing the location indicator over the portion of the first interactive seating display.

58. The system of claim 52, wherein the flight comprises a single flight occurring at a first time.

59. The system of claim 52, wherein at least one of the first personal computing device or the second personal computing device comprises a wireless communication connection.

60. A method of interactively receiving a selection for one or more seats and removing the one or more seats from inventory, the method comprising:

receiving, by a server over a computer network as a part of a first reservation browser session, a first data query for a first seat map for a flight from a first personal computing device operated by a first user, wherein the first seat map comprises data descriptive of a first set of one or more available seats on the flight and a first set of one or more unavailable seats on the flight, the first seat map being configured to enable a browser of the first personal computing device to generate a first interactive seating display within the browser of the first personal computing device representing the first set of one or more available seats on the flight;

receiving, by the server over the computer network as a part of a second reservation browser session, a second data query for a second seat map for the flight from a second personal computing device operated by a second user, wherein the second seat map comprises data descriptive of a second set of one or more available seats on the flight and a second set of one or more unavailable seats on the flight, the second seat map being configured to enable a browser of the second personal computing device to generate a second interactive seating display within the browser of the second personal computing device representing the second set of one or more available seats on the flight;

querying, by the server, a data storage system for information descriptive of available seats for the flight;

transmitting, by the server as a part of the first reservation browser session, the first seat map over the computer network to the first personal computing device;

transmitting, by the server as a part of the second reservation browser session, the second seat map over the computer network to the second personal computing device, wherein the first reservation browser session and the second reservation browser session at least partially overlap in time;

receiving, as a part of the first reservation browser session, from the first personal computing device over the computer network, a first selection of at least one seat from among the first set of one or more available seats;

receiving, as a part of the second reservation browser session, from the second personal computing device over the computer network, a second selection of at least one seat from among the second set of one or more available seats, wherein the second selection comprises at least one overlapping seat within the first selection;

receiving, as a part of the first reservation browser session, from the first personal computing device, payment information data;

requesting acceptance of the received payment information data;

transmitting, by the server, in response to acceptance of the received payment information data, a request, to remove from inventory and assign, as associated with the first user, the at least one seat corresponding to the first selection;

transmitting to the first personal computing device, as part of the first reservation browser session, a first notification that the at least one seat corresponding to the first selection have been assigned as associated with the first user; and transmitting to the second personal computing device, as part of the second reservation browser session, a second notification that the at least one overlapping seat is not assigned to the second user, wherein the server comprises one or more processors configured to execute instructions.

61. The method of claim 60, wherein transmitting a second notification comprises transmitting the second notification before requesting acceptance of the received payment information data.

62. The method of claim 60, wherein transmitting a second notification comprises transmitting the second notification after requesting acceptance of the received payment information data.

63. The method of claim 60, wherein the first selection of at least one seat from among the first set of one or more available seats is selected by touch screen input.

64. The method of claim 60, further comprising transmitting, to the first personal computing device, data that can be used to print a ticket.

65. The method of claim 60, wherein the first seat map is further configured to enable the browser of the first personal computing device to generate an additional display of information about the first set of one or more available seats on the flight in response to the first user placing a location indicator over a portion of the first interactive seating display.

66. The method of claim 65, wherein the first seat map comprises javascript that enables the browser of the first personal computing device to generate the additional display of information about the first set of one or more available seats on the flight in response to the first user placing the location indicator over the portion of the first interactive seating display.

67. The method of claim 60, wherein the flight comprises a single flight occurring at a first time.

68. The method of claim 60, wherein at least one of the first personal computing device or the second personal computing device comprises a wireless communication connection.

* * * * *